(12) United States Patent
Park et al.

(10) Patent No.: US 12,278,952 B2
(45) Date of Patent: *Apr. 15, 2025

(54) METHOD AND DEVICE FOR ENCODING IMAGE AND METHOD AND DEVICE FOR DECODING IMAGE ON BASIS OF SUB-BLOCK

(71) Applicant: SAMSUNG ELECTRONICS CO., LTD., Suwon-si (KR)

(72) Inventors: Minwoo Park, Suwon-si (KR); Minsoo Park, Suwon-si (KR); Seungsoo Jeong, Suwon-si (KR); Anish Tamse, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/428,097

(22) Filed: Jan. 31, 2024

(65) Prior Publication Data

US 2024/0244183 A1 Jul. 18, 2024

Related U.S. Application Data

(63) Continuation of application No. 17/263,406, filed as application No. PCT/KR2019/009382 on Jul. 29, 2019, now Pat. No. 11,943,430.

(Continued)

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/176* (2014.11); *H04N 19/52* (2014.11); *H04N 19/80* (2014.11)

(58) Field of Classification Search
CPC .. H04N 19/105; H04N 19/176; H04N 19/159; H04N 19/52
See application file for complete search history.

(56) References Cited

U.S. PATENT DOCUMENTS

| 9,667,973 B2 | 5/2017 | Takehara |
|---|---|---|
| 10,057,572 B2 | 8/2018 | Oh |

(Continued)

FOREIGN PATENT DOCUMENTS

| CN | 107071460 A | 8/2017 |
|---|---|---|
| CN | 108055551 A | 5/2018 |

(Continued)

OTHER PUBLICATIONS

Koo, Moonmo et al., "Description of SDR video coding technology proposal by LG Electronics", Joint Video Experts Teams (JVET) of ITU-T SG 16 WP 3 and ISO/IEC JTC 1/SC 29/WG 11, 10th Meeting: San Diego, CA, Apr. 10, 2018-Apr. 20, 2018, Document: JVET-J0017-v1. (73 pages total).

(Continued)

*Primary Examiner* — Zhubing Ren
(74) *Attorney, Agent, or Firm* — Sughrue Mion, PLLC

(57) ABSTRACT

A method of decoding an image according to an embodiment includes: when a size of a current block in the image is equal to or greater than a certain size, determining a candidate list including, as a candidate, a first reference block indicated by a temporal motion vector; when the first reference block is selected from among candidates included in the candidate list, determining motion vectors of sub-blocks in the current block by using motion vectors obtained from the first reference block; and reconstructing the current block based on sample values of a second reference block indicated by the motion vectors of the sub-blocks.

3 Claims, 31 Drawing Sheets

Related U.S. Application Data

(60) Provisional application No. 62/783,654, filed on Dec. 21, 2018, provisional application No. 62/711,139, filed on Jul. 27, 2018.

(51) Int. Cl.
*H04N 19/176* (2014.01)
*H04N 19/52* (2014.01)
*H04N 19/80* (2014.01)

(56) References Cited

U.S. PATENT DOCUMENTS

| | | | |
|---|---|---|---|
| 2014/0140408 | A1 | 5/2014 | Lee |
| 2014/0185683 | A1 | 7/2014 | Asaka |
| 2014/0307789 | A1 | 10/2014 | Kim |
| 2015/0195558 | A1 | 7/2015 | Kim |
| 2015/0334414 | A1 | 11/2015 | Oh |
| 2016/0173878 | A1 | 6/2016 | Oh |
| 2016/0219278 | A1 | 7/2016 | Chen et al. |
| 2016/0360229 | A1 | 12/2016 | Lim |
| 2016/0381382 | A1 | 12/2016 | Oh |
| 2017/0085910 | A1* | 3/2017 | Oh ............... H04N 19/139 |
| 2018/0124398 | A1* | 5/2018 | Park ............... H04N 19/463 |
| 2018/0176596 | A1 | 6/2018 | Jeong |
| 2018/0255316 | A1 | 9/2018 | Zhang et al. |
| 2018/0310017 | A1* | 10/2018 | Chen ............... H04N 19/52 |
| 2019/0020896 | A1 | 1/2019 | Kim et al. |
| 2019/0215528 | A1 | 7/2019 | Takehara et al. |

FOREIGN PATENT DOCUMENTS

| | | |
|---|---|---|
| EP | 3737091 A1 | 11/2020 |
| JP | 2016-42727 A | 3/2016 |
| KR | 10-2017-0108010 A | 9/2017 |
| KR | 10-2017-0131321 A | 11/2017 |
| WO | 2016/165069 A1 | 10/2016 |

OTHER PUBLICATIONS

International Search Report (PCT/ISA/210) issued Nov. 13, 2019 by the International Searching Authority in counterpart International Patent Application No. PCT/KR2019/009382.
Written Opinion (PCT/ISA/237) issued Nov. 13, 2019 by the International Searching Authority in counterpart International Patent Application No. PCT/KR2019/009382.
Communication dated Jun. 9, 2021, issued by the Korean Intellectual Property Office in Korean Application No. 10-2020-7032891.
Xiu et al "Description of SDR, HDR, and 360 video coding technology proposal by InterDigital Communications and Dolby Laboratories", Joint Video Experts Team (JVET) of ITU-T SG 16 WP 3 and ISO/IEC JTC 1/SC 29/WG 11, 10th Meeting: San Diego, US, Apr. 10, 2018-Apr. 20, 2018, Document: JVET-J0015-v1. (82 pages total).
Communication dated Mar. 30, 2022 issued by the European Patent Office in EP Application No. 19841359.3.
Chen et al. "Algorithm Description of Joint Exploration Test Model 7 (JEM7)", Joint Video Exploration Team (JVET) of ITU-T SG 16 WP 3 and ISO/IEC JTC 1/SC 29/WG 11, 7th Meeting: Torino, IT Jul. 13, 2017-Jul. 21, 2017, Document: JVET-G1001-v1. (48 pages total).
Bross et al., "Inter-Picture Prediction in HEVC", In: High Efficency Video Coding (HEVC), Aug. 23, 2014, Springer International Publishing, Cham, XP055624540, ISBN: 978-3-319-06894-7, pp. 113- 140, 28 pages total.
Office Action dated Feb. 20, 2023, issued by Indian Patent Office for Indian Application No. 202127003931.
Office Action issued on Nov. 17, 2023 by the Chinese Patent Office in corresponding CN Patent Application No. 201980059236.3.

\* cited by examiner

FIG. 13

| BLOCK SHAPE<br>DEPTH | 0: SQUARE | 1: NS_VER | 2: NS_HOR |
|---|---|---|---|
| DEPTH OF D | 1300 | 1310 | 1320 |
| DEPTH OF D+1 | 1302 | 1312 | 1322 |
| DEPTH OF D+2 | 1304 | 1314 | 1324 |
| ... | ... | ... | ... |

FIG. 18
| SQUARE BLOCK | |
|---|---|
| (00)b |  |
| (01)b |  |
| (10)b |  |
| (11)b |  |
| NON-SQUARE BLOCK | | |
|---|---|---|
| (0)b |  | |
| (10)b |  | |
| (11)b |  | |

FIG. 19
| SQUARE BLOCK | |
|---|---|
| (00)b |  |
| (10)b |  |
| (11)b |  |
| NON-SQUARE BLOCK | | |
|---|---|---|
| (0)b |  |  |
| (10)b |  |  |
| (11)b |  |  |

FIG. 22

| INDEX | CANDIDATE LIST |
|---|---|
| 0 | FIRST REFERENCE BLOCK |
| 1 | FIRST SPATIAL NEIGHBORING BLOCK |
| 2 | SECOND SPATIAL NEIGHBORING BLOCK |
| 3 | THIRD SPATIAL NEIGHBORING BLOCK |
| 4 | TEMPORAL NEIGHBORING BLOCK |
| ⋮ | |

METHOD AND DEVICE FOR ENCODING IMAGE AND METHOD AND DEVICE FOR DECODING IMAGE ON BASIS OF SUB-BLOCK

CROSS-REFERENCE TO RELATED APPLICATIONS

This application is a continuation application of U.S. patent application Ser. No. 17/263,406, filed on Jan. 26, 2021, which is a National Stage of International Application No. PCT/KR2019/009382, filed on Jul. 29, 2019, which claims priority to U.S. Patent Application No. 62/711,139, filed on Jul. 27, 2018, and to U.S. Patent Application No. 62/783,654, filed on Dec. 21, 2018, in the U.S. Patent and Trademark Office, the disclosures of which are incorporated by reference herein in their entireties.

TECHNICAL FIELD

The present disclosure relates to the field of image encoding and decoding. More particularly, the present disclosure relates to a method and apparatus for encoding an image based on a sub-block in a block, and a method and apparatus for decoding an image based on a sub-block in a block.

BACKGROUND ART

In image encoding and decoding, one image may be split into blocks, and each of the blocks may be prediction encoded and prediction decoded by using inter prediction or intra prediction.

Inter prediction refers to a method of compressing an image by removing temporal redundancy between images, a representative example of which is motion estimation encoding. In motion estimation encoding, blocks of a current image are predicted by using at least one reference image. A reference block that is most similar to a current block may be searched for within a certain search range by using a certain evaluation function. The current block is predicted based on the reference block, and a residual block generated by subtracting from the current block a prediction block generated as a prediction result is encoded. In this case, in order to more accurately perform prediction, interpolation may be performed on the reference image to generate pixels of sub-pel-units smaller than integer-pel-units, and inter prediction may be performed on the generated pixels of the sub-pel-units.

In a codec such as H.264 advanced video coding (AVC) and high efficiency video coding (HEVC), in order to predict a motion vector of a current block, a motion vector of previously encoded blocks adjacent to the current block or of blocks included in a previously encoded image is used as a prediction motion vector of the current block. A differential motion vector that is a difference between the prediction motion vector and the motion vector of the current block is signaled to a decoder by using a certain method.

DESCRIPTION OF EMBODIMENTS

Technical Problem

There are provided an apparatus and method for decoding an image and an apparatus and method for encoding an image according to an embodiment, which may accurately reconstruct motion information of a block in an image.

There are also provided an apparatus and method for decoding an image and an apparatus and method for encoding an image according to an embodiment, which may reduce the complexity of image encoding and decoding by limiting a size of a block.

Solution to Problem

A method of decoding an image according to an embodiment includes: when a size of a current block in the image is equal to or greater than a certain size, determining a candidate list including, as a candidate, a first reference block indicated by a temporal motion vector; when the first reference block is selected from among candidates included in the candidate list, determining motion vectors of sub-blocks in the current block by using motion vectors obtained from the first reference block; and reconstructing the current block based on sample values of a second reference block indicated by the motion vectors of the sub-blocks.

Advantageous Effects of Disclosure

An apparatus and method for decoding an image and an apparatus and method for encoding an image according to an embodiment may accurately reconstruct motion information of a block in an image.

Also, an apparatus and method for decoding an image and an apparatus and method for encoding an image according to an embodiment may reduce the complexity of image encoding and decoding by limiting a size of a block.

However, effects achievable by an apparatus and method of decoding an image and an apparatus and method for encoding an image according to an embodiment are not limited thereto, and other unmentioned effects will be apparent to one of ordinary skill in the art from the following description.

BRIEF DESCRIPTION OF DRAWINGS

A brief description of each drawing is provided to better understand the drawings cited herein.

FIG. 13 illustrates a process of determining a depth of a coding unit as a shape and a size of the coding unit change, when the coding unit is recursively split to determine a plurality of coding units, according to an embodiment.

FIG. 18 illustrates various shapes of a coding unit determinable based on split shape mode information representable as a binary code, according to an embodiment.

FIG. 19 illustrates other shapes of a coding unit determinable based on split shape mode information representable as a binary code, according to an embodiment.

FIG. 22 is a diagram illustrating a candidate list according to an embodiment.

BEST MODE

Figure 1:
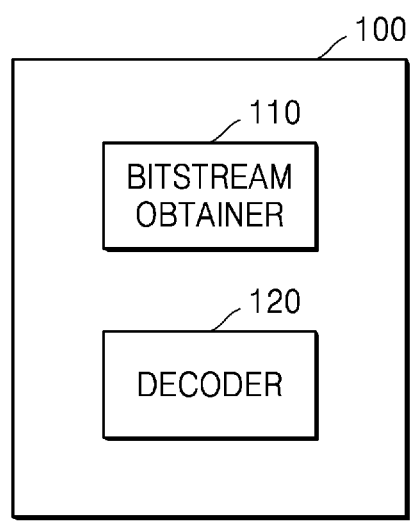
FIG. 1 is a block diagram of an image decoding apparatus according to an embodiment.

A method of decoding an image according to an embodiment includes: when a size of a current block in the image is equal to or greater than a certain size, determining a candidate list including, as a candidate, a first reference block indicated by a temporal motion vector; when the first reference block is selected from among candidates included in the candidate list, determining motion vectors of sub-blocks in the current block by using motion vectors obtained from the first reference block; and reconstructing the current block based on sample values of a second reference block indicated by the motion vectors of the sub-blocks.

The method may further include obtaining a filtered current block by performing deblocking filtering on sample values of the sub-blocks based on a boundary between the sub-blocks in the reconstructed current block.

The determining of the candidate list may include, when a prediction mode of the current block is a mode of determining a motion vector of the current block by using a motion vector of a candidate included in a candidate list, determining the candidate list.

The method may further include determining a motion vector of a neighboring block spatially adjacent to the current block as the temporal motion vector.

The determining of the temporal motion vector may include, when the neighboring block is not available, determining a pre-determined motion vector as the temporal motion vector.

The determining of the temporal motion vector may include, when an image indicated by the motion vector of the neighboring block is different from a pre-determined collocated image, determining a pre-determined motion vector, instead of the motion vector of the neighboring block, as the temporal motion vector.

The method may further include, when the current block is a certain block unit, determining a pre-determined motion vector as the temporal motion vector.

When the size of the current block is less than the certain size, the method may further include determining the candidate list including, as a candidate, a block other than the first reference block.

An index having a smallest value is assigned to the first reference block from among the candidates included in the candidate list.

The method may further include determining a motion vector corresponding to a center sample from among samples of the first reference block as a representative motion vector.

The method may further include: determining sub-areas corresponding to the sub-blocks in the first reference block; and determining the representative motion vector to be a motion vector of a sub-area whose motion vector is not obtainable from among the sub-areas.

The determining of the candidate list may include, when a motion vector corresponding to a center sample from among samples of the first reference block does not exist, determining the candidate list including, as a candidate, a block other than the first reference block.

An apparatus for decoding an image according to an embodiment includes: a motion information determiner configured to, when a size of a current block in the image is equal to or greater than a certain size, determine a candidate list including, as a candidate, a first reference block indicated by a temporal motion vector, and when the first reference block is selected from among candidates included in the candidate list, determine motion vectors of sub-blocks in the current block by using motion vectors obtained from the first reference block; and a reconstructor configured to reconstruct the current block based on sample values of a second candidate list, determining motion vectors of sub-blocks in the current block by using motion vectors obtained from the first reference block; and reconstructing the current block based on sample values of a second reference block indicated by the motion vectors of the sub-blocks.

A method of encoding an image according to an embodiment includes: when a size of a current block in the image is equal to or greater than a certain size, determining a candidate including, as a candidate, a first reference block indicated by a temporal motion vector; selecting a candidate used to determine a motion vector of the current block from among the candidates included in the candidate list; and generating a bitstream including information indicating the selected candidate, wherein motion vectors obtained from the first reference block are used to determine motion vectors of sub-blocks in the current block.

Mode of Disclosure

As the present disclosure allows for various changes and numerous embodiments, particular embodiments will be illustrated in the drawings and described in detail in the written description. However, this is not intended to limit the present disclosure to particular modes of practice, and it will be understood that all changes, equivalents, and substitutes that do not depart from the spirit and technical scope of the present disclosure are encompassed in the present disclosure.

In the description of embodiments, certain detailed descriptions of the related art are omitted when it is deemed that they may unnecessarily obscure the essence of the present disclosure. Also, numbers (e.g., first and second) used in the description of the specification are intended to merely distinguish one component from another.

Also, in the present specification, when a component is referred to as being "connected" or "coupled" to or by another component, it should be understood that the component may be directly connected or coupled to the other component, but may be connected or coupled to the other component with an intervening component therebetween, unless specified otherwise.

Also, in the present specification, regarding an element with a suffix such as 'unit' or 'module', two or more elements may be combined into one element or one element may be divided into two or more elements according to functions. Also, each element described below may additionally perform some or all of functions performed by another element, in addition to main functions of itself, and some of the main functions of each element may be performed entirely by another component.

Also, the term 'image' or picture' used herein may refer to a still image of a video, or a moving image, i.e., a video itself.

Also, the term 'sample' used herein refers to data that is assigned to a sampling location of an image and is to be processed. For example, pixel values in an image of a spatial domain and transform coefficients in a transform domain may be samples. A unit including one or more samples may be defined as a block.

An image encoding method and apparatus and an image decoding method and apparatus based on transform units and coding units having a tree structure according to an embodiment will be described with reference to FIGS. 1 through 20. An image encoding apparatus 200 and an image decoding apparatus 100 which will be described with reference to FIGS. 1 through 20 may respectively include an image encoding apparatus 2900 and an image decoding apparatus 2100 which will be described with reference to FIGS. 21 through 31.

FIG. 1 is a block diagram of the image decoding apparatus 100 according to an embodiment.

The image decoding apparatus 100 may include a bitstream obtainer 110 and a decoder 120. The bitstream obtainer 110 and the decoder 120 may include at least one processor. Also, the bitstream obtainer 110 and the decoder 120 may include a memory in which instructions to be executed by the at least one processor are stored.

The bitstream obtainer 110 may receive a bitstream. The bitstream includes information obtained when the image encoding apparatus 200 encodes an image as described below. Also, the bitstream may be transmitted from the image encoding apparatus 200. The image encoding apparatus 200 and the image decoding apparatus 100 may be connected to each other by wire or wirelessly, and the bitstream obtainer 110 may receive the bitstream by wire or wirelessly. The bitstream obtainer 110 may receive the bitstream from a storage medium such as an optical medium or a hard disk. The decoder 120 may reconstruct an image based on information obtained from the received bitstream. The decoder 120 may obtain a syntax element for reconstructing the image from the bitstream. The decoder 120 may reconstruct the image based on the syntax element.

Operations of the image decoding apparatus 100 will be described in detail. The bitstream obtainer 110 may receive a bitstream.

The image decoding apparatus 100 may perform an operation of obtaining a bin string corresponding to a split shape mode of a coding unit from the bitstream. The image decoding apparatus 100 may perform an operation of determining a splitting rule of the coding unit. Also, the image decoding apparatus 100 may perform an operation of splitting the coding unit into a plurality of coding units, based on at least one of the bin string corresponding to the split shape mode and the splitting rule. The image decoding apparatus 100 may determine an allowable first range of a size of the coding unit, according to a ratio between a width and a height of the coding unit, in order to determine the splitting rule. The image decoding apparatus 100 may determine an allowable second range of a size of the coding unit, according to the split shape mode of the coding unit, in order to determine the splitting rule.

Splitting of a coding unit according to an embodiment of the present disclosure will be described in detail.

First, one picture may be split into one or more slices or one or more tiles. One slice or tile may be a sequence of largest coding units (coding tree units (CTUs)). There is a largest coding block (coding tree block (CTB)) conceptually compared to a largest coding unit (CTU).

A largest coding block (CTB) refers to an N×N block including N×N samples (N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture having color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture having color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a certain size including a certain number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, the present disclosure is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode SPLIT_TT_VER.

The image decoding apparatus 100 may obtain split shape mode information from a bitstream from one bin string. The bitstream received by the image decoding apparatus 100 may include a fixed length binary code, a unary code, a truncated unary code, a pre-determined binary code, etc. The bin string is a binary sequence of information. The bin string may include at least one bit. The image decoding apparatus 100 may obtain the split shape mode information corresponding to the bin string based on a splitting rule. The image decoding apparatus 100 may determine whether or not to quad split a coding unit, a split direction, and a split type, based on one bin string.

A coding unit may be equal to or smaller than a largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape code information about a largest coding unit indicates that splitting is performed, the largest coding unit may be split into coding units. Also, when split shape mode information about a coding unit indicates that splitting is performed, the coding unit may be split into smaller coding units. However, splitting of an image is not limited thereto, and a largest coding unit and a coding unit may not be distinguished from each other. Splitting of a coding unit will be described in more detail with reference to FIGS. 3 through 16.

Also, one or more prediction blocks for prediction may be determined from a coding unit. The prediction block may be equal to or smaller than the coding unit. Also, one or more transform blocks for transform may be determined from a coding unit. The transform block may be equal to or smaller than the coding unit.

Shapes and sizes of the transform block and the prediction block may not be related to each other.

In another embodiment, prediction may be performed by using a coding unit as a prediction unit. Also, transform may be performed by using a coding unit as a transform block.

Splitting of a coding unit will be described in more detail with reference to FIGS. 3 through 16. Each of a current block and a neighboring block of the present disclosure may indicate one of a largest coding unit, a coding unit, a prediction block, and a transform block. Also, the current block or current coding unit is a block on which decoding or encoding is currently performed or a block on which splitting is currently performed. The neighboring block may be a block that is reconstructed before the current block. The neighboring block may be spatially or temporally adjacent to the current block. The neighboring block may be located at one of the bottom left, left, top left, top, top right, right, and bottom right of the current block.

Figure 3:
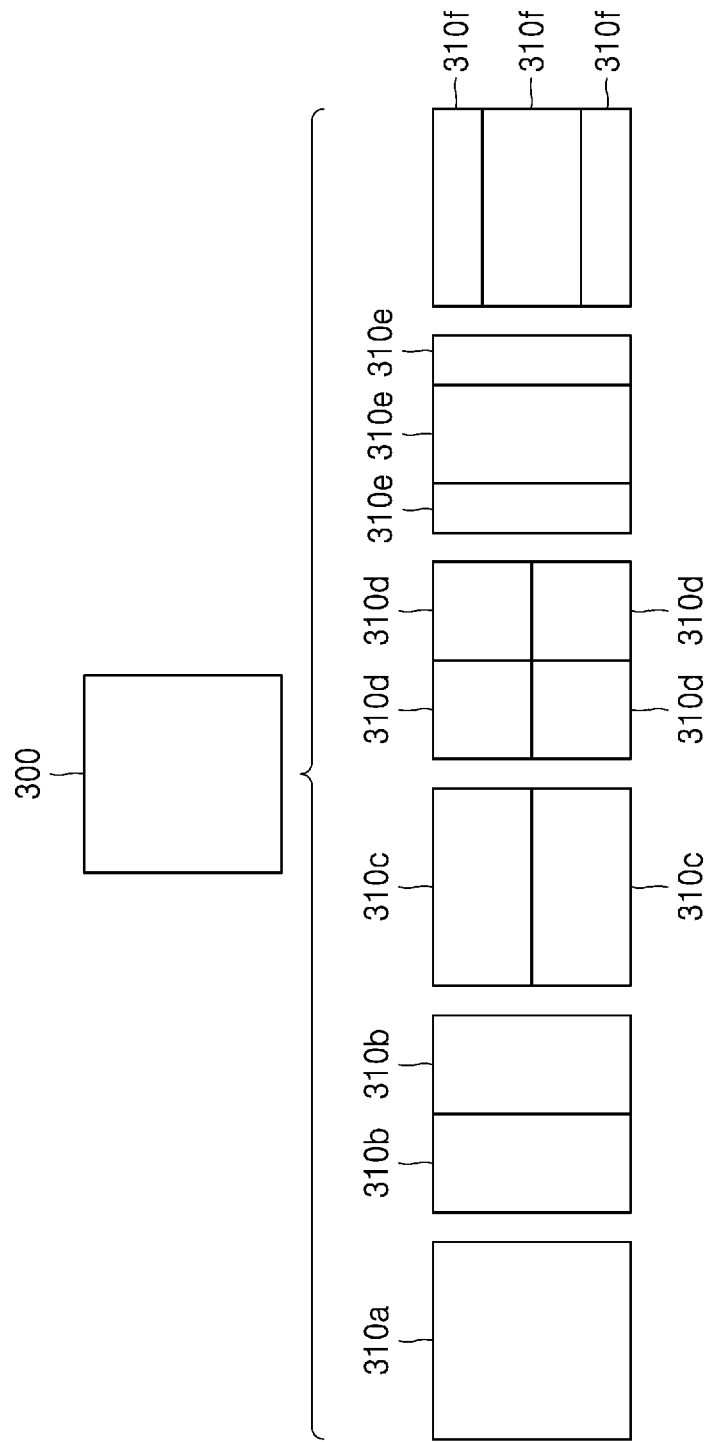
FIG. 3 illustrates a process by which an image decoding apparatus determines at least one coding unit by splitting a current coding unit, according to an embodiment.

FIG. 3 illustrates a process by which the image decoding apparatus 100 determines at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. N may be a positive integer. Block shape information is information indicating at least one of a shape, a direction, a ratio between a width and a height, and a size of a coding unit.

The shape of the coding unit may include a square shape and a non-square shape. When the width and the height of the coding unit are the same (i.e., when the block shape of the coding unit is 4N×4N), the image decoding apparatus 100 may determine the block shape information of the coding unit as a square shape. The image decoding apparatus 100 may determine the shape of the coding unit as a non-square shape.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is a non-square shape, the image decoding apparatus 100 may determine the ratio of the width and the height in the block shape information of the coding unit as at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on a length of the width and a length of the height of the coding unit. Also, the image decoding apparatus 100 may determine the size of the coding unit, based on at least one of the length of the width, the length of the height, and an area of the coding unit.

According to an embodiment, the image decoding apparatus 100 may determine a shape of the coding unit by using the block shape information, and may determine a splitting method of the coding unit by using split shape mode information. That is, a coding unit splitting method indicated by the split shape mode information may be determined according to a block shape indicated by the block shape information used by the image decoding apparatus 100.

The image decoding apparatus 100 may obtain the split shape mode information from a bitstream. However, the present disclosure is not limited thereto, and the image decoding apparatus 100 and the image encoding apparatus 200 may determine the split shape mode information that is pre-promised based on the block shape information. The image decoding apparatus 100 may determine the split shape mode information that is pre-promised for a largest coding unit or a smallest coding unit. For example, the image decoding apparatus 100 may determine that the pre-promised split shape mode information for the largest coding unit indicates quad splitting. Also, the image decoding apparatus 100 may determine that the pre-promised split shape mode information for the smallest coding unit indicates "not to perform splitting". For example, the image decoding apparatus 100 may determine a size of the largest coding unit to be 256×256. The image decoding apparatus 100 may determine that the pre-promised split shape mode information indicates quad splitting. The quad splitting is a split shape mode in which the width and the height of the coding unit are halved. The image decoding apparatus 100 may obtain the coding unit having a size of 128×128 from the largest coding unit having a size of 256×256 based on the split shape mode information. Also, the image decoding apparatus 100 may determine a size of the smallest coding unit to be 4×4. The image decoding apparatus 100 may obtain the split shape mode information indicating "not to perform splitting" for the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310a having the same size as the current coding unit 300 is not split, based on the split shape mode information indicating not to perform splitting, or may determine coding units 310b, 310c, 310d, 310e, and 310f split based on the split shape mode information indicating a certain splitting method.

Referring to FIG. 3, according to an embodiment, the image decoding apparatus 100 may determine two coding units 310b obtained by vertically splitting the current coding unit 300, based on the split shape mode information indicating to vertically perform splitting. The image decoding apparatus 100 may determine two coding units 310c obtained by horizontally splitting the current coding unit 300, based on the split shape mode information indicating to horizontally perform splitting. The image decoding apparatus 100 may determine four coding units 310d obtained by vertically and horizontally splitting the current coding unit 300, based on the split shape mode information indicating to vertically and horizontally perform splitting. The image decoding apparatus 100 may determine three coding units 310e obtained by vertically splitting the current coding unit 300, based on the split shape mode information indicating to vertically perform ternary splitting according to an embodiment. The image decoding apparatus 100 may determine three coding units 310f obtained by horizontally splitting the current coding unit 300, based on the split shape mode information indicating to horizontally perform ternary splitting. However, splitting methods of the square coding unit are not limited to the above-described methods, and the split shape mode information may include various methods. Certain splitting methods of splitting the square coding unit will be described in detail below through various embodiments.

Figure 4:
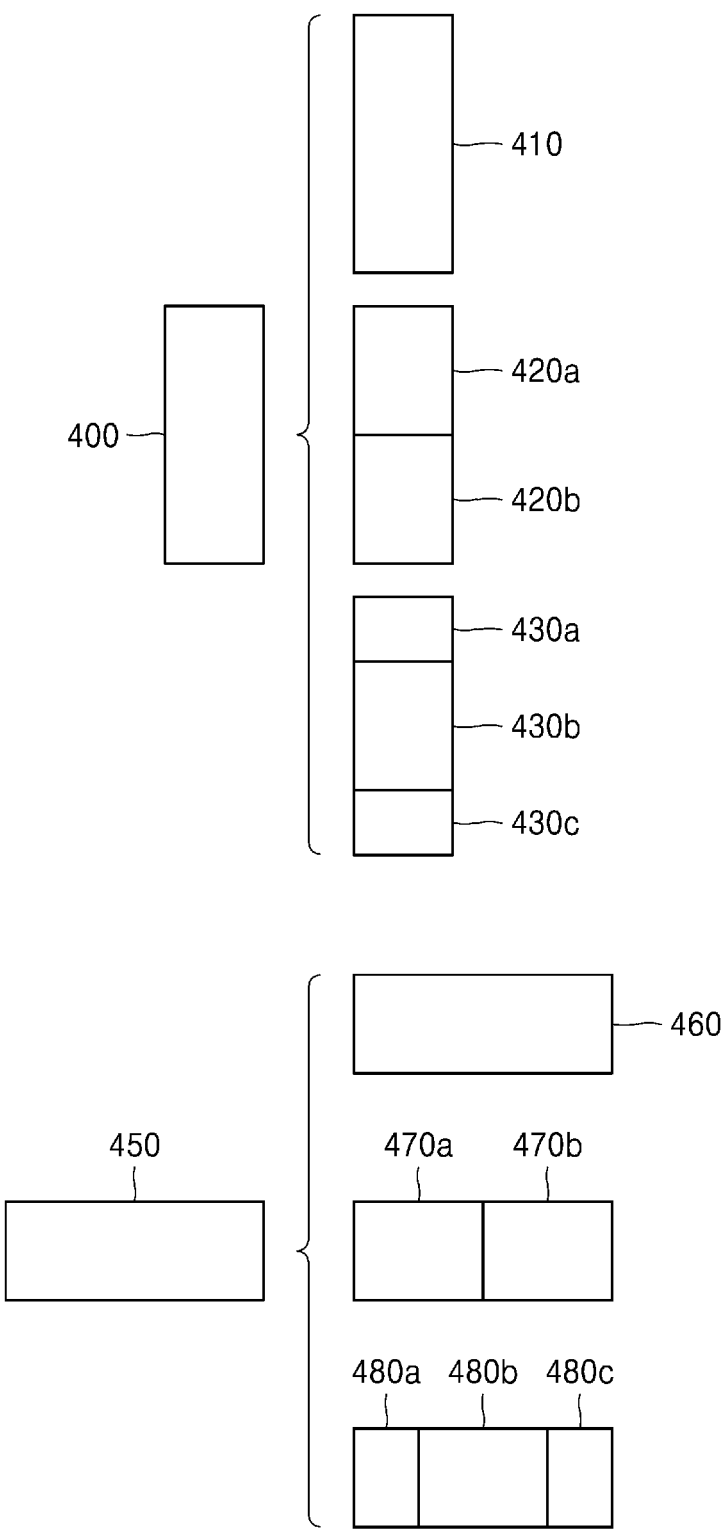
FIG. 4 illustrates a process by which an image decoding apparatus determines at least one coding unit by splitting a non-square coding unit, according to an embodiment.

FIG. 4 illustrates a process by which the image decoding apparatus 100 determines at least one coding unit by splitting a non-square coding unit, according to an embodiment.

According to an embodiment, the image decoding apparatus 100 may use block shape information indicating that a current coding unit has a non-square shape. The image decoding apparatus 100 may determine, according to split shape mode information, whether not to split the non-square current coding unit or whether to split the non-square current coding unit by using a certain method. Referring to FIG. 4, when the block shape information of a current coding unit 400 or 450 indicates a non-square shape, the image decoding apparatus 100 may determine a coding unit 410 or 460 having the same size as the current coding unit 400 or 450 based on the split shape mode information indicating not to perform splitting, or may determine coding units 420a and 420b, 430a to 430c, 470a and 470b, or 480a to 480c split based on the split shape mode information indicating a certain splitting method. Certain splitting methods of splitting a non-square coding unit will be described in detail below through various embodiments.

According to an embodiment, the image decoding apparatus 100 may determine a splitting method of a coding unit by using the split shape mode information and, in this case, the split shape mode information may indicate the number of one or more coding units generated by splitting the coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450 by splitting the current coding unit 400 or 450 based on the split shape mode information.

According to an embodiment, when the image decoding apparatus 100 splits the non-square current coding unit 400 or 450 based on the split shape mode information, a location of a long side of the non-square current coding unit 400 or 450 may be considered. For example, the image decoding apparatus 100 may determine a plurality of coding units by splitting the long side of the current coding unit 400 or 450, in consideration of a shape of the current coding unit 400 or 450.

According to an embodiment, when the split shape mode information indicates to split (ternary split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio between a width and a height of the current coding unit 400 or 450 may be 4:1 or 1:4. When the ratio between the width and the height is 4:1, a length of the width is greater than a length of the height, and thus the block shape information may be horizontal. When the ratio between the width and the height is 1:4, a length of the width is less than a length of the height, and thus the block shape information may be vertical. The image decoding apparatus 100 may determine to split the current coding unit 400 or 450 into an odd number of blocks based on the split shape mode information. Also, the image decoding apparatus 100 may determine a split direction of the current coding unit 400 or 450 based on the block shape information of the current coding unit 400 or 450. For example, when the current coding unit 400 is in a vertical direction, the image decoding apparatus 100 may determine the coding units 430a, 430b, and 430c by horizontally splitting the current coding unit 400. Also, when the current coding unit 450 is in a horizontal direction, the image decoding apparatus 100 may determine the coding units 480a, 480b, and 480c by vertically splitting the current coding unit 450.

According to an embodiment, the image decoding apparatus 100 may determine an odd number of coding units included in the current coding unit 400 or 450, and sizes of all of the determined coding units may not be the same. For example, a certain coding unit 430b or 480b from among the determined odd number of coding units 430a, 430b, and 430c, or 480a, 480b, and 480c may have a size different from sizes of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into an odd number of blocks, the image decoding apparatus 100 may determine an odd number of coding units included in the current coding unit 400 or 450, and may put a certain restriction on at least one coding unit from among the odd number of coding units generated by splitting the current coding unit 400 or 450. Referring to FIG. 4, the image decoding apparatus 100 may allow a decoding process of the coding unit 430b or 480b to be different from that of the other coding units 430a and 430c, or 480a and 480c, wherein the coding unit 430b or 480b is at a center location from among the three coding units 430a, 430b, and 430c, or 480a, 480b, and 480c generated by splitting the current coding unit 400 or 450. For example, the image decoding apparatus 100 may restrict the coding unit 430b or 480b at the center location to be no longer split or to be split only a certain number of times, unlike the other coding units 430a and 430c, or 480a and 480c.

Figure 5:
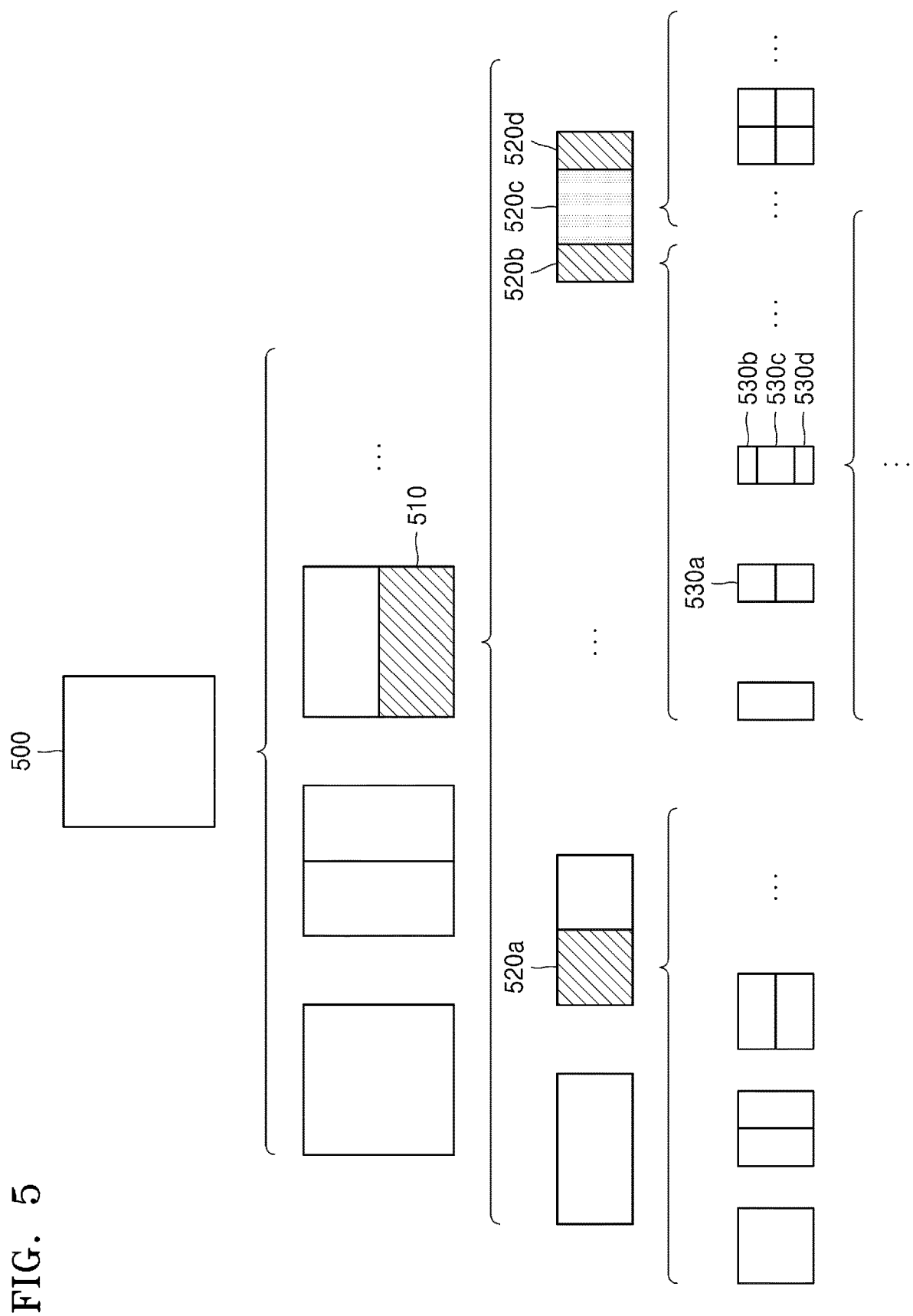
FIG. 5 illustrates a process by which an image decoding apparatus splits a coding unit based on at least one of block shape information and split shape mode information, according to an embodiment.

FIG. 5 illustrates a process by which the image decoding apparatus 100 splits a coding unit based on at least one of block shape information and split shape mode information, according to an embodiment.

According to an embodiment, the image decoding apparatus 100 may determine to split or not to split a square first coding unit 500 into coding units based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, the second coding unit may be determined by splitting the first coding unit, and the third coding unit may be determined by splitting the second coding unit. It will be understood that a relationship among the first coding unit, the second coding unit, and the third coding unit applies to the following descriptions.

According to an embodiment, the image decoding apparatus 100 may determine to split or not to split the determined second coding unit 510 into coding units, based on the split shape mode information. Referring to FIG. 5, the image decoding apparatus 100 may or may not split the non-square second coding unit 510, which is determined by splitting the first coding unit 500, into one or more third coding units 520*a*, or 520*b*, 520*c*, and 520*d* based on the split shape mode information. The image decoding apparatus 100 may obtain the split shape mode information, and may split a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units 520*a*, or 520*b*, 520*c*, and 520*d* based on the split shape mode information of the second coding unit 510. That is, a coding unit may be recursively split based on the split shape mode information of each coding unit. Accordingly, a square coding unit may be determined by splitting a non-square coding unit, and a non-square coding unit may be determined by recursively splitting the square coding unit.

Referring to FIG. 5, a certain coding unit (e.g., a coding unit at a center location or a square coding unit) from among an odd number of third coding units 520*b*, 520*c*, and 520*d* determined by splitting the non-square second coding unit 510 may be recursively split. According to an embodiment, the square third coding unit 520*c* from among the odd number of third coding units 520*b*, 520*c*, and 520*d* may be split in a horizontal direction into a plurality of fourth coding units. A non-square fourth coding unit 530*b* or 530*d* from among a plurality of fourth coding units 530*a*, 530*b*, 530*c*, and 530*d* may be split again into a plurality of coding units. For example, the non-square fourth coding unit 530*b* or 530*d* may be split again into an odd number of coding units. A method that may be used to recursively split a coding unit will be described below through various embodiments.

According to an embodiment, the image decoding apparatus 100 may split each of the third coding units 520*a*, or 520*b*, 520*c*, and 520*d* into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520*b*, 520*c*, and 520*d*. The image decoding apparatus 100 may put a certain restriction on a certain third coding unit from among the odd number of third coding units 520*b*, 520*c*, and 520*d*. For example, the image decoding apparatus 100 may restrict the third coding unit 520*c* at a center location from among the odd number of third coding units 520*b*, 520*c*, and 520*d* to be no longer split or to be split a settable number of times.

Referring to FIG. 5, the image decoding apparatus 100 may restrict the third coding unit 520*c*, which is at the center location from among the odd number of third coding units 520*b*, 520*c*, and 520*d* included in the non-square second coding unit 510, to be no longer split, to be split by using a certain splitting method (e.g., split into only four coding units or split by using a splitting method of the second coding unit 510), or to be split only a certain number of times (e.g., split only n times (where n>0)). However, the restrictions on the third coding unit 520*c* at the center location are not limited to the above-described examples, and may include various restrictions for decoding the third coding unit 520*c* at the center location differently from the other third coding units 520*b* and 520*d*.

According to an embodiment, the image decoding apparatus 100 may obtain the split shape mode information, which is used to split a current coding unit, from a certain location in the current coding unit.

Figure 6:
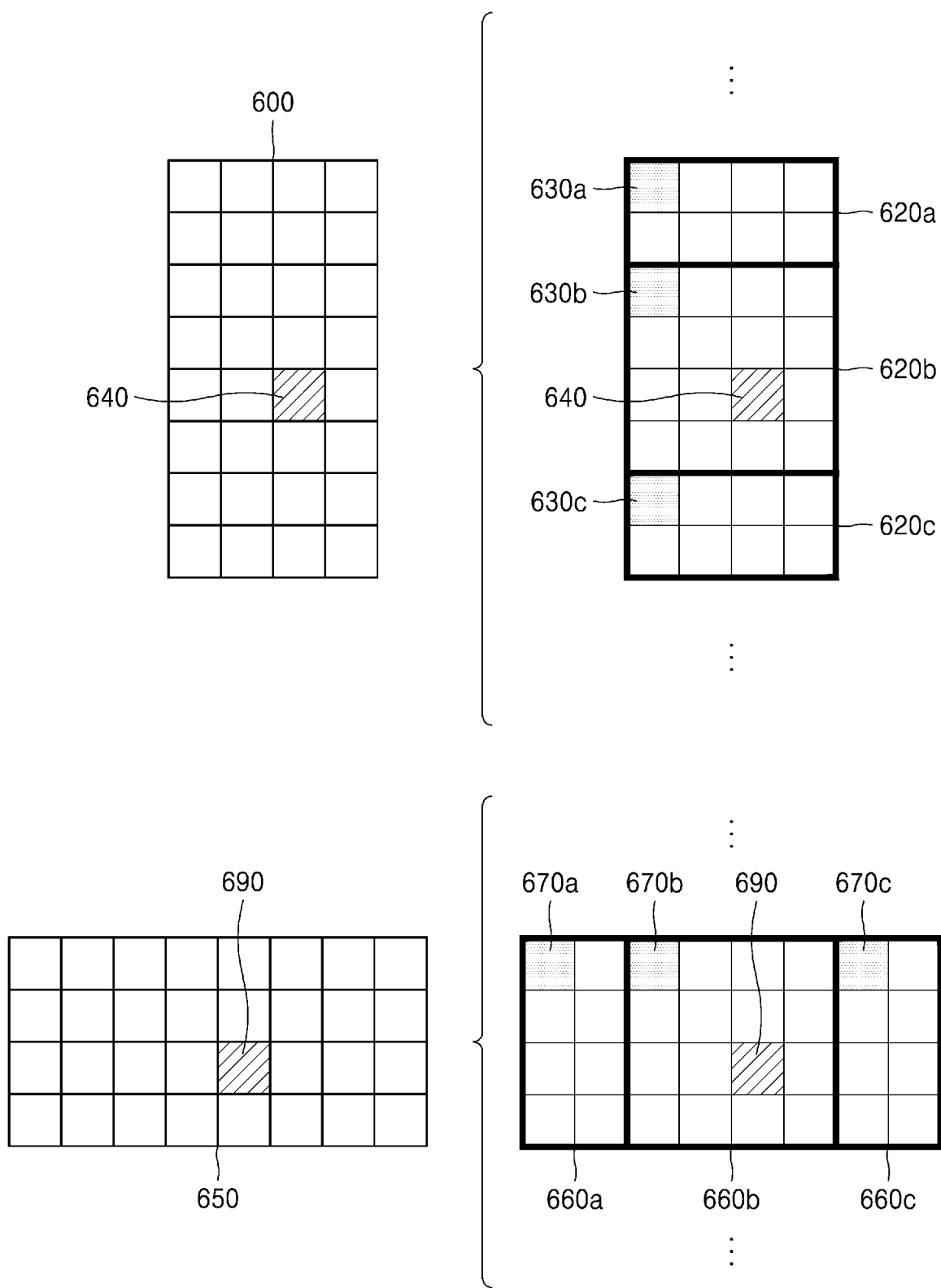
FIG. 6 illustrates a method by which an image decoding apparatus determines a certain coding unit from among an odd number of coding units, according to an embodiment.

FIG. 6 illustrates a method by which the image decoding apparatus 100 determines a certain coding unit from among an odd number of coding units, according to an embodiment.

Referring to FIG. 6, split shape mode information of a current coding unit 600 or 650 may be obtained from a sample of a certain location (e.g., a sample 640 or 690 of a center location) from among a plurality of samples included in the current coding unit 600 or 650. However, the certain location in the current coding unit 600, from which at least one of the split shape mode information may be obtained, is not limited to the center location in FIG. 6, and may include various locations (e.g., top, bottom, left, right, top left, bottom left, top right, and bottom right locations) included in the current coding unit 600. The image decoding apparatus 100 may obtain the split shape mode information from the certain location and may determine to split or not to split the current coding unit into various-shaped and various-sized coding units.

According to an embodiment, when the current coding unit is split into a certain number of coding units, the image decoding apparatus 100 may select one of the coding units. Various methods that may be used to select one of a plurality of coding units will be described below through various embodiments.

According to an embodiment, the image decoding apparatus 100 may split the current coding unit into a plurality of coding units, and may determine a coding unit at a certain location.

According to an embodiment, the image decoding apparatus 100 may use information indicating locations of an odd number of coding units to determine a coding unit at a center location from among the odd number of coding units. Referring to FIG. 6, the image decoding apparatus 100 may determine an odd number of coding units 620*a*, 620*b*, and 620*c* or an odd number of coding units 660*a*, 660*b*, and 660*c* by splitting the current coding unit 600 or the current coding unit 650. The image decoding apparatus 100 may determine the coding unit 620*b* at a center location or the coding unit 660*b* at a center location by using information about locations of the odd number of coding units 620*a*, 620*b*, and 620*c* or the odd number of coding units 660*a*, 660*b*, and 660*c*. For example, the image decoding apparatus 100 may determine the coding unit 620*b* of the center location by determining the locations of the coding units 620*a*, 620*b*, and 620*c* based on information indicating locations of certain samples included in the coding units 620*a*, 620*b*, and 620*c*. In detail, the image decoding apparatus 100 may determine the coding unit 620*b* at the center location by determining the locations of the coding units 620*a*, 620*b*, and 620*c* based on information indicating locations of top left samples 630*a*, 630*b*, and 630*c* of the coding units 620*a*, 620*b*, and 620*c*.

According to an embodiment, the information indicating the locations of the top left samples 630*a*, 630*b*, and 630*c*, which are included in the coding units 620*a*, 620*b*, and 620*c*, respectively, may include information about locations or coordinates of the coding units 620*a*, 620*b*, and 620*c* in a picture. According to an embodiment, the information indicating the locations of the top left samples 630*a*, 630*b*, and 630*c*, which are included in the coding units 620*a*, 620*b*, and 620*c*, respectively, may include information indicating widths or heights of the coding units 620*a*, 620*b*, and 620*c* included in the current coding unit 600, and the widths or heights may correspond to information indicating differences between the coordinates of the coding units 620*a*, 620*b*, and 620*c* in the picture. That is, the image decoding apparatus 100 may determine the coding unit 620*b* at the center location by directly using the information about the locations or coordinates of the coding units 620*a*, 620*b*, and 620*c* in the picture, or by using the information about the widths or heights of the coding units, which correspond to the differences between the coordinates.

According to an embodiment, information indicating the location of the top left sample 630*a* of the upper coding unit 620*a* may include coordinates (xa, ya), information indicating the location of the top left sample 630*b* of the middle coding unit 620*b* may include coordinates (xb, yb), and information indicating the location of the top left sample 630*c* of the lower coding unit 620*c* may include coordinates (xc, yc). The image decoding apparatus 100 may determine the middle coding unit 620*b* by using the coordinates of the top left samples 630*a*, 630*b*, and 630*c* which are included in the coding units 620*a*, 620*b*, and 620*c*, respectively. For example, when the coordinates of the top left samples 630*a*, 630*b*, and 630*c* are sorted in an ascending or descending order, the coding unit 620*b* including the coordinates (xb, yb) of the sample 630*b* at a center location may be determined as a coding unit at a center location from among the coding units 620*a*, 620*b*, and 620*c* determined by splitting the current coding unit 600. However, the coordinates indicating the locations of the top left samples 630*a*, 630*b*, and 630*c* may include coordinates indicating absolute locations in the picture, or may use coordinates (dxb, dyb) indicating a relative location of the top left sample 630*b* of the middle coding unit 620*b* and coordinates (dxc, dyc) indicating a relative location of the top left sample 630*c* of the lower coding unit 620*c*, with reference to the location of the top left sample 630*a* of the upper coding unit 620*a*. Also, a method of determining a coding unit at a certain location by using coordinates of a sample included in the coding unit as information indicating a location of the sample is not limited to the above-described method, and may include various arithmetic methods capable of using the coordinates of the sample.

According to an embodiment, the image decoding apparatus 100 may split the current coding unit 600 into a plurality of coding units 620*a*, 620*b*, and 620*c*, and may select one of the coding units 620*a*, 620*b*, and 620*c* based on a certain criterion. For example, the image decoding apparatus 100 may select the coding unit 620*b*, which has a size different from that of the others, from among the coding units 620*a*, 620*b*, and 620*c*.

According to an embodiment, the image decoding apparatus 100 may determine the widths or heights of the coding units 620*a*, 620*b*, and 620*c* by using the coordinates (xa, ya) indicating the location of the top left sample 630*a* of the upper coding unit 620*a*, the coordinates (xb, yb) indicating the location of the top left sample 630*b* of the middle coding unit 620*b*, and the coordinates (xc, yc) indicating the location of the top left sample 630*c* of the lower coding unit 620*c*. The image decoding apparatus 100 may determine the respective sizes of the coding units 620*a*, 620*b*, and 620*c* by using the coordinates (xa, ya), (xb, yb), and (xc, yc) indicating the locations of the coding units 620*a*, 620*b*, and 620*c*. According to an embodiment, the image decoding apparatus 100 may determine the width of the upper coding unit 620*a* to be a width of the current coding unit 600. The image decoding apparatus 100 may determine the height of the upper coding unit 620*a* to be yb-ya. According to an embodiment, the image decoding apparatus 100 may determine the width of the middle coding unit 620*b* to be a width of the current coding unit 600. The image decoding apparatus 100 may determine the height of the middle coding unit 620*b* to be yc-yb. According to an embodiment, the image decoding apparatus 100 may determine the width or height of the lower coding unit 620*c* by using the width or height of the current coding unit 600 and the widths or heights of the upper and middle coding units 620*a* and 620*b*. The image decoding apparatus 100 may determine a coding unit, which has a size different from that of the others, based on the determined widths and heights of the coding units 620*a* to 620*c*. Referring to FIG. 6, the image decoding apparatus 100 may determine the middle coding unit 620*b*, which has a size different from the size of the upper and lower coding units 620*a* and 620*c*, as the coding unit of the certain location. However, the above-described process by which the image decoding apparatus 100 determines a coding unit having a size different from that of the other coding units merely corresponds to an example of determining a coding unit at a certain location by using the sizes of coding units, which are determined based on coordinates of samples, and thus various processes of determining a coding unit at a certain location by comparing the sizes of coding units, which are determined based on coordinates of certain samples, may be used.

The image decoding apparatus 100 may determine a width or a height of each of the coding units 660*a*, 660*b*, and 660*c* by using coordinates (xd, yd) that are information indicating a location of a top left sample 670*a* of the left coding unit 660*a*, coordinates (xe, ye) that are information indicating a location of a top left sample 670*b* of the middle coding unit 660*b*, and coordinates (xf, yf) that are information indicating a location of a top left sample 670*c* of the right coding unit 660*c*. The image decoding apparatus 100 may determine sizes of the coding units 660*a*, 660*b*, and 660*c* by using the coordinates (xd, yd), (xe, ye), and (xf, yf) indicating the locations of the coding units 660*a*, 660*b*, and 660*c*.

According to an embodiment, the image decoding apparatus 100 may determine the width of the left coding unit 660*a* to be xe-xd. The image decoding apparatus 100 may determine the height of the left coding unit 660*a* to be the height of the current coding unit 650. According to an embodiment, the image decoding apparatus 100 may determine the width of the middle coding unit 660*b* to be xf-xe. The image decoding apparatus 100 may determine the height of the middle coding unit 660*b* to be the height of the current coding unit 650. According to an embodiment, the image decoding apparatus 100 may determine the width or the height of the right coding unit 660*c* by using the width or the height of the current coding unit 650 and the widths and the heights of the left coding unit 660*a* and the middle coding unit 660*b*. The image decoding apparatus 100 may determine a coding unit, which has a size different from that of the others, based on the determined widths and heights of the coding units 660*a*, 660*b*, and 660*c*. Referring to FIG. 6, the image decoding apparatus 100 may determine the middle coding unit 660*b*, which has a size different from that of the left coding unit 660*a* and the right coding unit 660*c*, as the coding unit of the certain location. However, the above-described process by which the image decoding apparatus 100 determines a coding unit having a size different from the size of the other coding units merely corresponds to an example of determining a coding unit at a certain location by using the sizes of coding units, which are determined based on coordinates of samples, and thus various processes of determining a coding unit at a certain location by comparing the sizes of coding units, which are determined based on coordinates of certain samples, may be used.

However, locations of samples considered to determine locations of coding units are not limited to the above-described top left locations, and information about arbitrary locations of samples included in the coding units may be used.

According to an embodiment, the image decoding apparatus 100 may select a coding unit at a certain location from among an odd number of coding units determined by splitting the current coding unit, considering the shape of the current coding unit. For example, when the current coding unit has a non-square shape, a width of which is longer than a height, the image decoding apparatus 100 may determine the coding unit at the certain location in a horizontal direction. That is, the image decoding apparatus 100 may determine one of coding units at different locations in a horizontal direction and may put a restriction on the coding unit. When the current coding unit has a non-square shape, a height of which is longer than a width, the image decoding apparatus 100 may determine the coding unit at the certain location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the certain location from among the even number of coding units. The image decoding apparatus 100 may determine an even number of coding units by splitting (binary splitting) the current coding unit, and may determine the coding unit at the certain location by using the information about the locations of the even number of coding units. An operation related thereto may correspond to the operation of determining a coding unit at a certain location (e.g., a center location) from among an odd number of coding units, which has been described in detail above with reference to FIG. 6, and thus detailed descriptions thereof will be omitted.

According to an embodiment, when a non-square current coding unit is split into a plurality of coding units, certain information about a coding unit at a certain location may be used in a splitting operation to determine the coding unit at the certain location from among the plurality of coding units. For example, the image decoding apparatus 100 may use at least one of block shape information and split shape mode information, which is stored in a sample included in a coding unit at a center location, in a splitting operation to determine the coding unit at the center location from among the plurality of coding units determined by splitting the current coding unit.

Referring to FIG. 6, the image decoding apparatus 100 may split the current coding unit 600 into the plurality of coding units 620*a*, 620*b*, and 620*c* based on the split shape mode information, and may determine the coding unit 620*b* at a center location from among the plurality of the coding units 620*a*, 620*b*, and 620*c*. Furthermore, the image decoding apparatus 100 may determine the coding unit 620*b* at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620*a*, 620*b*, and 620*c* based on the split shape mode information, the coding unit 620*b* including the sample 640 may be determined as the coding unit at the center location. However, information used to determine the coding unit at the center location is not limited to the split shape mode information, and various kinds of information may be used to determine the coding unit at the center location.

According to an embodiment, certain information for identifying the coding unit at the certain location may be obtained from a certain sample included in a coding unit to be determined. Referring to FIG. 6, the image decoding apparatus 100 may use the split shape mode information, which is obtained from a sample at a certain location in the current coding unit 600 (e.g., a sample at a center location of the current coding unit 600) to determine a coding unit at a certain location from among the plurality of the coding units 620*a*, 620*b*, and 620*c* determined by splitting the current coding unit 600 (e.g., a coding unit at a center location from among a plurality of split coding units). That is, the image decoding apparatus 100 may determine the sample at the certain location by considering a block shape of the current coding unit 600, may determine the coding unit 620*b* including a sample, from which certain information (e.g., the split shape mode information) may be obtained, from among the plurality of coding units 620*a*, 620*b*, and 620*c* determined by splitting the current coding unit 600, and may put a certain restriction on the coding unit 620*b*. Referring to FIG. 6, according to an embodiment, the image decoding apparatus 100 may determine the sample 640 at the center location of the current coding unit 600 as the sample from which the certain information may be obtained, and may put a certain restriction on the coding unit 620*b* including the sample 640, in a decoding operation. However, the location of the sample from which the certain information may be obtained is not limited to the above-described location, and may include arbitrary locations of samples included in the coding unit 620*b* to be determined for a restriction.

According to an embodiment, the location of the sample from which the certain information may be obtained may be determined based on the shape of the current coding unit 600. According to an embodiment, the block shape information may indicate whether the current coding unit has a square or non-square shape, and the location of the sample from which the certain information may be obtained may be determined based on the shape. For example, the image decoding apparatus 100 may determine a sample located on a boundary for dividing at least one of a width and height of the current coding unit in half, as the sample from which the certain information may be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for dividing a long side of the current coding unit in half, as the sample from which the certain information may be obtained.

According to an embodiment, when the current coding unit is split into a plurality of coding units, the image decoding apparatus 100 may use the split shape mode information to determine a coding unit at a certain location from among the plurality of coding units. According to an embodiment, the image decoding apparatus 100 may obtain the split shape mode information from a sample at a certain location in a coding unit, and may split the plurality of coding units, which are generated by splitting the current coding unit, by using the split shape mode information, which is obtained from the sample of the certain location in each of the plurality of coding units. That is, a coding unit may be recursively split based on the split shape mode information, which is obtained from the sample at the certain location in each coding unit. An operation of recursively splitting a coding unit has been described above with reference to FIG. 5, and thus detailed descriptions thereof will be omitted.

According to an embodiment, the image decoding apparatus 100 may determine one or more coding units by splitting the current coding unit, and may determine an order of decoding the one or more coding units based on a certain block (e.g., the current coding unit).

Figure 7:
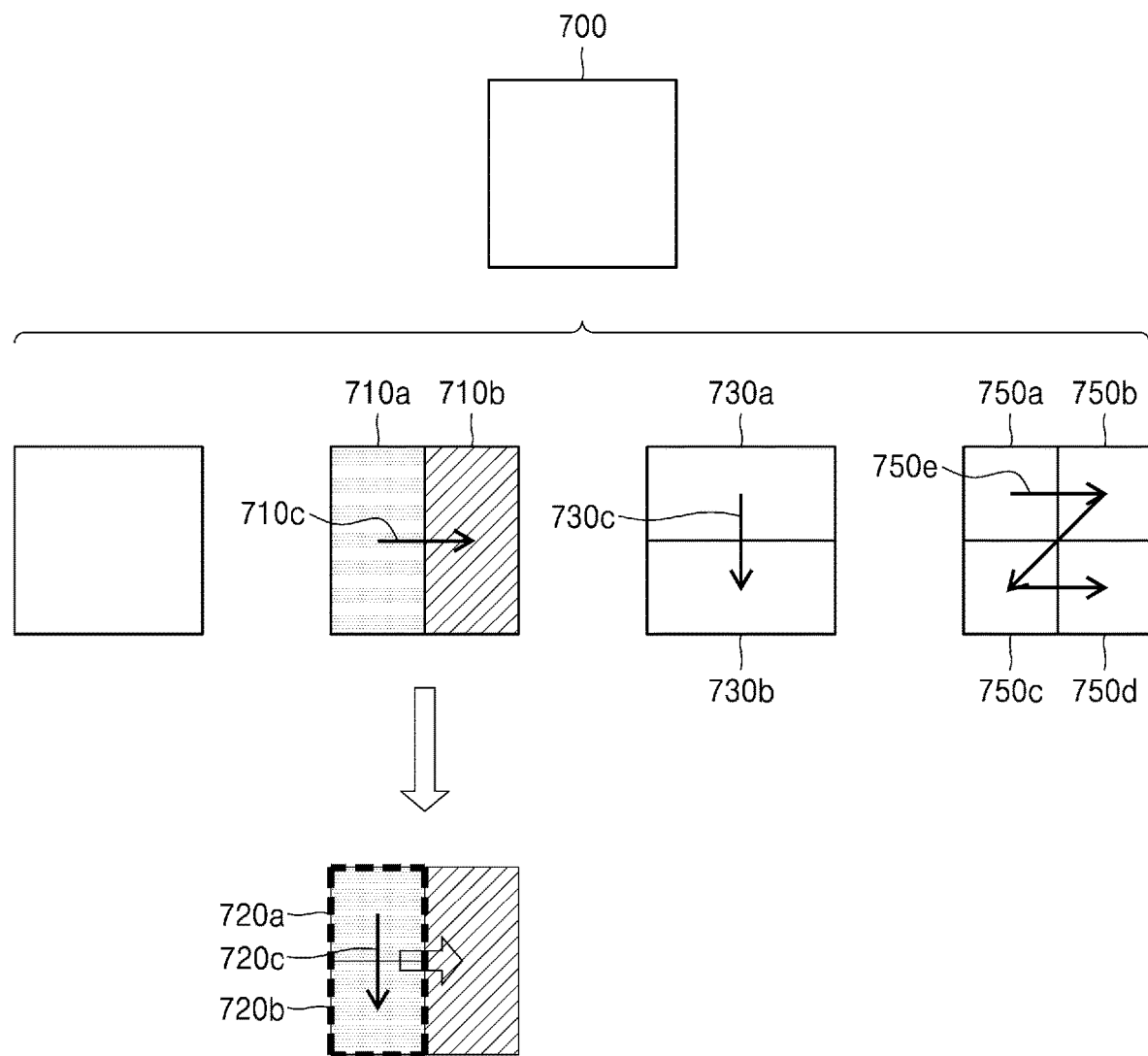
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, may determine second coding units 730a and 730b by splitting the first coding unit 700 in a horizontal direction, or may determine second coding units 750a to 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 1400 in a horizontal direction, in a vertical direction order 730c. The image decoding apparatus 100 may determine to process the second coding units 750a to 750d, which are determined by splitting the first coding unit 700 in vertical and horizontal directions, in a certain order (e.g., in a raster scan order or Z-scan order 750e) for processing coding units in a row and then processing coding units in a next row.

According to an embodiment, the image decoding apparatus 100 may recursively split coding units. Referring to FIG. 7, the image decoding apparatus 100 may determine the plurality of second coding units 710a, 710b, 730a, 730b, 750a, 750b, 750c, and 750d by splitting the first coding unit 700, and may recursively split each of the determined plurality of second coding units 710a, 710b, 730a, 730b, 750a, 750b, 750c, and 750d. A splitting method of the plurality of second coding units 710a, 710b, 730a, 730b, 750a, 750b, 750c, and 750d may correspond to a splitting method of the first coding unit 700. As such, each of the plurality of second coding units 710a, 710b, 730a, 730b, 750a, 750b, 750c, and 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a certain order.

Figure 8:
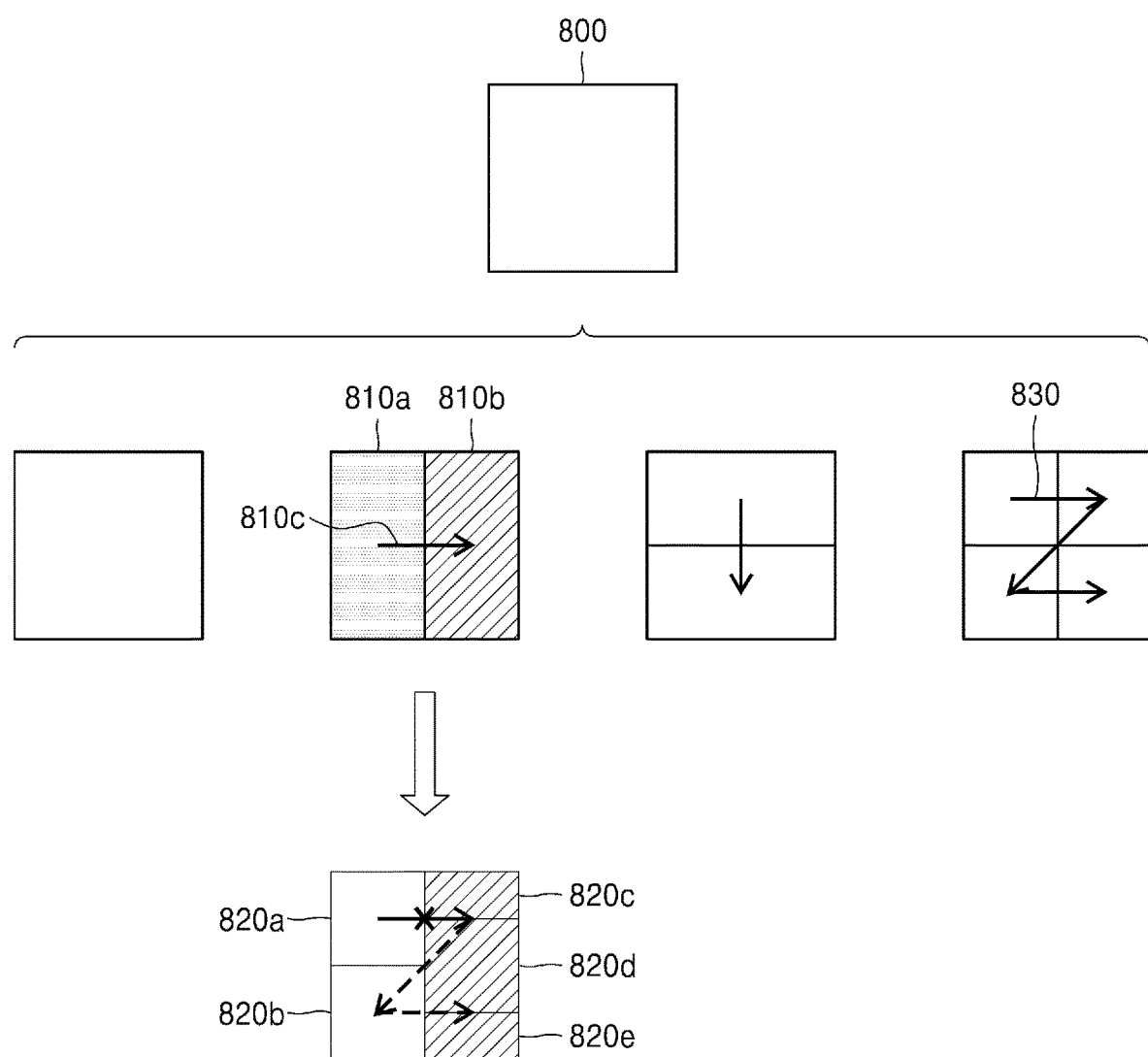
FIG. 8 illustrates a process by which an image decoding apparatus determines that a current coding unit is split into an odd number of coding units when the coding units are not processable in a certain order, according to an embodiment.

FIG. 8 illustrates a process by which the image decoding apparatus 100 determines that a current coding unit is split into an odd number of coding units when the coding units are not processable in a certain order, according to an embodiment.

According to an embodiment, the image decoding apparatus 100 may determine whether the current coding unit is split into an odd number of coding units based on obtained split shape mode information. Referring to FIG. 8, a square first coding unit 800 may be split into non-square second coding units 810a and 810b, and the second coding units 810a and 810b may be independently split into third coding units 820a and 820b, and 820c to 820e. According to an embodiment, the image decoding apparatus 100 may determine the plurality of third coding units 820a and 820b by splitting the left second coding unit 810a in a horizontal direction, and may split the right second coding unit 810b into an odd number of third coding units 820c to 820e.

According to an embodiment, the image decoding apparatus 100 may determine whether any coding unit is split into an odd number of coding units, by determining whether the third coding units 820a and 820b, and 820c to 820e are processable in a certain order. Referring to FIG. 8, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, and the third coding units 820a and 820b, and 820c, 820d, and 820e is split into an odd number of coding units, based on at least one of block shape information and split shape mode information. For example, the right second coding unit 810b may be split into an odd number of third coding units 820c, 820d, and 820e. A processing order of a plurality of coding units included in the first coding unit 800 may be a certain order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the certain order.

According to an embodiment, the image decoding apparatus 100 may determine whether the third coding units 820a and 820b, and 820c, 820d, and 820e included in the first coding unit 800 satisfy the condition for processing in the certain order, and the condition relates to whether at least one of a width and a height of the second coding units 810a and 810b is divided in half along a boundary of the third coding units 820a and 820b, and 820c, 820d, and 820e. For example, the third coding units 820a and 820b determined by dividing the height of the non-square left second coding unit 810a in half may satisfy the condition. However, because boundaries of the third coding units 820c, 820d, and 820e determined by splitting the right second coding unit 810b into three coding units do not divide the width or height of the right second coding unit 810b in half, it may be determined that the third coding units 820c, 820d, and 820e do not satisfy the condition. When the condition is not satisfied as described above, the image decoding apparatus 100 may decide disconnection of a scan order, and may determine that the right second coding unit 810b is split into an odd number of coding units, based on a result of the decision. According to an embodiment, when a coding unit is split into an odd number of coding units, the image decoding apparatus 100 may put a certain restriction on a coding unit at a certain location among the split coding units, and the restriction or the certain location has been described above through various embodiments and thus detailed descriptions thereof will be omitted.

Figure 9:
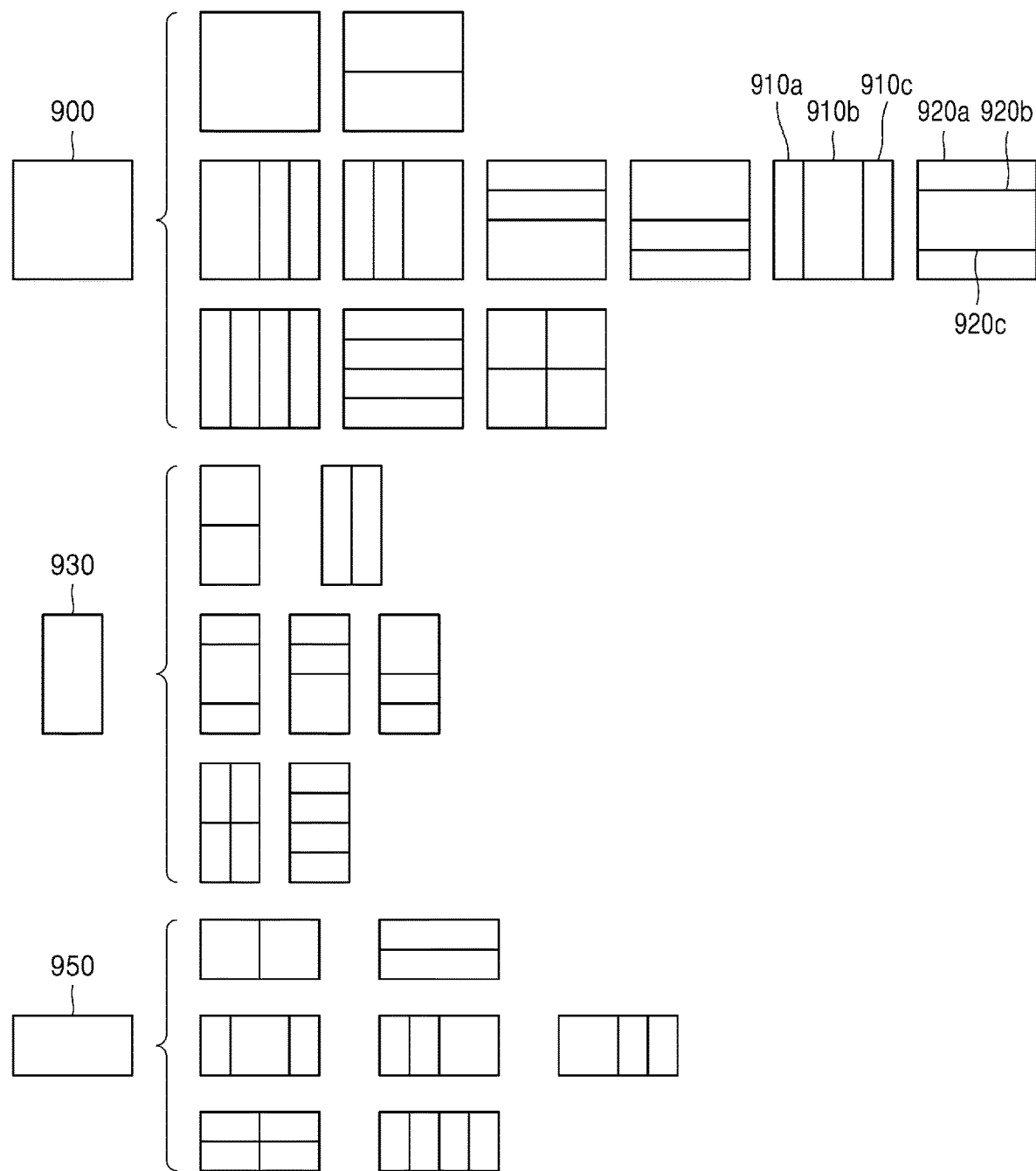
FIG. 9 illustrates a process by which an image decoding apparatus determines at least one coding unit by splitting a first coding unit, according to an embodiment.

FIG. 9 illustrates a process by which the image decoding apparatus 100 determines at least one coding unit by splitting a first coding unit 900, according to an embodiment.

According to an embodiment, the image decoding apparatus 100 may split the first coding unit 900, based on split shape mode information, which is obtained by the bitstream obtainer 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a certain order, and the condition relates to whether at least one of a width and height of the first coding unit 900 is divided in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not divide the width of the first coding unit 900 in half, it may be determined that the first coding unit 900 does not satisfy the condition for processing in the certain order. Also, because boundaries of the second coding units 920a, 920b, and 920c determined by splitting the square first coding unit 900 in a horizontal direction do not divide the width of the first coding unit 900 in half, it may be determined that the first coding unit 900 does not satisfy the condition for processing in the certain order. When the condition is not satisfied as described above, the image decoding apparatus 100 may decide disconnection of a scan order, and may determine that the first coding unit 900 is split into an odd number of coding units based on a result of the decision. According to an embodiment, when a coding unit is split into an odd number of coding units, the image decoding apparatus 100 may put a certain restriction on a coding unit at a certain location from among the split coding units, and the restriction or the certain location has been described above through various embodiments and thus detailed descriptions thereof will be omitted.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
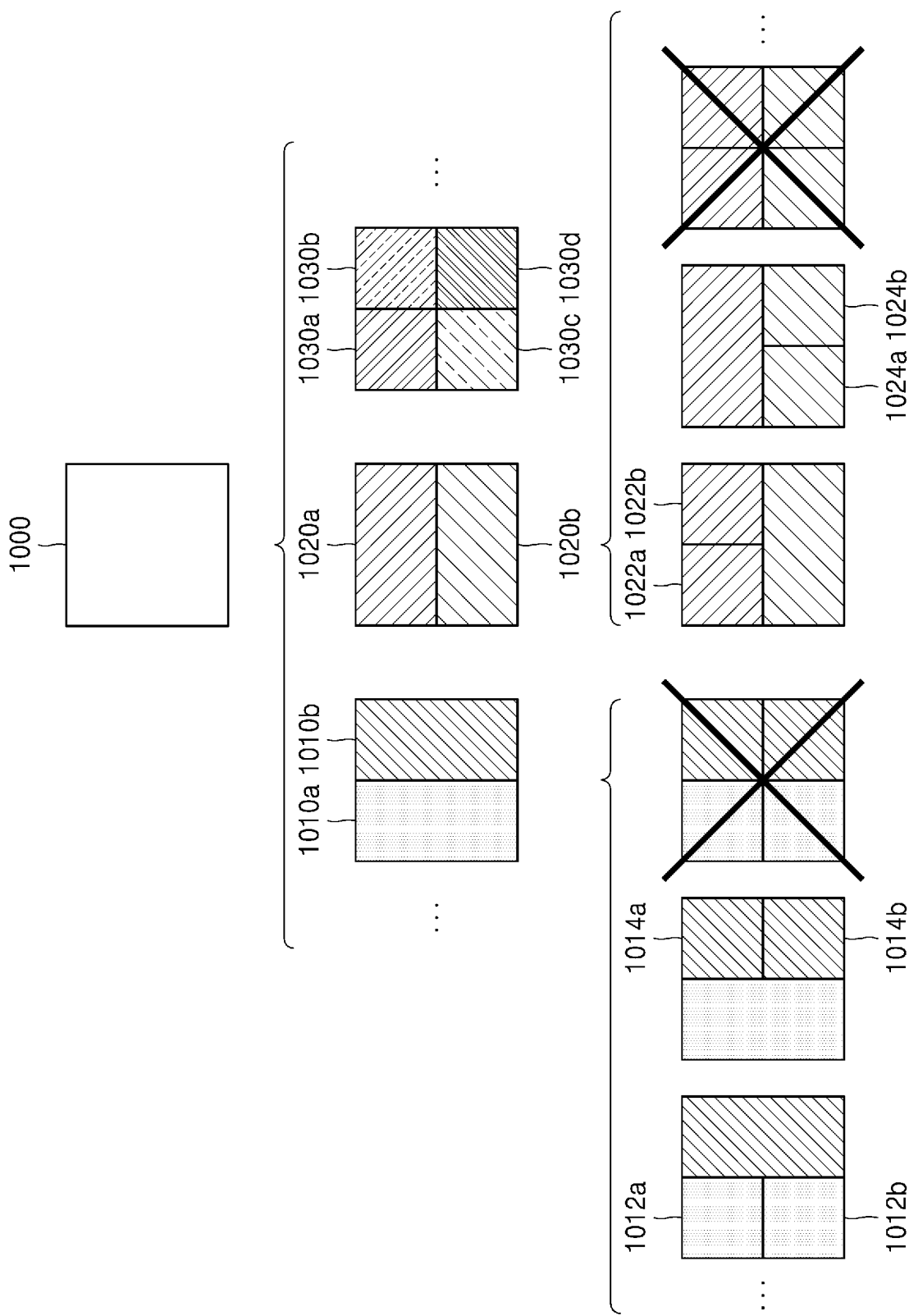
FIG. 10 illustrates that a shape into which a second coding unit is splittable by an image decoding apparatus is restricted when a second coding unit, which is determined by splitting a first coding unit, satisfies a certain condition, according to an embodiment.

FIG. 10 illustrates that a shape into which a second coding unit is splittable by the image decoding apparatus 100 is restricted when a non-square second coding unit, which is determined by splitting a first coding unit 1000, satisfies a certain condition, according to an embodiment.

According to an embodiment, the image decoding apparatus 100 may determine to split the square first coding unit 1000 into non-square second coding units 1010a, 1010b, 1020a, and 1020b, based on split shape mode information, which is obtained by the bitstream obtainer 110. The second coding units 1010a, 1010b, 1020a, and 1020b may be independently split. Accordingly, the image decoding apparatus 100 may determine to split or not to split the first coding unit 1000 into a plurality of coding units, based on the split shape mode information of each of the second coding units 1010a, 1010b, 1020a, and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in the same direction, because the left and right second coding units 1010a and 1010b are independently split in a horizontal direction, the third coding units 1012a, 1012b, 1014a, and 1014b may be determined. However, this case serves equally as a case in which the image decoding apparatus 100 splits the first coding unit 1000 into four square second coding units 1030a, 1030b, 1030c, and 1030d based on the split shape mode information, and may be inefficient in terms of image decoding.

According to an embodiment, the image decoding apparatus 100 may determine third coding units 1022a, 1022b, 1024a, and 1024b by splitting the non-square second coding unit 1020a and/or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) to not be split in a vertical direction in which the upper second coding unit 1020a is split.

Figure 11:
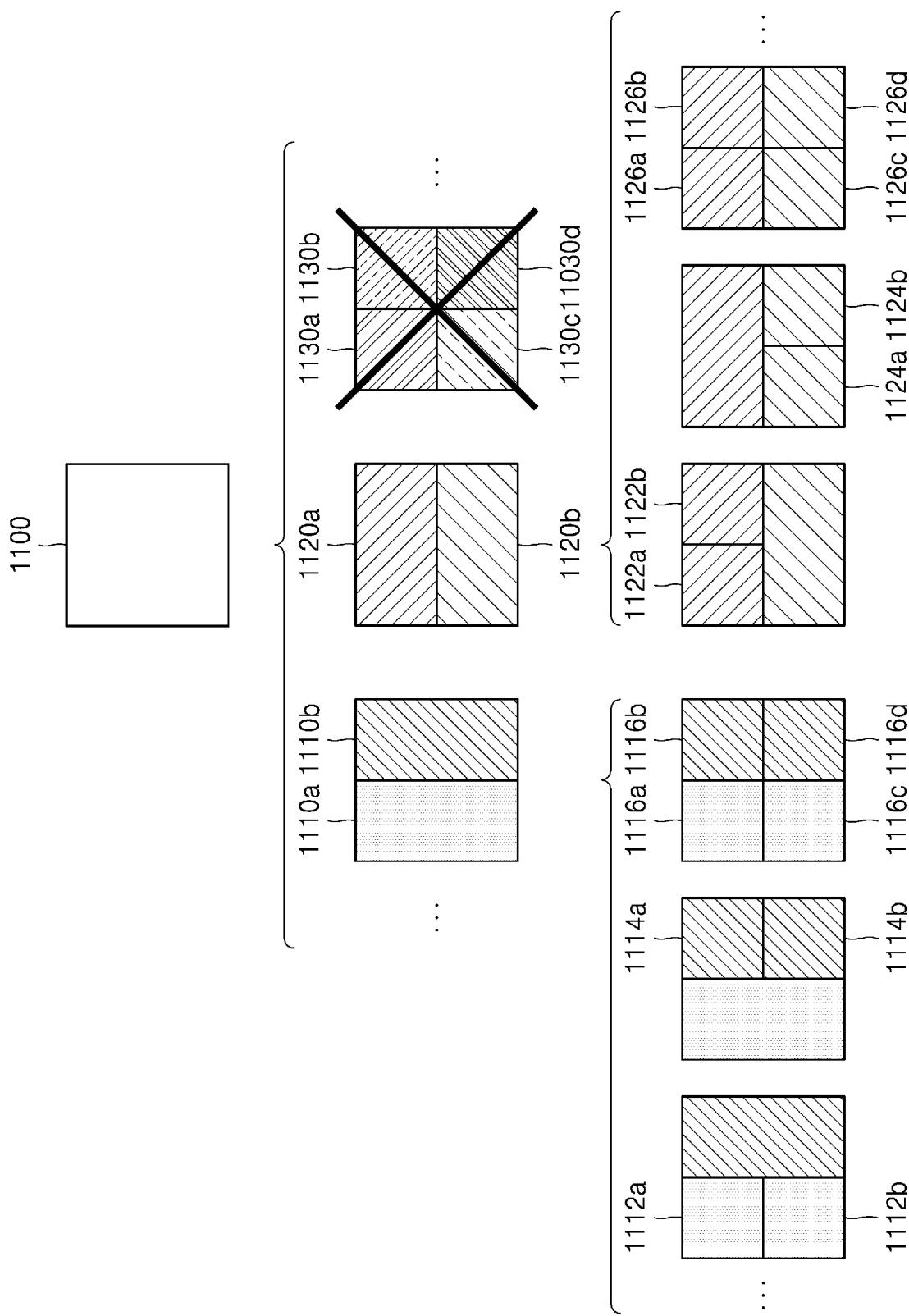
FIG. 11 illustrates a process by which an image decoding apparatus splits a square coding unit when split shape mode information indicates that the square coding unit is not to be split into four square coding units, according to an embodiment.

FIG. 11 illustrates a process by which the image decoding apparatus 100 splits a square coding unit when split shape mode information indicates that the square coding unit is not to be split into four square coding units, according to an embodiment.

According to an embodiment, the image decoding apparatus 100 may determine second coding units 1110a, 1110b, 1120a, 1120b, etc. by splitting a first coding unit 1100 based on split shape mode information. The split shape mode information may include information about various methods of splitting a coding unit, but the information about various splitting methods may not include information for splitting a coding unit into four square coding units. According to such split shape mode information, the image decoding apparatus 100 may not split the first square coding unit 1100 into four square second coding units 1130a, 1130b, 1130c, and 1130d. The image decoding apparatus 100 may determine the non-square second coding units 1110a, 1110b, 1120a, 1120b, etc., based on the split shape mode information.

According to an embodiment, the image decoding apparatus 100 may independently split the non-square second coding units 1110a, 1110b, 1120a, 1120b, etc. Each of the second coding units 1110a, 1110b, 1120a, 1120b, etc. may be recursively split in a certain order, and this splitting method may correspond to a method of splitting the first coding unit 1100 based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
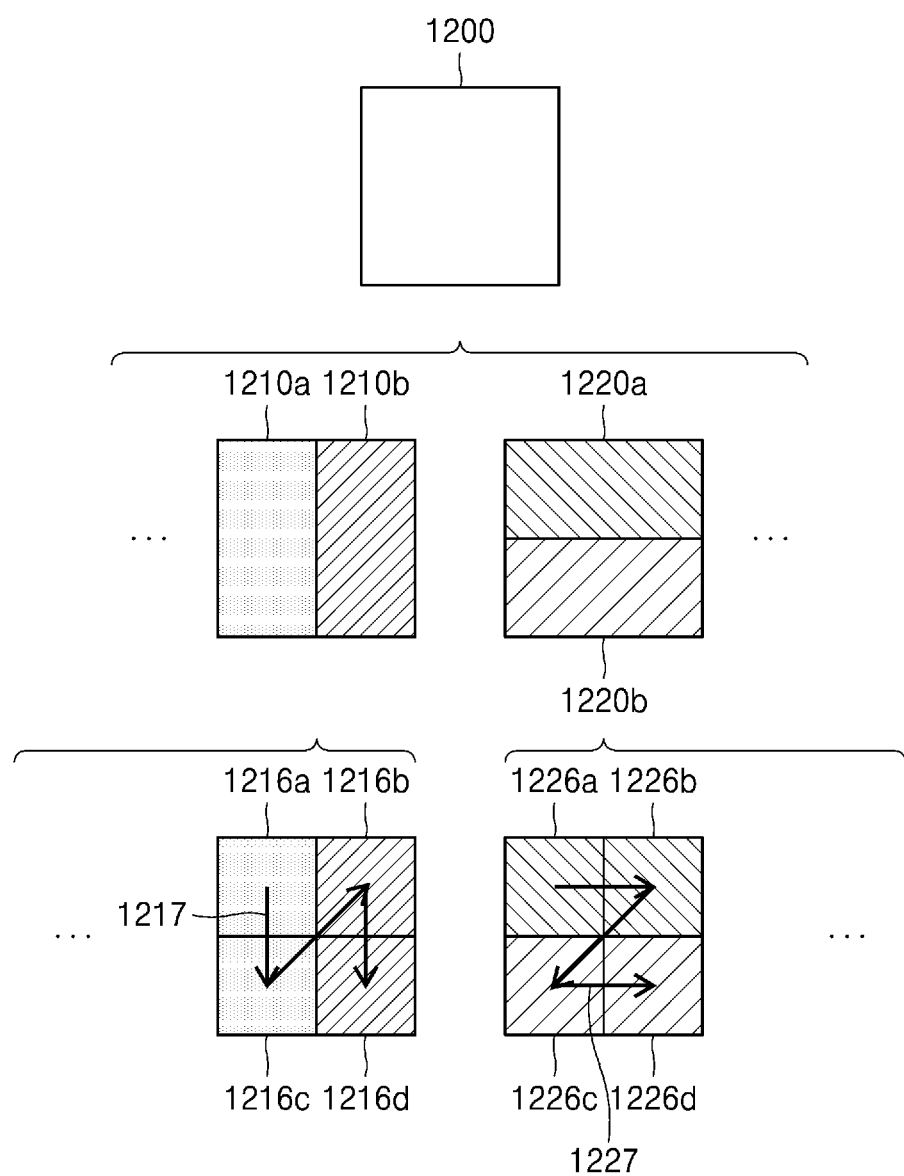
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200 based on split shape mode information. When a block shape is a square shape and the split shape mode information indicates to split the first coding unit 1200 in at least one of horizontal and vertical directions, the image decoding apparatus 100 may determine second coding units 1210a, 1210b, 1220a, 1220b, etc. by splitting the first coding unit 1200. Referring to FIG. 12, the non-square second coding units 1210a, 1210b, 1220a, and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a horizontal direction. An operation of splitting the second coding units 1210a, 1210b, 1220a, and 1220b has been described above with reference to FIG. 11, and thus detailed descriptions thereof will be omitted.

According to an embodiment, the image decoding apparatus 100 may process coding units in a certain order. An operation of processing coding units in a certain order has been described above with reference to FIG. 7, and thus detailed descriptions thereof will be omitted. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a splitting method of the first coding unit 1200.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a, 1210b, 1220a, and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. Accordingly, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and a size of the coding unit change, when the coding unit is recursively split to determine a plurality of coding units, according to an embodiment.

According to an embodiment, the image decoding apparatus 100 may determine the depth of the coding unit, based on a certain criterion. For example, the certain criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a deeper depth.

Referring to FIG. 13, according to an embodiment, the image decoding apparatus 100 may determine a second coding unit 1302, a third coding unit 1304, etc. of deeper depths by splitting a square first coding unit 1300 based on block shape information indicating a square shape (e.g., the block shape information may be expressed as '0: SQUARE'). Assuming that the size of the square first coding unit 1300 is 2N×2N, the second coding unit 1302 determined by dividing a width and a height of the first coding unit 1300 in ½ may have a size of N×N. Furthermore, the third coding unit 1304 determined by dividing a width and a height of the second coding unit 1302 in ½ may have a size of N/2×N/2. In this case, a width and a height of the third coding unit 1304 are ¼ times those of the first coding unit 1300. When a depth of the first coding unit 1300 is D, a depth of the second coding unit 1302, the width and the height of which are ½ times those of the first coding unit 1300, may be D+1, and a depth of the third coding unit 1304, the width and the height of which are ¼ times those of the first coding unit 1300, may be D+2.

According to an embodiment, the image decoding apparatus 100 may determine a second coding unit 1312 or 1322, a third coding unit 1314 or 1324, etc. of deeper depths by splitting a non-square first coding unit 1310 or 1320 based on block shape information indicating a non-square shape (e.g., the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine the second coding unit 1302, 1312, or 1322 by dividing at least one of a width and a height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by dividing at least one of a width and a height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine the third coding unit 1304, 1314, or 1324 by dividing at least one of the width and the height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by dividing at least one of a width and a height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by dividing at least one of a width and a height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of a longest side of a coding unit, a depth of a coding unit determined by splitting the first coding unit 1300 having a size of 2N×2N in a horizontal or vertical direction may be the same as the depth of the first coding unit 1300.

According to an embodiment, a width and a height of the third coding unit 1314 or 1324 may be ¼ times those of the first coding unit 1310 or 1320. When a depth of the first coding unit 1310 or 1320 is D, a depth of the second coding unit 1312 or 1322, the width and the height of which are ½ times those of the first coding unit 1310 or 1320, may be D+1, and a depth of the third coding unit 1314 or 1324, the width and the height of which are ¼ times those of the first coding unit 1310 or 1320, may be D+2.

Figure 14:
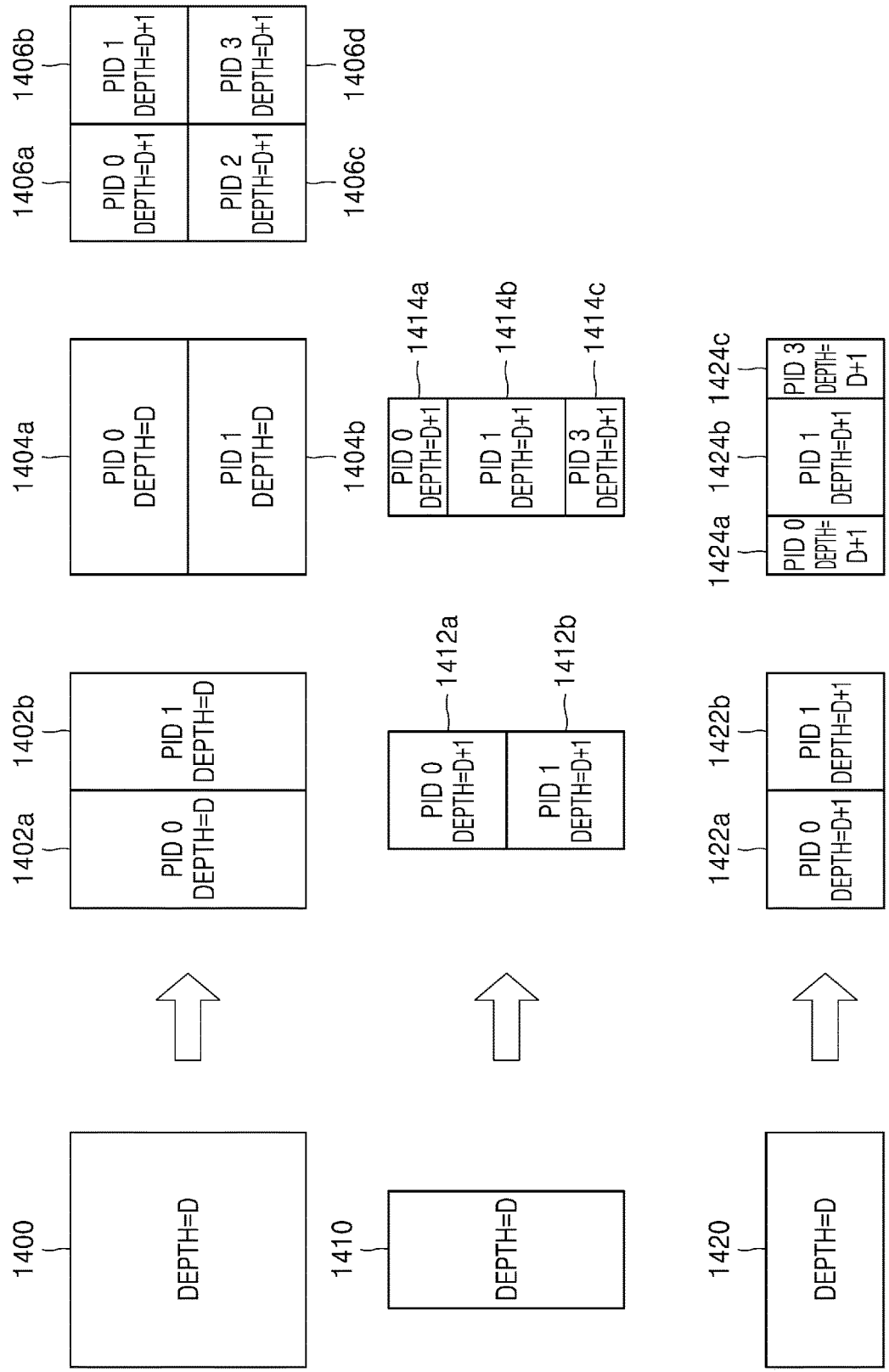
FIG. 14 illustrates depths that are determinable based on shapes and sizes of coding units and part indexes (PIDs) that are for distinguishing the coding units, according to an embodiment.

FIG. 14 illustrates depths that are determinable based on shapes and sizes of coding units and part indexes (PIDs) that are for distinguishing the coding units, according to an embodiment.

According to an embodiment, the image decoding apparatus 100 may determine various-shaped second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, a depth of the second coding units 1402a and 1402b, 1404a and 1404b, and 1406a, 1406b, 1406c, and 1406d, which are determined based on the split shape mode information of the square first coding unit 1400, may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, a depth of the second coding units 1412a and 1412b, 1414a, 1414b, and 1414c, 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, the coding unit 1414b of a center location among the odd number of split coding units 1414a, 1414b, and 1414c may have a width which is equal to that of the other coding units 1414a and 1414c and a height which is two times that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use PIDs to identify respective coding units. According to an embodiment, the PID may be obtained from a sample of a certain location (e.g., a top left sample) of each coding unit.

According to an embodiment, the image decoding apparatus 100 may determine a coding unit at a certain location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414b generated by splitting the first coding unit 1410 may have a width which is equal to that of the other coding units 1414a and 1414c and a height which is two times that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a certain location (e.g., a coding unit of a center location) among an odd number of coding units has a size different from that of the other coding units. In this case, the image decoding apparatus 100 may determine the coding unit of the center location, which has a different size, by using PIDs of the coding units. However, the PID and the size or location of the coding unit of the certain location to be determined are not limited to the above-described examples, and various PIDs and various locations and sizes of coding units may be used.

According to an embodiment, the image decoding apparatus 100 may use a certain data unit where a coding unit starts to be recursively split.

Figure 15:
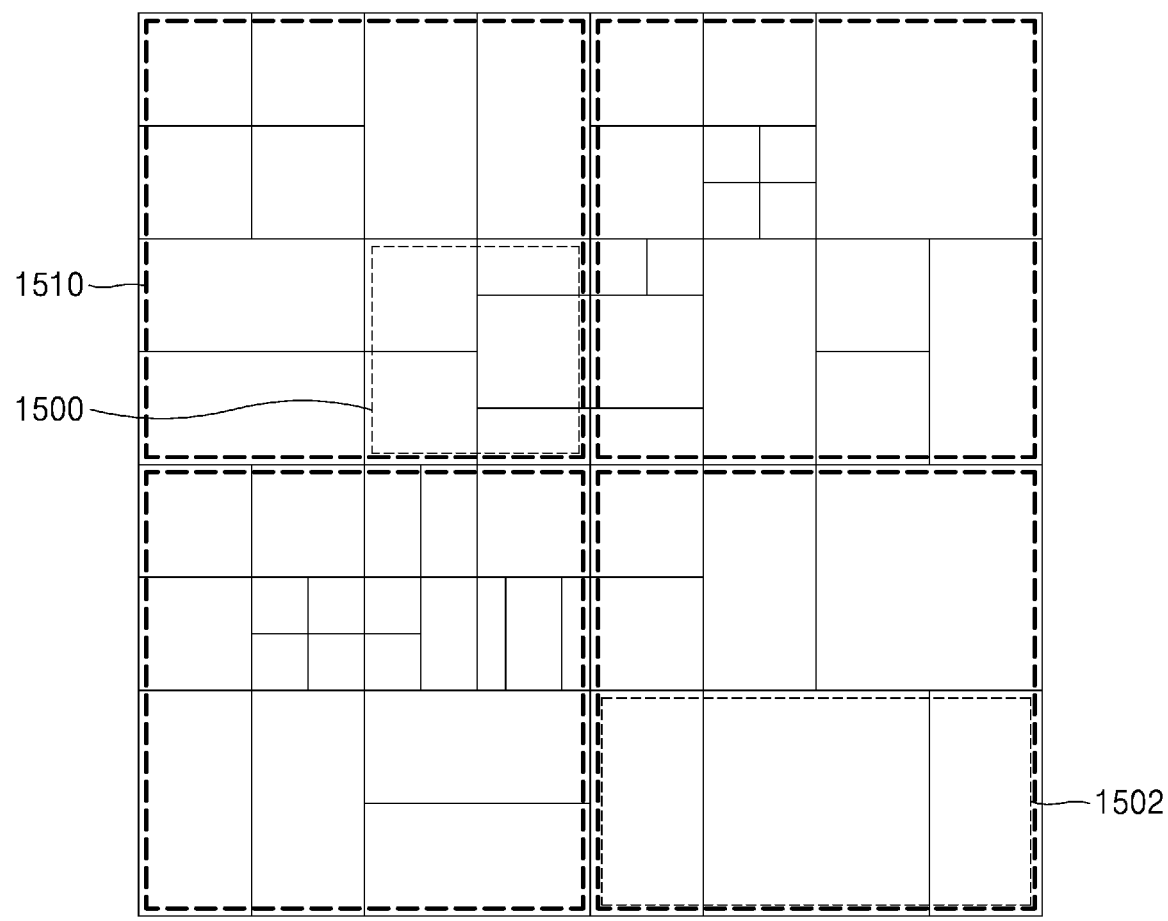
FIG. 15 illustrates that a plurality of coding units are determined based on a plurality of certain data units included in a picture, according to an embodiment.

FIG. 15 illustrates that a plurality of coding units are determined based on a plurality of certain data units included in a picture, according to an embodiment.

According to an embodiment, a certain data unit may be defined as a data unit where a coding unit starts to be recursively split by using split shape mode information. That is, the certain data unit may correspond to a coding unit of an uppermost depth, which is used to determine a plurality of coding units split from a current picture. In the following descriptions, for convenience of explanation, the certain data unit is referred to as a reference data unit.

According to an embodiment, the reference data unit may have a certain size and a certain shape. According to an embodiment, the reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using split shape mode information for each reference data unit. The operation of splitting the reference data unit may correspond to a splitting operation using a quadtree structure.

According to an embodiment, the image decoding apparatus 100 may previously determine a minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, or largest coding units).

According to an embodiment, the bitstream obtainer 110 of the image decoding apparatus 100 may obtain, from a bitstream, at least one of reference coding unit shape information and reference coding unit size information for each of the various data units. An operation of determining one or more coding units included in the square reference coding unit 1500 has been described above in relation to the operation of splitting the current coding unit 300 of FIG. 3, and an operation of determining one or more coding units included in the non-square reference coding unit 1502 has been described above in relation to the operation of splitting the current coding unit 400 or 450 of FIG. 4, and thus, detailed descriptions thereof will be omitted.

According to an embodiment, the image decoding apparatus 100 may use a PID for identifying the size and shape of reference coding units, to determine the size and shape of reference coding units according to some data units previously determined based on a certain condition. That is, the bitstream obtainer 110 may obtain, from the bitstream, only the PID for identifying the size and shape of reference coding units for each slice, slice segment, tile, tile group, or largest coding unit which is a data unit satisfying a certain condition (e.g., a data unit having a size equal to or smaller than a slice) among the various data units (e.g., sequences, pictures, slices, slice segments, tiles, tile groups, or largest coding units). The image decoding apparatus 100 may determine the size and shape of reference data units for each data unit, which satisfies the certain condition, by using the PID. When the reference coding unit shape information and the reference coding unit size information are obtained and used from the bitstream according to each data unit having a relatively small size, efficiency of using the bitstream may not be high, and thus only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of the width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of block shape information and the split shape mode information according to various embodiments.

Figure 16:
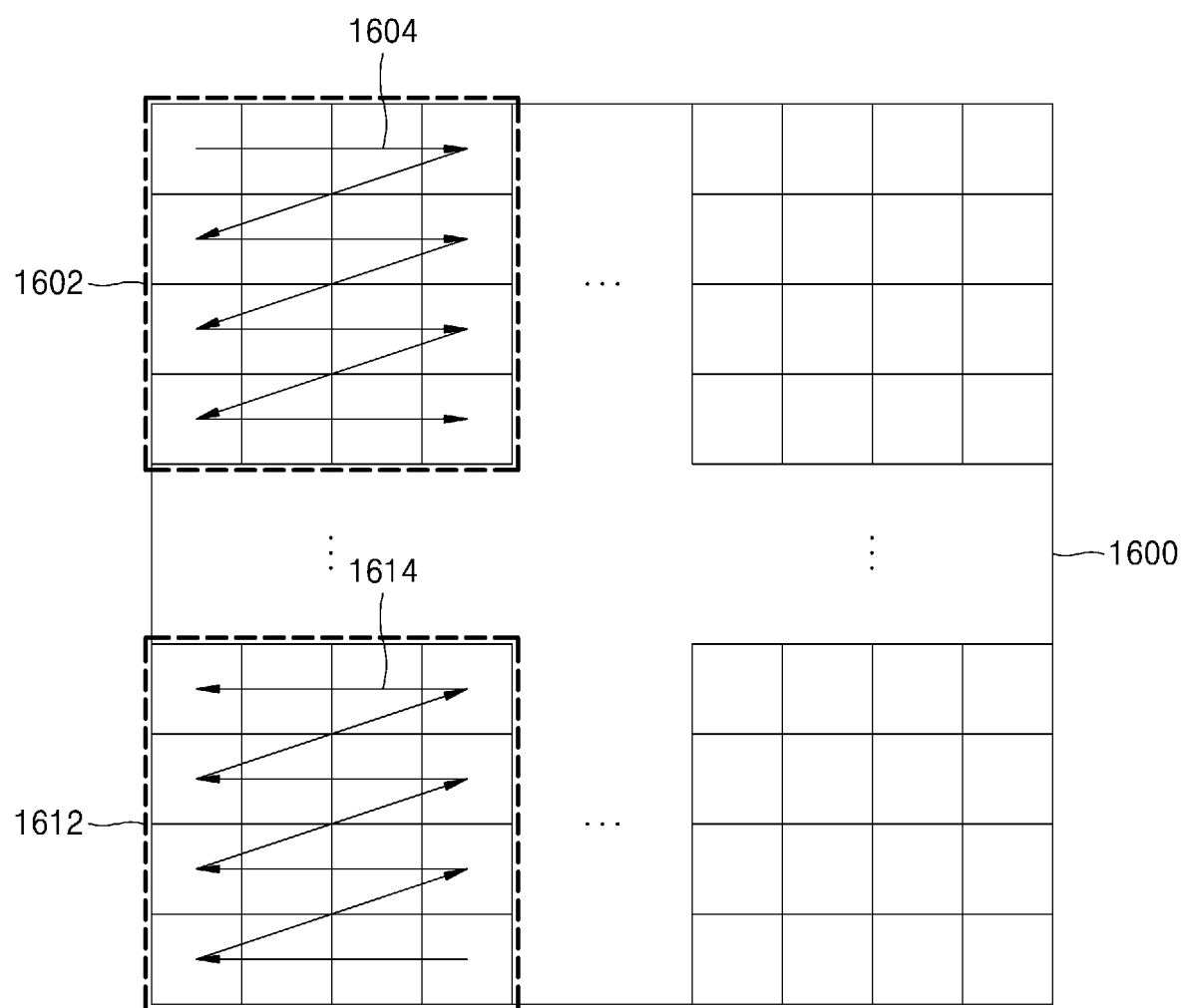
FIG. 16 illustrates a processing block serving as a criterion for determining a determination order of reference coding units included in a picture, according to an embodiment.

FIG. 16 illustrates a processing block serving as a unit for determining a determination order of reference coding units included in a picture 1600, according to an embodiment.

According to an embodiment, the image decoding apparatus 100 may determine one or more processing blocks split from a picture. The processing block is a data unit including one or more reference coding units split from an image, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined for each processing block, may be one of various orders, e.g., raster scan, Z-scan, N-scan, up-right diagonal scan, horizontal scan, and vertical scan, but is not limited to the above-mentioned scan orders.

According to an embodiment, the image decoding apparatus 100 may obtain processing block size information and may determine the size of one or more processing blocks included in the image. The image decoding apparatus 100 may obtain the processing block size information from a bitstream and may determine the size of one or more processing blocks included in the image. The size of processing blocks may be a certain size of data units, which is indicated by the processing block size information.

According to an embodiment, the bitstream obtainer 110 of the image decoding apparatus 100 may obtain the processing block size information from the bitstream according to each specific data unit. For example, the processing block size information may be obtained from the bitstream in a data unit such as an image, a sequence, a picture, a slice, a slice segment, a tile, or a tile group. That is, bitstream obtainer 110 may obtain the processing block size information from the bitstream according to each of the various data units, the image decoding apparatus 100 may determine the size of one or more processing blocks, which are split from the picture, by using the obtained processing block size information, and the size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units included in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order for the one or more reference coding units based on the obtained determination order information. The determination order information may be defined as an order or direction for determining the reference coding units in the processing block. That is, the determination order of reference coding units may be independently determined for each processing block.

According to an embodiment, the image decoding apparatus 100 may obtain, from the bitstream, the determination order information of reference coding units according to each specific data unit. For example, the bitstream obtainer 110 may obtain the determination order information of reference coding units from the bitstream according to each data unit such as an image, a sequence, a picture, a slice, a slice segment, a tile, a tile group, or a processing block. Because the determination order information of reference coding units indicates an order for determining reference coding units in a processing block, the determination order information may be obtained for each specific data unit including an integer number of processing blocks.

According to an embodiment, the image decoding apparatus 100 may determine one or more reference coding units based on the determined determination order.

According to an embodiment, the bitstream obtainer 110 may obtain the determination order information of reference coding units from the bitstream as information related to the processing blocks 1602 and 1612, and the image decoding apparatus 100 may determine a determination order of one or more reference coding units included in the processing blocks 1602 and 1612 and may determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained for each processing block, different kinds of the determination order information of reference coding units may be obtained for the processing blocks 1602 and 1612. When the determination order 1604 of reference coding units in the processing block 1602 is a raster scan order, reference coding units included in the processing block 1602 may be determined according to the raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image based on the reference coding units determined as described above. A method of decoding the reference coding units may include various image decoding methods.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

A method of determining a splitting rule according to an embodiment of the present disclosure will be described in detail.

The image decoding apparatus 100 may determine a splitting rule of an image. The splitting rule may be previously determined between the image decoding apparatus 100 and the image encoding apparatus 200. The image decoding apparatus 100 may determine the splitting rule of the image based on information obtained from a bitstream. The image decoding apparatus 100 may determine the splitting rule based on information obtained from at least one of a sequence parameter set, a picture parameter set, a video parameter set, a slice header, a slice segment header, a tile header, and a tile group header. The image decoding apparatus 100 may differently determine the splitting rule according to a frame, a slice, a tile, a temporal layer, a largest coding unit, or a coding unit.

The image decoding apparatus 100 may determine the splitting rule based on a block shape of a coding unit. The block shape may include a size, a shape, a ratio between a width and a height, and a direction of the coding unit. The image encoding apparatus 200 and the image decoding apparatus 100 may previously determine to determine the splitting rule based on the block shape of the coding unit. However, the present disclosure is not limited thereto. The image decoding apparatus 100 may determine the splitting rule, based on the information obtained from the bitstream received from the image encoding apparatus 200.

The shape of the coding unit may include a square shape and a non-square shape. When the width and the height of the coding unit are the same, the image decoding apparatus 100 may determine that the shape of the coding unit is a square shape. Also, when the width and the height of the coding unit are not the same, the image decoding apparatus 100 may determine that the shape of the coding unit is a non-square shape.

The size of the coding unit may include various sizes such as 4×4, 8×4, 4×8, 8×8, 16×4, 16×8, . . . , and 256×256. The size of the coding unit may be classified according to the length of a long side, the length of a short side, or the area of the coding unit. The image decoding apparatus 100 may apply the same splitting rule to coding units belonging to the same group. For example, the image decoding apparatus 100 may classify coding units whose long sides have the same length as coding units having the same size. Also, the image decoding apparatus 100 may apply the same splitting rule to coding units whose long sides have the same length.

The ratio between the width and the height of the coding unit may include 1:2, 2:1, 1:4, 4:1, 1:8, 8:1, 1:16, 16:1, 32:1, or 1:32. Also, the direction of the coding unit may include a horizontal direction and a vertical direction. The horizontal direction may indicate a case where the length of the width of the coding unit is greater than the length of the height of the coding unit. The vertical direction may indicate a case where the length of the width of the coding unit is less than the length of the height of the coding unit.

The image decoding apparatus 100 may adaptively determine the splitting rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The splitting rule determined based on the size of the coding unit may be a splitting rule that is previously determined between the image encoding apparatus 200 and the image decoding apparatus 100. Also, the image decoding apparatus 100 may determine the splitting rule, based on the information obtained from the bitstream.

The image decoding apparatus 100 may adaptively determine the splitting rule based on a location of the coding unit. The image decoding apparatus 100 may adaptively determine the splitting rule based on the location of the coding unit in the image.

Also, the image decoding apparatus 100 may determine the splitting rule so that coding units generated using different split paths do not have the same block shape. However, the present disclosure is not limited thereto, and the coding units generated using different split paths may have the same block shape. The coding units generated using different split paths may have different decoding processing orders. A decoding processing order has been described with reference to FIG. 12, and thus detailed descriptions thereof will be omitted.

Figure 17:
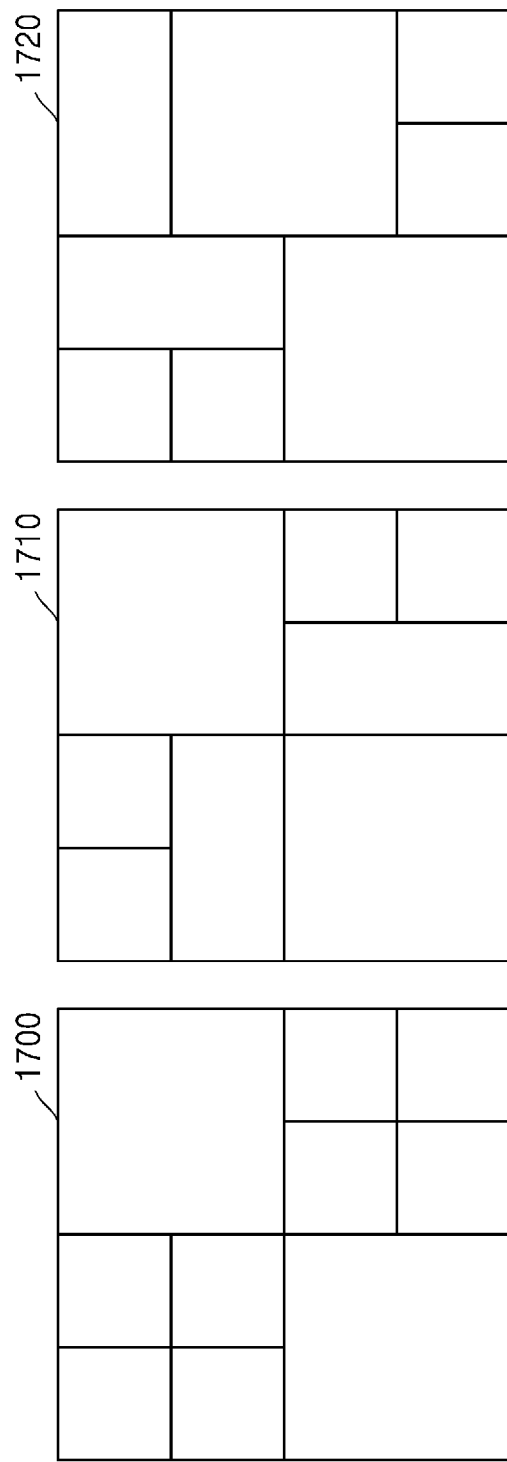
FIG. 17 illustrates coding units determinable for each picture when a combination of shapes into which a coding unit is splittable is different for each picture, according to an embodiment.

FIG. 17 illustrates coding units determinable for each picture when a combination of shapes into which a coding unit is splittable is different for each picture, according to an embodiment.

Referring to FIG. 17, the image decoding apparatus 100 may determine a combination of shapes into which a coding unit is splittable to be different for each picture. For example, the image decoding apparatus 100 may decode an image by using a picture 1700 that is splittable into 4 coding units, a picture 1710 that is splittable into 2 or 4 coding units, and a picture 1720 that is splittable into 2, 3, or 4 coding units, from among one or more pictures included in the image. In order to split the picture 1700 into a plurality of coding units, the image decoding apparatus 100 may use only split shape information indicating a split into 4 square coding units. In order to split the picture 1710, the image decoding apparatus 100 may use only split shape information indicating a split into 2 or 4 coding units. In order to split the picture 1720, the image decoding apparatus 100 may use only split shape information indicating a split into 2, 3, or 4 coding units. Because such a combination of split shapes is merely an example for describing operations of the image decoding apparatus 100, the combination of split shapes should not be interpreted as being limited thereto and various combinations of split shapes may be used according to each certain data unit.

According to an embodiment, the bitstream obtainer 110 of the image decoding apparatus 100 may obtain a bitstream including an index indicating a combination of split shape information according to each certain data unit (e.g., a sequence, a picture, a slice, a slice segment, a tile, or a tile group). For example, the bitstream obtainer 110 may obtain the index indicating the combination of split shape information from a sequence parameter set, a picture parameter set, a slice header, a tile header, or a tile group header. The image decoding apparatus 100 may determine a combination of split shapes into which a coding unit is splittable according to each certain data unit by using the obtained index, and thus different combinations of split shapes may be used according to certain data units.

FIG. 18 illustrates various shapes of a coding unit determinable based on split shape mode information representable as a binary code, according to an embodiment.

According to an embodiment, the image decoding apparatus 100 may split a coding unit into various shapes by using block shape information and split shape mode information obtained by the bitstream obtainer 110. Shapes into which a coding unit is splittable may correspond to various shapes including the shapes described with reference to the above embodiments.

Referring to FIG. 18, the image decoding apparatus 100 may split a square coding unit into at least one of a horizontal direction and a vertical direction and may split a non-square coding unit in a horizontal direction or a vertical direction, based on split shape mode information.

According to an embodiment, when the image decoding apparatus 100 is capable of splitting a square coding unit in a horizontal direction and a vertical direction into 4 square coding units, the number of split shapes that may be indicated by the split shape mode information of the square coding unit may be 4. According to an embodiment, the split shape mode information may be represented as a 2-digit binary code, and a binary code may be assigned to each split shape. For example, when a coding unit is not split, the split shape mode information may be represented as (00)b; when a coding unit is split in a horizontal direction and a vertical direction, the split shape mode information may be represented as (01)b; when a coding unit is split in a horizontal direction, the split shape mode information may be represented as (10)b; and when a coding unit is spilt in a vertical direction, the split shape mode information may be represented as (11)b.

According to an embodiment, when the image decoding apparatus 100 splits a non-square coding unit in a horizontal direction or a vertical direction, types of split shapes that may be indicated by the split shape mode information may be determined according to the number of coding units into which a coding unit is split. Referring to FIG. 18, the image decoding apparatus 100 may split a non-square coding unit into up to 3 coding units according to an embodiment. The image decoding apparatus 100 may split a coding unit into two coding units, and in this case, the split shape mode information may be represented as (10)b. The image decoding apparatus 100 may split a coding unit into three coding units, and in this case, the split shape mode information may be represented as (11)b. The image decoding apparatus 100 may determine not to split a coding unit, and in this case, the split shape mode information may be represented as (0)b. That is, in order to use a binary code indicating split shape mode information, the image decoding apparatus 100 may use variable length coding (VLC), instead of fixed length coding (FLC).

According to an embodiment, referring to FIG. 18, a binary code of split shape mode information indicating that a coding unit is not split may be represented as (0)b. When a binary code of split shape mode information indicating that a coding unit is not split is set to (00)b, all 2-bit binary codes of split shape mode information have to be used despite that there is no split shape mode information set to (01)b. However, as shown in FIG. 18, when 3 split shapes are used for a non-square coding unit, the image decoding apparatus 100 may determine not to split a coding unit even by using a 1-bit binary code (0)b as the split shape mode information, thereby efficiently using a bitstream. However, split shapes of a non-square coding unit, which are indicated by the split shape mode information, should not be interpreted as being limited to 3 shapes shown in FIG. 18 and should be interpreted as being various shapes including the above embodiments.

FIG. 19 illustrates other shapes of a coding unit determinable based on split shape mode information representable as a binary code, according to an embodiment.

Referring to FIG. 19, the image decoding apparatus 100 may split a square coding unit in a horizontal direction or a vertical direction and may split a non-square coding unit in a horizontal direction or a vertical direction, based on split shape mode information. That is, the split shape mode information may indicate that a square coding unit is split in one direction. In this case, a binary code of the split shape mode information indicating that a square coding unit is not split may be represented as (0)b. When a binary code of the split shape mode information indicating that a coding unit is not split is set to (00)b, all 2-bit binary codes of the split shape mode information have to be used despite that there is no split shape mode information set to (01)b. However, as shown in FIG. 19, when 3 split shapes are used for a square coding unit, the image decoding apparatus 100 may determine not to split a coding unit even by using a 1-bit binary code (0)b as the split shape mode information, thereby efficiently using a bitstream. However, split shapes of a square coding unit, which are indicated by the split shape mode information, should not be interpreted as being limited to 3 shapes shown in FIG. 19 and should be interpreted as being various shapes including the above embodiments.

According to an embodiment, block shape information or split shape mode information may be represented by using a binary code, and such information may be immediately generated as a bitstream. Alternatively, block shape information or split shape mode information representable as a binary code may be used as a binary code input during context adaptive binary arithmetic coding (CABAC) without being immediately generated as a bitstream.

According to an embodiment, a process by which the image decoding apparatus 100 obtains syntax about block shape information or split shape mode information through CABAC will be described. A bitstream including a binary code for the syntax may be obtained by the bitstream obtainer 110. The image decoding apparatus 100 may detect a syntax element indicating the block shape information or the split shape mode information by de-binarizing a bin string included in the obtained bitstream. According to an embodiment, the image decoding apparatus 100 may obtain a set of binary bin strings corresponding to the syntax element to be decoded and may decode each bin by using probability information, and the image decoding apparatus 100 may repeatedly perform this process until a bin string including such decoded bins is the same as one of pre-obtained bin strings. The image decoding apparatus 100 may determine the syntax element by de-binarizing the bin string.

According to an embodiment, the image decoding apparatus 100 may determine syntax about a bin string by performing a decoding process of adaptive binary arithmetic coding, and may update a probability model for bins obtained by the bitstream obtainer 110. Referring to FIG. 18, the bitstream obtainer 110 of the image decoding apparatus 100 may obtain a bitstream indicating a binary code indicating split shape mode information according to an embodiment. The image decoding apparatus 100 may determine syntax about the split shape mode information by using the obtained binary code having a size of 1 bit or 2 bits. In order to determine the syntax about the split shape mode information, the image decoding apparatus 100 may update a probability of each bit among the 2-bit binary code. That is, the image decoding apparatus 100 may update a probability that a next bin has a value of 0 or 1 during coding, according to whether a value of a first bin in the 2-bit binary code is 0 or 1.

According to an embodiment, while determining the syntax, the image decoding apparatus 100 may update a probability of the bins used in a process of decoding the bins of the bin string for the syntax, and the image decoding apparatus 100 may determine that specific bits in the bin string have the same probability without updating the probability.

Referring to FIG. 18, while determining syntax by using a bin string indicating split shape mode information about a non-square coding unit, the image decoding apparatus 100 may determine the syntax about the split shape mode information by using one bin having a value of 0 when the non-square coding unit is not split. That is, when block shape information indicates that a current coding unit has a non-square shape, a first bin of a bin string for the split shape information may be 0 when the non-square coding unit is not split and may be 1 when the non-square coding unit is split into two or three coding units. Accordingly, a probability that the first bin of the bin string of the split shape mode information about the non-square coding unit is 0 may be 1/3, and a probability that the first bin of the bin string of the split shape mode information about the non-square coding unit is 1 may be 2/3. As described above, because the split shape mode information indicating that the non-square coding unit is not split may represent only a 1-bit bin string having a value of 0, the image decoding apparatus 100 may determine syntax about the split shape mode information by determining whether a second bin is 0 or 1 only when the first bin of the split shape mode information is 1. According to an embodiment, when the first bin for the split shape mode information is 1, the image decoding apparatus 100 may decode a bin by considering that probabilities that the second bin is 0 and 1 are the same.

According to an embodiment, the image decoding apparatus 100 may use various probabilities for each bin while determining a bin of a bin string for split shape mode information. According to an embodiment, the image decoding apparatus 100 may differently determine probabilities of bins for split shape mode information according to a direction of a non-square block. According to an embodiment, the image decoding apparatus 100 may differently determine the probabilities of the bins for the split shape mode information according to an area or a length of a long side of a current coding unit. According to an embodiment, the image decoding apparatus 100 may differently determine the probabilities of the bins for the split shape mode information according to at least one of a shape and the length of the long side of the current coding unit.

According to an embodiment, the image decoding apparatus 100 may determine that the probabilities of the bins for the split shape mode information are the same for coding units having a certain size or more. For example, the image decoding apparatus 100 may determine that the probabilities of the bins for the split shape mode information are the same for coding units having a size equal to or greater than 64 samples based on a length of a long side of each coding unit.

According to an embodiment, the image decoding apparatus 100 may determine initial probabilities of the bins constituting the bin string of the split shape mode information based on a slice type (e.g., an I-slice, a P-slice, or a B-slice).

Figure 20:
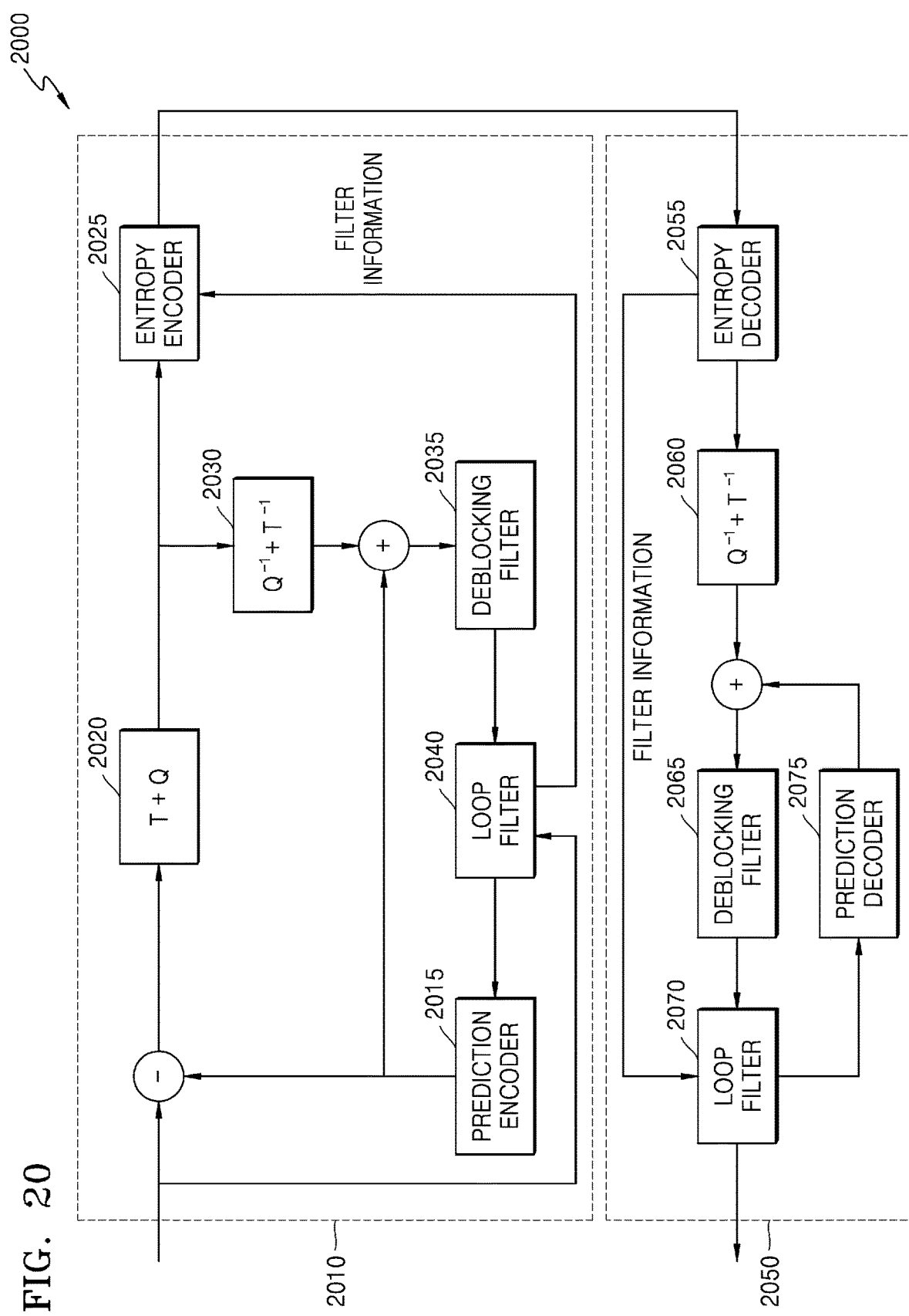
FIG. 20 is a block diagram of an image encoding and decoding system for performing loop filtering.

FIG. 20 is a block diagram of an image encoding and decoding system for performing loop filtering.

An encoding end 2010 of an image encoding and decoding system 2000 transmits an encoded bitstream of an image, and a decoding end 2050 receives and decodes the bitstream and outputs a reconstructed image. The encoding end 2010 may have a configuration similar to that of the image encoding apparatus 200 which will be described below, and the decoding end 2050 may have a configuration similar to that of the image decoding apparatus 100.

In the encoding end 2010, a prediction encoder 2015 outputs prediction data through inter prediction and intra prediction, and a transformer and quantizer 2020 outputs a quantized transform coefficient of residual data between the prediction data and a current input image. An entropy encoder 2025 encodes the quantized transform coefficient and outputs the encoded quantized transform coefficient as a bitstream. The quantized transform coefficient is reconstructed as data in a spatial domain by an inverse quantizer and inverse transformer 2030, and the reconstructed data in the spatial domain is output as a reconstructed image through a deblocking filter 2035 and a loop filter 2040. The reconstructed image may be used as a reference image of a next input image through the prediction encoder 2015.

Encoded image data from among the bitstream received by the decoding end 2050 is reconstructed as residual data in a spatial domain through an entropy decoder 2055 and an inverse quantizer and inverse transformer 2060. Image data in a spatial domain is formed when residual data and prediction data output from a prediction decoder 2075 are combined, and a deblocking filter 2065 and a loop filter 2070 may filter the image data in the spatial domain and may output a reconstructed image for a current original image. The reconstructed image may be used as a reference image for a next original image by the prediction decoder 2075.

The loop filter 2040 of the encoding end 2010 performs loop filtering by using filter information input according to a user input or a system setting. The filter information used by the loop filter 2040 is output to the entropy encoder 205, and is transmitted along with the encoded image data to the decoding end 2050. The loop filter 2070 of the decoding end 2050 may perform loop filtering based on the filter information input from the decoding end 2050.

The above various embodiments are for describing an operation related to an image decoding method performed by the image decoding apparatus 100. An operation of the image encoding apparatus 200 for performing an image encoding method corresponding to a reverse order process of the image decoding method will be described with reference to various embodiments.

Figure 2:
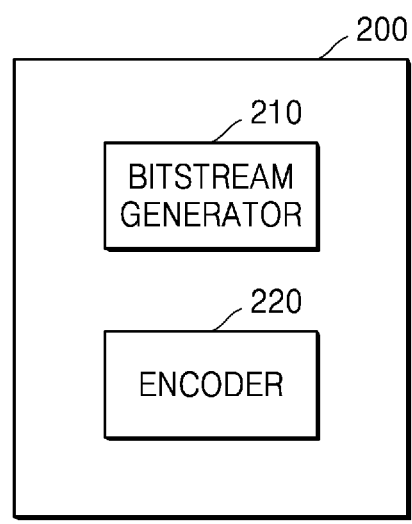
FIG. 2 is a block diagram of an image encoding apparatus according to an embodiment.

FIG. 2 is a block diagram of the image encoding apparatus 200 for encoding an image based on at least one of block shape information and split shape mode information according to an embodiment.

The image encoding apparatus 200 may include an encoder 220 and a bitstream generator 210. The encoder 220 may receive an input image and may encode the input image. The encoder 220 may encode the input image and may obtain at least one syntax element. The syntax element may include at least one of a skip flag, a prediction mode, a motion vector difference, a motion vector prediction method (or index), a transform quantized coefficient, a coded block pattern, a coded block flag, an intra prediction mode, a direct flag, a merge flag, a delta QP, a reference index, a prediction direction, and a transform index. The encoder 220 may determine a context model based on block shape information including at least one of a shape, a direction, a ratio between a width and a height, and a size of a coding unit.

The bitstream generator 210 may generate a bitstream based on the encoded input image. For example, the bitstream generator 210 may generate the bitstream by entropy encoding the syntax element based on the context model. Also, the image encoding apparatus 200 may transmit the bitstream to the image decoding apparatus 100.

According to an embodiment, the encoder 220 of the image encoding apparatus 200 may determine a shape of a coding unit. For example, the coding unit may have a square shape or a non-square shape, and information indicating the shape may be included in the block shape information.

According to an embodiment, the encoder 220 may determine a shape into which the coding unit is to be split. The encoder 220 may determine a shape of at least one coding unit included in the coding unit, and the bitstream generator 210 may generate a bitstream including split shape mode information including information about the shape of the coding unit.

According to an embodiment, the encoder 220 may determine whether the coding unit is split or not split. When the encoder 220 determines that only one coding unit is included in the coding unit or the coding unit is not split, the bitstream generator 210 may generate the bitstream including the split shape mode information indicating that the coding unit is not split. Also, the encoder 220 may split the coding unit into a plurality of coding units, and the bitstream generator 210 may generate the bitstream including the split shape mode information indicating that the coding unit is split into the plurality of coding units.

According to an embodiment, information indicating the number of coding units into which the coding unit is to be split or a direction in which the coding unit is to be split may be included in the split shape mode information. For example, the split shape mode information may indicate that the coding unit is split in at least one of a vertical direction and a horizontal direction or is not split.

The image encoding apparatus 200 determines the split shape mode information based on a split shape mode of the coding unit. The image encoding apparatus 200 determines the context model based on at least one of the shape, the direction, the ratio between the width and the height, and the size of the coding unit. The image encoding apparatus 200 generates the split shape mode information for splitting the coding unit based on the context model as the bitstream.

In order to determine the context model, the image encoding apparatus 200 may obtain an array for mapping at least one of the shape, the direction, the ratio between the width and the height, and the size of the coding unit to an index for the context model. The image encoding apparatus 200 may obtain, from the array, the index for the context model based on at least one of the shape, the direction, the ratio between the width and the height, and the size of the coding unit. The image encoding apparatus 200 may determine the context model based on the index for the context model.

In order to determine the context model, the image encoding apparatus 200 may determine the context model further based on block shape information including at least one of a shape, a direction, a ratio between a width and a height, and a size of a unit output from the prediction decoder 2075. Also, a neighboring coding unit may include at least one of coding units located at the bottom left, left, top left, top, top right, right, and bottom right of the coding unit.

Also, in order to determine the context model, the image encoding apparatus 200 may compare a length of a width of an upper neighboring coding unit with a length of the width of the coding unit. Also, the image encoding apparatus 200 may compare lengths of heights of left and right neighboring coding units with a length of the height of the coding unit. Also, the image encoding apparatus 200 may determine the context model based on comparison results.

An operation of the image encoding apparatus 200 is similar to the operation of the image decoding apparatus 100 described with reference to FIGS. 3 through 20, and thus detailed descriptions thereof will be omitted.

Figure 21:
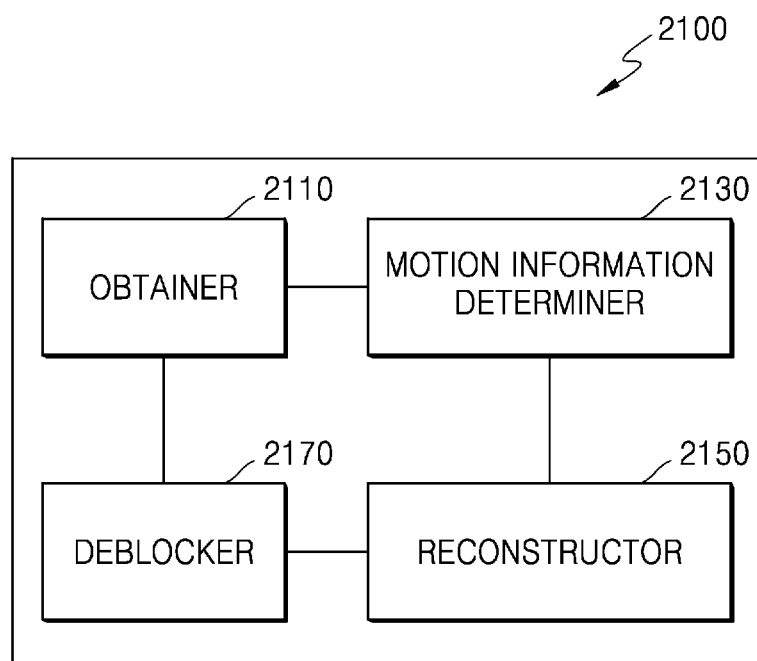
FIG. 21 is a block diagram illustrating a configuration of an image decoding apparatus according to an embodiment.

FIG. 21 is a block diagram illustrating a configuration of the image decoding apparatus 2100 according to an embodiment.

Referring to FIG. 21, the image decoding apparatus 2100 includes an obtainer 2110, a motion information determiner 2130, a reconstructor 2150, and a deblocker 2170. The obtainer 2110 of FIG. 21 may correspond to the bitstream obtainer 110 of FIG. 1, and the motion information determiner 2130, the reconstructor 2150, and the deblocker 2170 may correspond to the decoder 120 of FIG. 1.

The obtainer 2110, the motion information determiner 2130, the reconstructor 2150, and the deblocker 2170 according to an embodiment may be implemented as at least one processor. The image decoding apparatus 2100 may include one or more data storages (not shown) in which input/output data of the obtainer 2110, the motion information determiner 2130, the reconstructor 2150, and the deblocker 2170 is stored. Also, the image decoding apparatus 2100 may include a memory controller (not shown) for controlling data input/output to/from the data storages (not shown).

The obtainer 2110 receives a bitstream generated as a result of encoding an image. The bitstream may include information for determining a motion vector used for inter prediction of a current block. The current block that is a block generated by being split according to a tree structure from an image may correspond to a block unit such as a largest coding unit, a coding unit, or a transform unit.

The motion information determiner 2130 may determine the current block based on block shape information and/or split shape mode information included in at least one of a sequence parameter set, a picture parameter set, a video parameter set, a slice header, and a slice segment header. Furthermore, the obtainer 2110 may obtain a syntax element corresponding to the block shape information or the split shape mode information from the bitstream for each largest coding unit, reference coding unit, or processing block, and the motion information determiner 2130 may use the syntax element to determine the current block.

The bitstream may include information indicating a prediction mode of the current block, and examples of the prediction mode of the current block may include an intra mode, an inter mode, a merge mode, an advanced motion vector prediction (AMVP) mode, a direct mode, and a skip mode.

In an embodiment, when a size of a current block is equal to or greater than a certain size (e.g., 4×4, 8×8, 16×16, 32×32, 64×64, or 128×128), the motion information determiner 2130 may determine a candidate list including, as a candidate, a first reference block indicated by a temporal motion vector. The candidate list may include a pre-determined number of candidates. Each candidate may indicate a block of a certain location. Alternatively, each candidate may indicate a motion vector of a block of a specific location. That is, when a certain block is included as a candidate in the candidate list, it may mean that a motion vector of the certain block is included as a candidate.

In the present disclosure, the first reference block refers to a block for extracting a motion vector used to determine a motion vector of the current block. When the size of the current block is compared with the certain size, the motion information determiner 2130 may compare one (e.g., a smaller size) of a width and a height of the current block with the certain size. For example, when the size of the current block is 4×16 and the certain size is 8×8, 4 that is a width of the current block is less than 8 indicating a size of one side in the certain size, and thus it may be determined that the size of the current block is less than the certain size.

In an embodiment, when the size of the current block is less than the certain size, the motion information determiner 2130 may determine a candidate list including a block other than the first reference block as a candidate. The first reference block may be included or may not be included in the candidate list based on the size of the current block.

In an embodiment, when the size of the current block is equal to or greater than the certain size, the motion information determiner 2130 may determine a first candidate list including the first reference block as a candidate, and when the size of the current block is less than the certain size, the motion information determiner 2130 may determine a second candidate list including a block other than the first reference block as a candidate.

The motion information determiner 2130 may determine a candidate list when a prediction mode of the current block is a mode of determining a motion vector of the current block by using a motion vector of a candidate included in the candidate list. Information (e.g., a flag or an index) indicating the prediction mode of the current block may be obtained from the bitstream. The motion information determiner 2130 may determine a candidate list, when a flag indicating whether the prediction mode of the current block is a mode of determining a motion vector of the current block by using a motion vector of a candidate included in the candidate list.

Examples of the mode of determining the motion vector of the current block by using the motion vector of the candidate included in the candidate list may include, for example, a skip mode, a merge mode, and an AMVP mode. In the skip mode and the merge mode, the motion vector of the candidate included in the candidate list is determined as the motion vector of the current block, and in the AMVP mode, a value obtained by applying a differential motion vector to the motion vector of the candidate included in the candidate list is determined as the motion vector of the current block. Information indicating the differential motion vector is obtained from the bitstream.

FIG. 22 is a diagram illustrating a candidate list according to an embodiment.

Referring to FIG. 22, a candidate list may include a first reference block, a first spatial neighboring block, a second spatial neighboring block, a third spatial neighboring block, and a temporal neighboring block as candidates. An index may be assigned to each candidate, and in an embodiment, an index having a smallest value may be assigned to the first reference block.

In FIG. 22, a spatial neighboring block refers to a neighboring block spatially adjacent to a current block in a current image, and a temporal neighboring block may include a block located at the same point as a current block in a collocated image or a block located at the lower right of the block located at the same point as the current block.

FIG. 22 illustrates that the first reference block and the temporal neighboring block are both included as candidates in the candidate list. When the first reference block is included in the candidate list, the temporal neighboring block may not be included in the candidate list. In contrast, when the temporal neighboring block is included in the candidate list, the first reference block may not be included in the candidate list.

In an embodiment, the minimum number of spatial neighboring blocks to be included as candidates in the candidate list and the minimum number of temporal neighboring blocks (including the first reference block) to be included as candidates in the candidate list may be pre-determined.

The motion information determiner 2130 may determine availabilities of blocks (including the first reference block) that are pre-determined before the candidate list is configured, and may sequentially include blocks having availabilities in the candidate list. When the number of candidates included in the candidate list is less than a pre-determined number, the motion information determiner 2130 may include a default motion vector in the candidate list. When a block is inter predicted, it may be determined that the block has an availability.

The default motion vector may include, for example, a zero vector, a temporal motion vector indicating the first reference block, a representative motion vector of the first reference block, or a combination of motion vectors of blocks already included in the candidate list.

An order of blocks included in the candidate list may be pre-determined. For example, blocks may be included in the candidate list according to availabilities in an order of the first reference block→the spatial neighboring blocks→the temporal neighboring block as shown in FIG. 22, or blocks may be included in the candidate list according to availabilities in an order of the spatial neighboring blocks→the first reference block→the temporal neighboring block. Alternatively, blocks may be included in the candidate list according to availabilities in an order of the first spatial neighboring block→the first reference block→the second spatial neighboring block →the third spatial neighboring block→the temporal neighboring block. Alternatively, blocks may be included in the candidate list in an order of spatial neighboring blocks having a first availability from among the spatial neighboring blocks→the first reference block→the remaining spatial neighboring blocks from among the spatial neighboring blocks→the temporal neighboring block.

However, the candidate list of FIG. 22 is merely an example, and the number and types of candidates included in the candidate list may vary according to implementations. For example, the candidate list may include, as a candidate, at least one of a zero vector, a temporal motion vector indicating the first reference block, a representative motion vector of the first reference block, and a combination of motion vectors of blocks already included in the candidate list.

The motion information determiner 2130 obtains information (e.g., a flag or an index) indicating one of candidates included in the candidate list from a bitstream, and determines a motion vector of a current block by using a motion vector of the candidate indicated by the obtained information.

According to an embodiment of the present disclosure, when the first reference block is selected from among candidates included in the candidate list, motion vectors of sub-blocks in the current block are determined through a sub-block-based prediction process, which will be described with reference to FIGS. 23 and 24.

Figure 23:
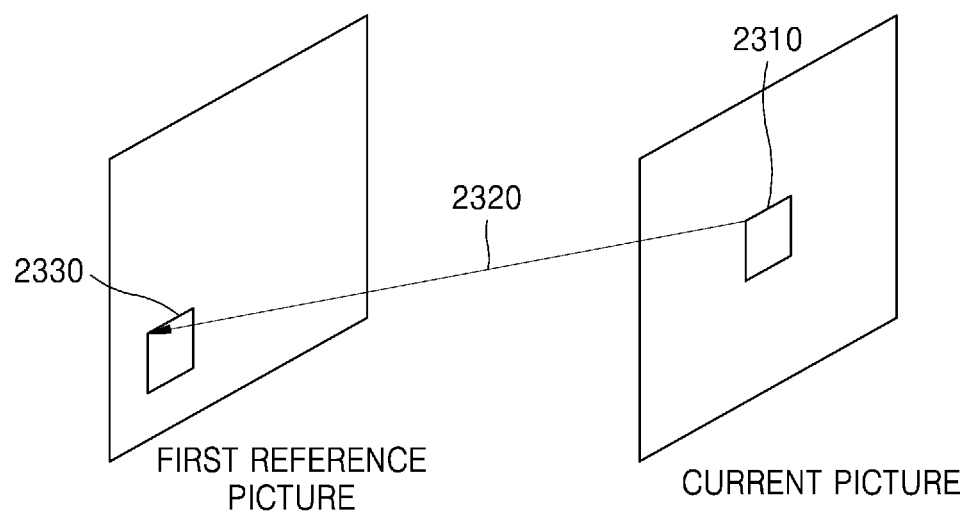
FIG. 23 is a diagram illustrating a first reference block indicated by a temporal motion vector.

FIG. 23 is a diagram illustrating a first reference block 2330 indicated by a temporal motion vector 2320. FIG. 24 is a diagram for describing a method of determining motion vectors of first through fourth sub-blocks 2312, 2314, 2316, and 2318 in a current block 2310.

The motion information determiner 2130 determines the temporal motion vector 2320 to determine the first reference block 2330. A detailed method of determining the temporal motion vector 2320 will be described below.

Once the temporal motion vector 2320 is determined, the first reference block 2330 indicated by the temporal motion vector 2320 is determined based on the current block 2310 in a first reference picture. A size of the first reference block 2330 may be determined to be the same as that of the current block 2310.

When a motion vector of the current block 2310 is determined based on the first reference block 2330, in an embodiment of the present disclosure, sub-blocks in the current block 2310 are determined, and a motion vector is determined for each sub-block.

Figure 24:
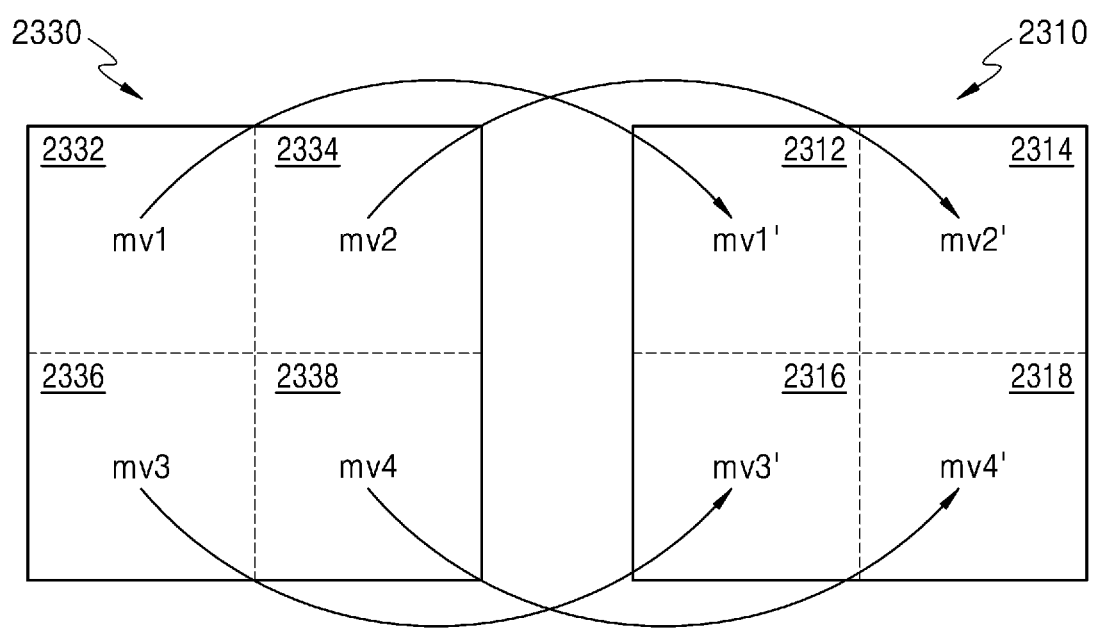
FIG. 24 is a diagram for describing a method of determining motion vectors of sub-blocks in a current block.

Referring to FIG. 24, the current block 2310 may be divided into the first through fourth sub-blocks 2312, 2314, 2316, and 2318. Each of the first through fourth sub-blocks 2312, 2314, 2316, and 2318 may have a certain size. For example, a size of each sub-block may be 4×4, 8×8, 16×16, 32×32, or 64×64.

The size of the sub-block may be determined for each group of pictures (GOPs), each picture, each tile, each largest coding unit, or each coding unit.

The sub-block may have a size that is pre-determined according to a value of a temporal layer of pictures constituting the GOP. In detail, in an image where the value of the temporal layer ranges from 0 to n (n is an integer), the sub-block may have a size of 4×4; in an image where the value of the temporal layer ranges from n+1 to m (m is an integer), the sub-block may have a size of 8×8; and in an image where the value of the temporal layer ranges from m+1 to l (l is an integer), the sub-block may have a size of 16×16. That is, as the value of the temporal layer increases, the size of the sub-block may also increase.

In an embodiment, the size of the sub-block may be determined based on a size of a current block. In detail, when the size of the current block is M×N, the sub-block may have a size of M/4×N/4. In this case, when the size of the sub-block is less than a pre-determined minimum size of the sub-block, the size of the sub-block in the current block may be determined as a minimum size of the sub-block.

Alternatively, when the size of the current block is M×N and a larger value among M and N is K, the sub-block may have a size of K/4×K/4.

Although four sub-blocks, that is, the first through fourth sub-blocks 2312, 2314, 2316, and 2318, are determined in the current block 2310 in FIG. 24, the number of sub-blocks may vary according to the size of the sub-block and the size of the current block.

First through fourth sub-areas 2332, 2334, 2336, and 2338 in the first reference block 2330 may be determined to respectively correspond to the first through fourth sub-blocks 2312, 2314, 2316, and 2318, and motion vectors mv1', mv2', mv3', and mv4' of the first through fourth sub-blocks 2312, 2314, 2316, and 2318 may be determined based on motion vectors mv1, mv2, mv3, and mv4 extracted from the first through fourth sub-areas 2332, 2334, 2336, and 2338.

For example, the motion vector mv1' of the first sub-block 2312 in the current block 2310 may be determined based on the motion vector mv1 extracted from the first sub-area 2332 in the first reference block 2330, the motion vector mv2' of the second sub-block 2314 may be determined based on the motion vector mv2 extracted from the second sub-area 2334, the motion vector mv3' of the third sub-block 2316 in the current block 2310 may be determined from the motion vector mv3 extracted from the third sub-area 2336, and the motion vector mv4' of the fourth sub-block 2318 in the current block 2310 may be determined based on the motion vector mv4 extracted from the fourth sub-area 2338.

The motion vectors mv1, mv2, mv3, and mv4 of the first through fourth sub-areas 2332, 2334, 2336, and 2338 may be extracted based on a center pixel of the first through fourth sub-areas 2332, 2334, 2336, and 2338.

Motion vectors used in a process of decoding an image are stored based on a block having a certain size (e.g., a 16×16 block in the high efficiency video coding (HEVC) codec, hereinafter, a storage block). In an embodiment of the present disclosure, a size of the storage block may be, but is not limited to, 4×4, 8×8, 16×16, or 32×32.

The motion information determiner 2130 may determine a motion vector of a storage block including a center pixel of each of the first through fourth sub-areas 2332, 2334, 2336, and 2338 in the first reference block 2330 as a motion vector of each of the first through fourth sub-areas 2332, 2334, 2336, and 2338. A motion vector of a storage block including a center pixel of the first sub-area 2332 may be determined as a motion vector of the first sub-area 2332, and a motion vector of a storage block including a center pixel of the second sub-area 2334 may be determined as a motion vector of the second sub-area 2334.

When locations of pixels of a certain area range from (0, 0) to (n-1, n-1), a location of a center pixel may be (n/2, n/2), ((n-2)/2), (n-2)/2)), (n/2, (n-2)/2)), or ((n-2)/2), n/2).

When a motion vector of each of the first through fourth sub-areas 2332, 2334, 2336, and 2338 is determined, a motion vector may not exist in a storage block including a center pixel of any of the first through fourth sub-areas 2332, 2334, 2336, and 2338. For example, when samples of a storage block including a center pixel of a sub-area are all intra predicted, a motion vector may not exist in the storage block. In this case, the motion information determiner 2130 may determine that a motion vector of a storage block including a center pixel of the first reference block 2330 is a representative motion vector, and may determine that a motion vector of a sub-block whose motion vector may not be determined is the representative motion vector. As described below, a motion vector corresponding to a center pixel of the first reference block 2330 may not exist. In this case, it may be determined that there is no availability of the first reference block 2330 and the first reference block 2330 may not be included in a candidate list.

In an embodiment, when a size (e.g., 8×8) of a storage block is greater than a size (e.g., 4×4) of a sub-block, the motion information determiner 2130 may determine that a motion vector of at least one sub-area from among the first through fourth sub-areas 2332, 2334, 2336, and 2338 corresponding to the first through fourth sub-blocks 2312, 2314, 2316, and 2318 is a value (e.g., an average value) obtained by combining motion vectors of adjacent sub-areas. This is to prevent a problem that center pixels of many sub-areas are all included in one storage block and motion vectors of the sub-areas are determined to be the same value. For example, when center pixels of a pre-determined number of sub-areas from among all sub-areas in a current block are all included in one storage block, motion vectors of some of the pre-determined number of sub-areas may be determined to be an average value of motion vectors of adjacent sub-areas.

When motion vectors of the first through fourth sub-blocks 2312, 2314, 2316, and 2318 in the current block 2310 is determined, the reconstructor 2150 reconstructs the first through fourth sub-blocks 2312, 2314, 2316, and 2318 based on sample values of a second reference block indicated by the motion vectors of the first through fourth sub-blocks 2312, 2314, 2316, and 2318. Accordingly, as a result, the current block 2310 is reconstructed. In the present embodiment, the second reference block refers to a block used for motion compensation of the current block.

Figure 25:
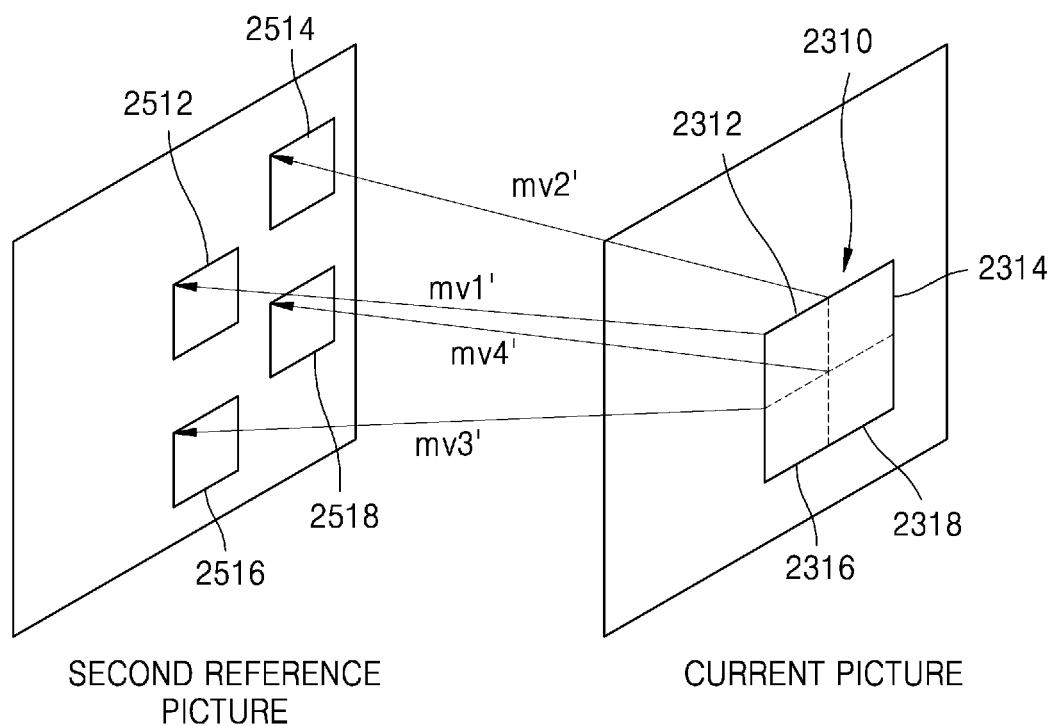
FIG. 25 is a diagram for describing a process of reconstructing a current block.

FIG. 25 is a diagram for describing a process of reconstructing a current block. The reconstructor 2150 may determine sample values of second reference blocks 2512, 2514, 2516, and 2518 indicated by the motion vectors mv1', mv2', mv3', and mv4' of the first through fourth sub-blocks 2312, 2314, 2316, and 2318 as sample values of the first through fourth sub-blocks 2312, 2314, 2316, and 2318.

In an embodiment, the reconstructor 2150 may determine sample values of the first through fourth sub-blocks 2312, 2314, 2316, 2318 by applying residual data obtained from a bitstream according to a prediction mode of the current block 2310 to sample values of the second reference blocks 2512, 2514, 2516, and 2518 indicated the motion vectors mv1', mv2', mv3', and mv4' of the first through fourth sub-blocks 2312, 2314, 2316, and 2318.

In an embodiment, when the current block 2310 is a reference block of a subsequent block, a motion vector of the subsequent block may be determined according to a representative motion vector of the first reference block 2330. In another embodiment, when the current block 2310 is a reference block of a subsequent block, a motion vector of the subsequent block may be determined according to a motion vector of any of the first through fourth sub-blocks 2312, 2314, 2316, and 2318 in the current block 2310.

In an embodiment, when decoding of a current image is completed and then motion vectors determined in the current image are stored, the reconstructor 2150 may store motion vectors of all sub-blocks in the current block. However, the motion vectors of the sub-blocks may be converted into pre-determined precision and stored according to a temporal layer value of the current image in a GOP. Precision may be represented by using a pixel unit. For example, 1 pixel precision indicates that a motion vector is represented by using one integer pixel unit, and ¼ pixel precision indicates that a motion vector is represented by using a ¼ pixel unit (i.e., a sub-pixel unit). A motion vector may be more precisely represented at ¼ pixel precision than at 1 pixel precision.

The reconstructor 2150 may store the motion vectors of the sub-blocks as lower precision as the temporal layer value of the current image decreases. When the motion vectors of the sub-blocks are determined as ¼ pixel precision, and the temporal layer value of the current image is the same as a pre-determined value, the reconstructor 2150 may convert the motion vectors of the sub-blocks, for example, into 1 pixel precision and may store the converted motion vectors. When a motion vector of one sub-block is (16, 16) that is ¼ pixel precision, the motion vector may be stored as (4, 4) that is 1 pixel precision. This is to increase a data processing speed because an image with a lower temporal layer value is more frequently referenced from other images.

When the reconstructor 2150 stores the motion vectors of the sub-blocks as low precision, the reconstructor 2150 may store the motion vectors as integer values by applying rounding. For example, when a motion vector of one sub-block is (17, 17) that is ¼ pixel precision, the motion vector may be stored as (4, 4) (i.e., an integer value obtained by rounding off 17/4) that is 1 pixel precision.

In an embodiment of the present disclosure, when a first reference block is selected from among candidates included in a candidate list, image decoding may be accurately performed based on a sub-block by performing a motion vector determination process and a sample value reconstruction process based on a sub-block.

According to an embodiment of the present disclosure, when a candidate other than the first reference block is selected from among the candidates included in the candidate list, the current block may be reconstructed through a process different from the processes described with reference to FIGS. 23 through 25. For example, when a specific spatial neighboring block is selected from among the candidates included in the candidate list, the motion information determiner 2130 may determine a motion vector of the current block by using a motion vector of the spatial neighboring block and may reconstruct the current block by using sample values of a reference block indicated by the motion vector of the current block. That is, when the spatial neighboring block is selected, a motion vector determination process and a reconstruction process may be performed based on the current block.

The first reference block may be included in the candidate list, or may not be included in the candidate list. Whether the first reference block is included in the candidate list may be determined based on various conditions.

For example, when a size of the current block is less than a certain size (e.g., 4×4, 8×8, 16×16, 32×32, 64×64, or 128×128), a candidate list including, as a candidate, a block other than the first reference block may be determined. In this case, the candidate list may include, as a candidate, a temporal neighboring block in a pre-determined collocated image. In contrast, when the size of the current block is equal to or greater than the certain size, the first reference block may be included in the candidate list, and the temporal neighboring block in the collocated image may not be included in the candidate list. The certain size may be a size of a sub-block.

Also, for example, when the size of the current block is less than the certain size (e.g., 4×4, 8×8, 16×16, 32×32, 64×64, or 128×128) and a temporal motion vector obtained through a temporal motion vector determination process which will be described below is a pre-determined motion vector (e.g., a zero vector), a candidate list including, as a candidate, a block other than the first reference block may be determined. In this case, the candidate list may include, as a candidate, a temporal neighboring block in a pre-determined collocated image. In contrast, when the size of the current block is equal to or greater than the certain size or the temporal motion vector is not a pre-determined motion vector, the first reference block may be included in the candidate list, and the temporal neighboring block in the collocated image may not be included in the candidate list. The certain size may be a size of a sub-block.

Also, for example, when the size of the current block is greater than the certain size (e.g., 4×4, 8×8, 16×16, 32×32, 64×64, 128×128), a candidate list including, as a candidate, a block other than the first reference block may be determined. In this case, the candidate list may include, as a candidate, a temporal neighboring block in a pre-determined collocated image. In contrast, when the size of the current block is equal to or less than the certain size, the first reference block may be included in the candidate list, and the temporal neighboring block in the collocated image may not be included in the candidate list. The certain size may be a size of a sub-block.

Also, for example, when the size of the current block is the same as the certain size (e.g., 4×4, 8×8, 16×16, 32×32, 64×64, or 128×128), a candidate list including, as a candidate, a block other than the first reference block may be determined. In this case, the candidate list may include, as a candidate, a temporal neighboring block in a pre-determined collocated image. In contrast, when the size of the current block is not the same as the certain size, the first reference block may be included in the candidate list, and the temporal neighboring block in the collocated image may not be included in the candidate list. The certain size may be a size of a sub-block.

Also, for example, when the size of the current block is different from the certain size (e.g., 4×4, 8×8, 16×16, 32×32, 64×64, or 128×128), a candidate list including, as a candidate, a block other than the first reference block may be determined. In this case, the candidate list may include, as a candidate, a temporal neighboring block in a pre-determined collocated image. In contrast, when the size of the current block is the same as the certain size, the first reference block may be included in the candidate list, and the temporal neighboring block in the collocated image may not be included in the candidate list. The certain size may be a size of a sub-block.

Also, for example, when the current block is a certain block unit (e.g., a largest coding unit), a candidate list including, as a candidate, a block other than the first reference block may be determined. In this case, the candidate list may include, as a candidate, a temporal neighboring block in a pre-determined collocated image. In contrast, when the current block is not the certain block unit, the first reference block may be included in the candidate list, and the temporal neighboring block in the collocated image may not be included in the candidate list.

Also, for example, when the size of the current block is k times greater than a size of a sub-block (k is a pre-determined integer), a candidate list including, as a candidate, a block other than the first reference block may be determined. In this case, the candidate list may include, as a candidate, a temporal neighboring block in a pre-determined collocated image. In contrast, when the size of the current block is not k times greater than the size of the certain block, the first reference block may be included in the candidate list, and the temporal neighboring block in the collocated image may not be included in the candidate list.

Also, for example, when candidates of a candidate list are sequentially determined according to availabilities of multiple blocks including the first reference block, and the first reference block is determined as a first candidate of the candidate list, the first reference block may be excluded from the candidate list. For example, in a situation where blocks are included in a candidate list according to their availabilities in an order of a first spatial neighboring block, the first reference block, and a second spatial neighboring block, when there is no availability of the first spatial neighboring block and the first reference block is included as a first candidate in the candidate list, the first reference block may be excluded from the candidate list.

Also, for example, when a temporal layer value of a current picture in a GOP including a current picture is the same as a pre-determined value (e.g., a largest value), a candidate list including, as a candidate, a block other than the first reference block may be determined.

Also, for example, when a temporal motion vector obtained through a temporal motion vector determination process which will be described below is a pre-determined motion vector (e.g., a zero vector), a candidate list including, as a candidate, a block other than the first reference block may be determined. In this case, the candidate list may include, as a candidate, a temporal neighboring block in a pre-determined collocated image. In contrast, when the temporal motion vector obtained through the temporal motion vector determination process is different from the pre-determined motion vector, the first reference block may be included in the candidate list, and the temporal neighboring block in the collocated image may not be included in the candidate list.

Also, for example, when a temporal motion vector obtained through a temporal motion vector determination process which will be described below is different from a pre-determined motion vector (e.g., a zero vector), a candidate list including, as a candidate, a block other than the first reference block may be determined. In this case, the candidate list may include, as a candidate, a temporal neighboring block in a pre-determined collocated image. In contrast, when the temporal motion vector obtained through the temporal motion vector determination process is the same as the pre-determined motion vector, the first reference block may be included in the candidate list, and the temporal neighboring block in the collocated image may not be included in the candidate list.

Also, for example, when a motion vector corresponding to a center pixel of the first reference block does not exist, a candidate list including, as a candidate, a block other than the first reference block may be determined. In contrast, when the motion vector corresponding to the center pixel of the first reference block exists, the first reference block may be included in the candidate list.

A method by which the motion information determiner 2130 determines a temporal motion vector indicating the first reference block will be described.

When the motion information determiner 2130 determines that a prediction mode of a current block is a mode of determining a motion vector of the current block by using a motion vector of a candidate included in a candidate list (e.g., sub-block_merge_flag is 1), a temporal motion vector may be determined before the candidate list is determined. Alternatively, the motion information determiner 2130 may determine the temporal motion vector to determine an availability of the first reference block while the candidate list is determined. When there is no availability of the first reference block (e.g., when a representative motion vector does not exist), a candidate list including, as a candidate, a block other than the first reference block may be determined.

Figure 26:
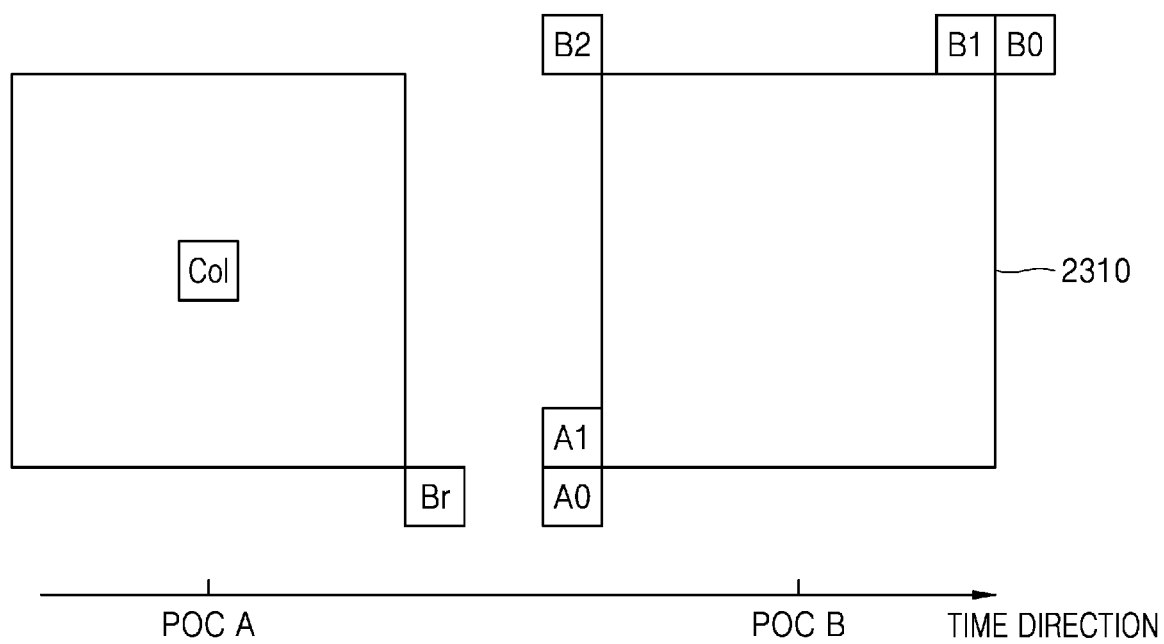
FIG. 26 is a diagram illustrating locations of neighboring blocks adjacent to a current block.

The motion information determiner 2130 may determine a motion vector of a neighboring block having a first availability as the temporal motion vector by scanning at least one neighboring block that is pre-determined in a pre-determined order. Referring to FIG. 26, neighboring blocks of the current block 2310 may include spatial neighboring blocks A0, A1, B0, B1, and B2 that are spatially adjacent to the current block 2310, and temporal neighboring blocks Col and Br that are temporally adjacent to the current block 2310. In detail, the neighboring blocks may include the lower left outer block A0 of the current block 2310, the lower left block A1 of the current block 2310, the upper right outer block B0 of the current block 2310, the upper right block B1 of the current block 2310, the upper left outer block B2 of the current block 2310, the block Col located at the same point as the current block 2310 in a collocated image, and the lower right outer block Br of the block Col of the same point.

It is assumed that a location of a pixel located at the leftmost of the top of the current block 2310 is (xCb, yCb), and a horizontal length and a vertical length of the current block 2310 are respectively cbWidth and cbHeight in units of pixels. The block A1 is a block including a pixel having a location of (xCb-1, yCb+cbHeight-1), and the block A0 is a block including a pixel having a location of (xCb-1, yCb+cbHeight). Also, the block B1 is a block including a pixel having a location of (xCb+cbWidth-1, yCb-1), and the block B0 is a block including a pixel having a location of (xCb+cbWidth, yCb-1). Also, the block B2 is a block including a pixel having a location of (xCb-1, yCb-1). However, locations of neighboring blocks of FIG. 26 are merely examples, and may vary according to implementations.

When there is no availability of at least one neighboring block that is pre-determined, the motion information determiner 2130 may determine a pre-determined motion vector (e.g., a zero vector) as a temporal motion vector.

When a neighboring block to be scanned is intra predicted, the motion information determiner 2130 may determine that the block has no availability. When an image indicated by the neighboring block to be scanned is different from a pre-determined collocated image, the motion information determiner 2130 may determine that the block has no availability, and when the image indicated by the neighboring block to be scanned is the same as the pre-determined collocated image, the motion information determiner 2130 may determine that the block has an availability. Also, the motion information determiner 2130 may determine an availability of the neighboring block in consideration of a size of a storage block. For example, when the size of the storage block is M×M, and an x-component value or a y-component value of a motion vector of the neighboring block to be scanned is less than M, the motion information determiner 2130 may determine that the block has no availability. Alternatively, when the size of the storage block is M×M, and the x-component value or the y-component value of the motion vector of the neighboring block to be scanned is less than M/2, the motion information determiner 2130 may determine that the block has no availability.

In an embodiment, the motion information determiner 2130 may scan blocks in an order of the left neighboring block A0 or A1 of the current block→the upper neighboring block B0, B1, or B2 of the current block, and may determine a motion vector of a neighboring block having an availability as a temporal motion vector. When the left neighboring block and the upper neighboring block do not have availabilities, the motion vector determiner may determine a pre-determined motion vector (e.g., a zero vector) as a temporal motion vector.

In an embodiment, the motion information determiner 2130 may scan the left neighboring block A0 or A1 of the current block, and when the left neighboring block has an availability, the motion information determiner 2130 may determine a motion vector of the left neighboring block as a temporal motion vector. When the left neighboring block has no availability, the motion vector determiner may determine a pre-determined motion vector (e.g., a zero vector) as a temporal motion vector. Also, in an embodiment, the motion vector determiner may scan blocks in an order of the left neighboring block A0 or A1 of the current block→the upper neighboring block B0, B1, or B1→the temporal neighboring block Col or Br, and may determine a motion vector of a neighboring block having an availability as a temporal motion vector.

Figure 27C:
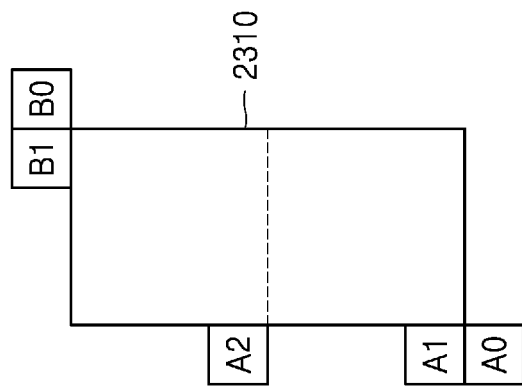
FIGS. 27A, 27B and 27C are a diagram illustrating locations of neighboring blocks according to a shape of a current block.
Figure 27B:
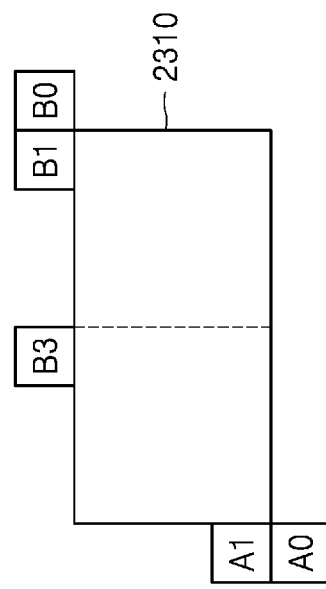
Figure 27A:
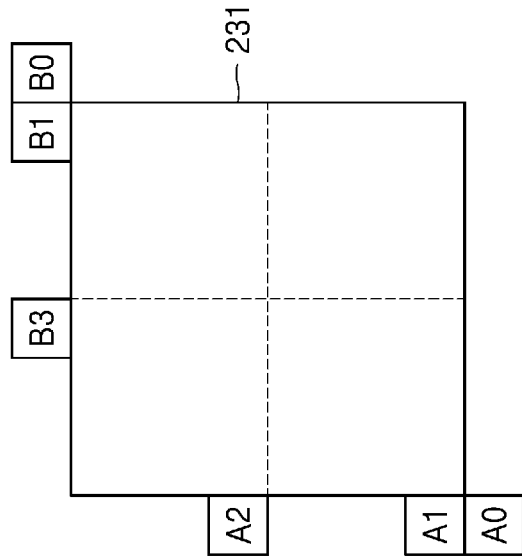

In an embodiment, the motion information determiner 2130 may determine a location and a scan order of a neighboring block to be scanned based on a shape of the current block 2310, which will be described with reference to FIGS. 27A, 27B and 27C. In FIG. 27A illustrates that the current block 2310 has a square shape, and FIG. 27B illustrates that a horizontal length of the current block 2310 is greater than a vertical length. Also, FIG. 27C illustrates that a vertical length of the current block 2310 is greater than a horizontal length.

First, locations of neighboring blocks of FIGS. 27A, 27B and 27C will be described. It is assumed that a location of a pixel located at the leftmost of the top of the current block 2310 is (xCb, yCb), and a horizontal length and a vertical length of the current block 2310 are respectively cbWidth and cbHeight in units of pixels. The block A1 is a block including a pixel having a location of (xCb−1, yCb+cbHeight-1), and the block A0 is a block including a pixel having a location of (xCb−1, yCb+cbHeight). Also, the block B1 is a block including a pixel having a location of (xCb+cbWidth−1, yCb−1), and the block B0 is a block including a pixel having a location of (xCb+cbWidth, yCb−1). Also, a block A2 is a block including a pixel having a location of (xCb−1, yCb+cbHeight/2-1), and a block B3 is a block including a pixel having a location of (xCb+cbWidth/2-1, yCb−1). However, locations of neighboring blocks of FIGS. 27A, 27B and 27C are merely examples, and may vary according to implementations.

For example, when the current block 2310 has a square shape, the motion information determiner 2130 may determine a temporal motion vector by determining an availability of the left neighboring block A0 or A1 of the current block 2310. When a horizontal length of the current block 2310 is greater than a vertical length, the motion information determiner 2130 may determine a temporal motion vector by determining an availability of the upper neighboring block B0 or B1 of the current block 2310, and when a vertical length of the current block 2310 is greater than a horizontal length, the motion information determiner 2130 may determine a temporal motion vector by determining an availability of the left neighboring block A0 or A1 of the current block 2310.

Alternatively, when the current block 2310 has a square shape, the motion information determiner 2130 may determine a temporal motion vector by determining an availability of the left neighboring block A0 or A1 of the current block 2310. Also, when a horizontal length of the current block 2310 is greater than a vertical length, the motion information determiner 2130 may determine a temporal motion vector by determining an availability of the left neighboring block A0 or A1 of the current block 2310, and when a vertical length of the current block 2310 is greater than a horizontal length, the motion information determiner 2130 may determine a temporal motion vector by determining an availability of the upper neighboring block B0 or B1 of the current block 2310.

Alternatively, when the current block 2310 has a square shape or a vertical length of the current block 2310 is greater than a horizontal length, the motion information determiner 2130 may determine a temporal motion vector by determining an availability in an order of the block A1→the block B1→the block B0→the block A0. When a horizontal length of the current block 2310 is greater than a vertical length, the motion information determiner 2130 may determine a temporal motion vector by determining an availability in an order of the block B1→the block A1→the block B0→the block A0.

Alternatively, when the current block 2310 has a square shape, the motion information determiner 2130 may determine a temporal motion vector by determining an availability in an order of the block A1→the block B1→the block B0→the block A0. When a vertical length of the current block 2310 is greater than a horizontal length or the horizontal length of the current block 2310 is greater than the vertical length, the motion information determiner 2130 may determine a temporal motion vector by determining an availability in an order of the block B1→the block B0→the block A1→the block A0.

Alternatively, when the current block 2310 has a square shape, the motion information determiner 2130 may determine a temporal motion vector by determining availabilities of the left neighboring block A0 or A1 and the upper neighboring block B0 or B1 of the current block 2310. When a horizontal length of the current block 2310 is greater than a vertical length, the motion information determiner 2130 may determine a temporal motion vector by determining an availability of the upper neighboring block B0 or B1 of the current block 2310. Also, when a vertical length of the current block 2310 is greater than a horizontal length, the motion information determiner 2130 may determine a temporal motion vector by determining an availability of the left neighboring block A0 or A1 of the current block 2310.

Alternatively, when the current block 2310 has a square shape, the motion information determiner 2130 may determine a temporal motion vector by determining availabilities of the left neighboring block A0 or A1 and the upper neighboring block B0 or B1. When a horizontal length of the current block 2310 is greater than a vertical length, the motion information determiner 2130 may determine a temporal motion vector by determining availabilities of the left neighboring block A0 or A1 and the upper neighboring block B3. The block B3 is a block on a right upper side of the left block that is determined by vertically two dividing the current block 2310. Also, when a vertical length of the current block 2310 is greater than a horizontal length, the motion information determiner 2130 may determine a temporal motion vector by determining availabilities of the upper neighboring block B0 or B1 and the left neighboring block A2 of the current block 2310. The block A2 is a block located at the lower left of the upper block that is determined by horizontally dividing the current block 2310 into two.

Alternatively, when the current block 2310 has a square shape, the motion information determiner 2130 may determine a temporal motion vector by determining availabilities of the block A1, the block B1, the block A0, and the block B0. When a horizontal length of the current block 2310 is greater than a vertical length, the motion information determiner 2130 may determine a temporal motion vector by determining availabilities of the block A1, the block B3, the block A0, and the block B0. Also, when a vertical length of the current block 2310 is greater than a horizontal length, the motion information determiner 2130 may determine a temporal motion vector by determining availabilities of the block A2, the block B1, the block A0, and the block B0. Regardless of a shape of the current block 2310, the block A0 and the block B0 may be excluded from scan targets.

Alternatively, when the current block 2310 has a square shape, the motion information determiner 2130 may determine a temporal motion vector by determining availabilities of the block A1, the block B1, the block A0, and the block B0. When a horizontal length of the current block 2310 is greater than a vertical length, the motion information determiner 2130 may determine a temporal motion vector by determining availabilities of the block A1, the block B3, the block B1, and the block A0. Also, when a vertical length of the current block 2310 is greater than a horizontal length, the motion information determiner 2130 may determine a temporal motion vector by determining availabilities of the block B1, the block A1, the block A2, and the block B0.

Alternatively, when the current block 2310 has a square shape, the motion information determiner 2130 may determine a temporal motion vector by determining an availability in an order of the block A1→the block B1→the block B0→the block A0. When a horizontal length of the current block 2310 is greater than a vertical length, the motion information determiner 2130 may determine a temporal motion vector by determining an availability in an order of the block B1→the block B0→the block B3→the block A1. Also, when a vertical length of the current block 2310 is greater than a horizontal length, the motion information determiner 2130 may determine a temporal motion vector by determining an availability in an order of the block A1→the block A2→the block A0→the block B1.

Alternatively, when the current block 2310 has a square shape, the motion information determiner 2130 may determine a temporal motion vector by determining an availability in an order of the block A1→the block B1→the block B0→the block A0. When a horizontal length of the current block 2310 is greater than a vertical length, the motion information determiner 2130 may determine a temporal motion vector by determining an availability in an order of the block B1→the block B0. Also, when a vertical length of the current block 2310 is greater than a horizontal length, the motion information determiner 2130 may determine a temporal motion vector by determining an availability in an order of the block A1→the block A0.

Alternatively, when the current block 2310 has a square shape, the motion information determiner 2130 may determine a temporal motion vector by determining an availability in an order of the left neighboring block A1 or A0→the upper neighboring block B1 or B0. When a horizontal length of the current block 2310 is greater than a vertical length, the motion information determiner 2130 may determine a temporal motion vector by determining an availability of the upper neighboring block B0 or B1. Also, when a vertical length of the current block 2310 is greater than a horizontal length, the motion information determiner 2130 may determine a temporal motion vector by determining an availability of the left neighboring block A1 or A0.

When the motion information determiner 2130 determines a temporal motion vector through a scan process, and precision of a motion vector of a neighboring block having an availability is A pixel precision (A is a rational number), the motion information determiner 2130 may determine a temporal motion vector by converting the motion vector of the neighboring vector into B pixel precision (B is a rational number) that is different from the A pixel precision.

The motion information determiner 2130 may determine precision of a temporal motion vector based on at least one of a size of a storage block that is a unit for storing a motion vector and a size of a sub-block in a current block. For example, when the size of the storage block is M×M, the motion information determiner 2130 may determine a temporal motion vector by converting a motion vector of a neighboring block into M/2 pixel precision or M pixel precision. In this case, in order to convert a motion vector of a neighboring block of high precision into low precision, the motion information determiner 2130 may divide the motion vector of the neighboring block by a certain value, may determine a motion vector of low precision that is integer pixel precision by rounding, rounding up, or rounding down a resultant value, and may determine the determined motion vector of the low precision as a temporal motion vector. When the size of the storage block is M×M, the motion information determiner 2130 may convert a motion vector of a neighboring block into M/2 pixel precision or M pixel precision, thereby omitting a process of calculating a location of a pixel unit for extracting motion vectors of sub-areas in a first reference area.

Alternatively, when the size of the sub-block is M×M, the motion information determiner 2130 may determine a temporal motion vector by converting a motion vector of a neighboring block into M/2 pixel precision or M pixel precision. In this case, in order to convert a motion vector of a neighboring block of high precision into low precision, the motion information determiner 2130 may divide the motion vector of the neighboring block by a certain value, may determine a motion vector of low precision that is integer pixel precision by rounding, rounding up, or rounding down a resultant value, and may determine the determined motion vector of the low precision as a temporal motion vector.

Alternatively, the motion information determiner 2130 may determine a temporal motion vector by converting a motion vector of a neighboring block into pixel precision that is pre-mapped to a size of a storage block and a size of a sub-block.

In an embodiment, the motion information determiner 2130 may determine a temporal motion vector based on a history of motion vectors. The motion information determiner 2130 may store a certain number of motion vectors used in a decoding process of previous blocks, and may determine at least one motion vector used in a decoding process of a previous block during decoding of a current block as a temporal motion vector. For example, the motion information determiner 2130 may determine a motion vector used in a decoding process of a block right before a current block as a temporal motion vector. Alternatively, the motion information determiner 2130 may determine a motion vector indicated by information included in a bitstream from among motion vectors stored as a history as a temporal motion vector. The motion information determiner 2130 may store a certain number of motion vectors of previous blocks for each largest coding unit, each slice unit, or each picture unit.

In another embodiment, the motion information determiner 2130 may determine a global motion vector obtained from a bitstream as a temporal motion vector. In this case, the global motion vector may be included in the bitstream with certain pixel precision. The global motion vector may be used to decode blocks in a picture including a current block, a slice including the current block, or a largest coding unit including the current block.

In another embodiment, the motion information determiner 2130 may determine a pre-determined motion vector (e.g., a zero vector) as a temporal motion vector.

In another embodiment, the motion information determiner 2130 may determine a temporal motion vector based on at least one of a size of a storage block and a size of a sub-block. For example, when the size of the storage block is M×M, the motion information determiner 2130 may determine (M, M) or (M/2, M/2) that is 1 pixel precision as a temporal motion vector. Also, for example, when the size of the sub-block is M×M, the motion information determiner 2130 may determine (M, M) or (M/2, M/2) that is 1 pixel precision as a temporal motion vector. Alternatively, when the size of the storage block is M×M and the size of the sub-block is M×M, the motion information determiner 2130 may determine (M, M) or (M/2, M/2) that is 1 pixel precision as a temporal motion vector. Alternatively, the motion information determiner 2130 may determine a motion vector that is pre-mapped to the size of the storage block and the size of the sub-block as a temporal motion vector.

Alternatively, when the motion vector determined based on at least one of the size of the storage block and the size of the sub-block is (I, J), the motion information determiner 2130 may determine, as candidates, not only (I, J) but also a motion vector that is a modification of (I, J) (e.g., at least one of (−I, J), (I, −J), (−I, −J), (I, 0), (−I, 0), (0, J), (0, −J), and (0, 0)), and may determine a motion vector of any of the motion vectors determined as candidate as a temporal motion vector.

In another embodiment, when a current block is a certain block unit (e.g., a largest coding unit), the motion information determiner 2130 may determine a pre-determined motion vector (e.g., a zero vector) as a temporal motion vector. When the current block is not the certain block unit (e.g., the largest coding unit), a temporal motion vector may be determined through a scan process of a pre-determined block.

When reconstruction of a current block is completed by the reconstructor 2150, the deblocker 2170 may perform deblocking filtering on sample values of blocks based on a boundary between blocks to remove artifacts in an image.

Figure 28:
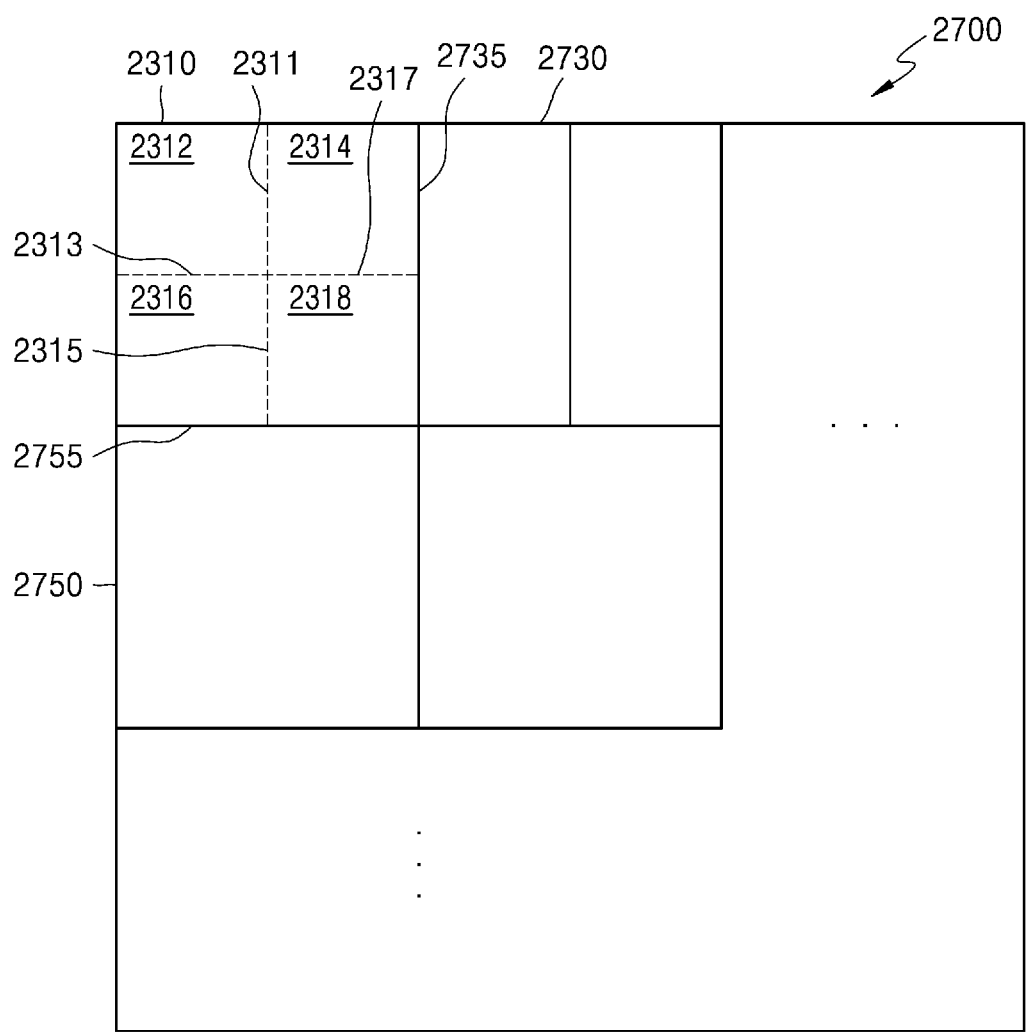
FIG. 28 is a diagram for describing a deblocking process according to an embodiment.

FIG. 28 is a diagram for describing a deblocking process according to an embodiment.

Referring to FIG. 28, a current image 2700 includes the current block 2310 and neighboring blocks 2730 and 2750. In an embodiment, the deblocker 2170 deblocks sample values adjacent to a boundary based on boundaries 2735 and 2755 between the current block 2310 and the neighboring blocks 2730 and 2750. In detail, based on the boundary 2735 between the current block 2310 and the right block 2730, deblocking filtering of changing values of samples in the current block 2310 and samples in the right block 2730 adjacent to the boundary 2735 may be performed. Also, based on the boundary 2755 between the current block 2310 and the lower block 2750, deblocking filtering of changing values of samples in the current block 2310 and samples in the lower block 2750 adjacent to the boundary 2755 may be performed.

Also, in an embodiment, the deblocker 2170 may perform deblocking on the first through fourth sub-blocks 2312, 2314, 2316, and 2318 in the current block 2310. In detail, the deblocker 2170 may determine a filtered current block, by performing deblocking filtering on sample values of the first through fourth sub-blocks 2312, 2314, 2316, and 2318 based on boundaries 2311, 2313, 2315, and 2317 between the first through fourth sub-blocks 2312, 2314, 2316, and 2318. Accordingly, based on the boundary 2311 between the first sub-block 2312 and the second sub-block 2314, deblocking filtering of changing values of samples in the first sub-block 2312 and samples in the second sub-block 2314 adjacent to the boundary 2311 may be performed. Also, based on the boundary 2313 between the first sub-block 2312 and the third sub-block 2316, deblocking filtering of changing values of samples in the first sub-block 2312 and samples in the third sub-block 2316 adjacent to the boundary 2313 may be performed. Likewise, deblocking filtering may be performed based on the boundary 2317 between the second sub-block 2314 and the fourth sub-block 2318 and the boundary 2315 between the third sub-block 2316 and the fourth sub-block 2318.

In an embodiment, when a size of each of the first through fourth sub-blocks 2312, 2314, 2316, and 2318 in the current block 2310 is equal to or less than a pre-determined size (e.g., 8×8 or 16×16), the deblocker 2170 may perform deblocking filtering on the first through fourth sub-blocks 2312, 2314, 2316, and 2318, and when the size of each of the first through fourth sub-blocks 2312, 2314, 2316, and 2318 is greater than the pre-determined size, the deblocker 2170 may not perform deblocking filtering.

Also, in an embodiment, when a size of each of the first through fourth sub-blocks 2312, 2314, 2316, and 2318 in the current block 2310 is equal to or greater than a pre-determined size (e.g., 8×8 or 16×16), the deblocker 2170 may perform deblocking filtering on the first through fourth sub-blocks 2312, 2314, 2316, and 2318, and when the size of each of the first through fourth sub-blocks 2312, 2314, 2316, and 2318 is less than the pre-determined size, the deblocker 2170 may not perform deblocking filtering.

Figure 29:
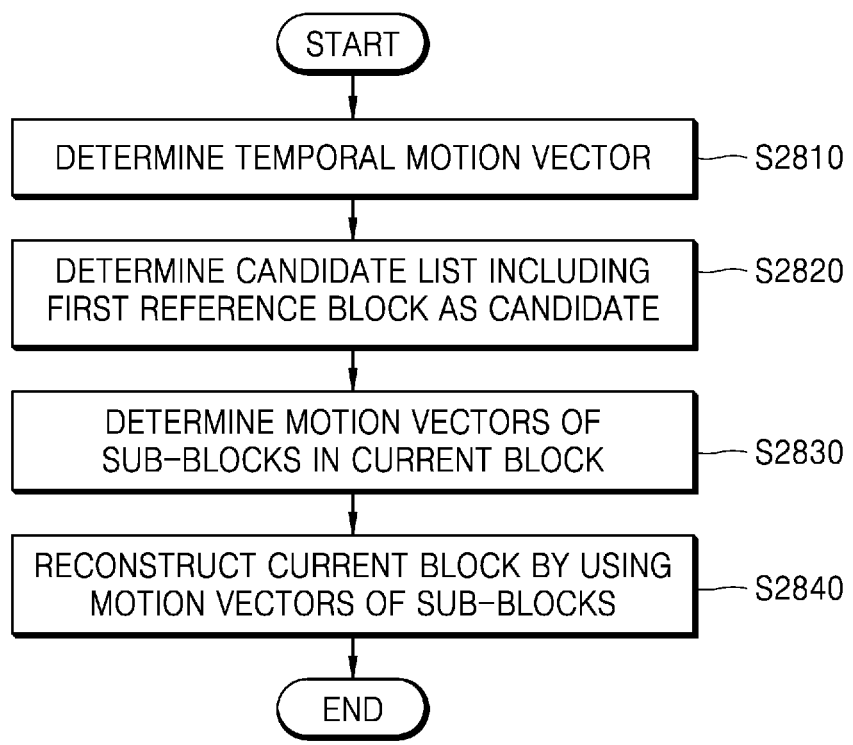
FIG. 29 is a flowchart for describing a method of decoding an image, according to an embodiment.

FIG. 29 is a flowchart for describing a method of decoding an image, according to an embodiment.

In operation S2810, the image decoding apparatus 2100 determines a temporal motion vector, and in operation S2820, the image decoding apparatus 2100 determines a candidate list including, as a candidate, a first reference block indicated by the temporal motion vector.

When a size of a current block is equal to or greater than a certain size and a prediction mode of the current block is a mode of determining a motion vector of the current block by using a motion vector of a candidate included in the candidate list, the image decoding apparatus 2100 may determine the temporal motion vector and the candidate list.

A process of determining the temporal motion vector and the candidate list has been described above in detail, and thus detailed descriptions thereof will be omitted.

In operation S2830, when the first reference block is selected from among candidates included in the candidate list, the image decoding apparatus 2100 determines motion vectors of sub-blocks in the current block by using motion vectors obtained from the first reference block.

In operation S2840, the image decoding apparatus 2100 may reconstruct the current block based on sample values of a second reference block indicated by the motion vectors of the sub-blocks.

When the current block is reconstructed, the image decoding apparatus 2100 may obtain a filtered current block by performing deblocking filtering on sample values of the sub-blocks based on a boundary between the sub-blocks in the reconstructed current block. The filtered current block may be used as a reference block of a next block.

Figure 30:
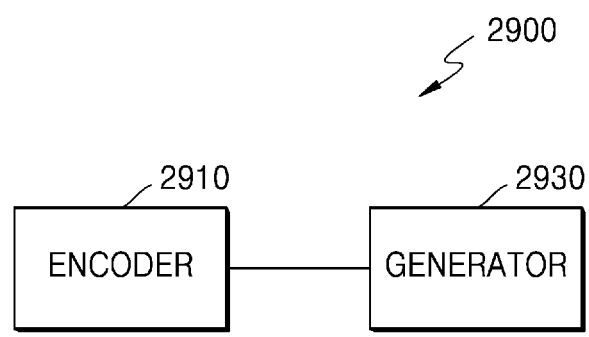
FIG. 30 is a block diagram illustrating a configuration of an image encoding apparatus, according to an embodiment.

FIG. 30 is a block diagram illustrating a configuration of the image encoding apparatus 2900, according to an embodiment.

The image encoding apparatus 2900 includes an encoder 2910 and a generator 2930. The encoder 2910 and the generator 2930 according to an embodiment may be implemented as at least one processor. The image encoding apparatus 2900 may include one or more data storages (not shown) in which input/output data of the encoder 2910 and the generator 2930 is stored. Also, the image encoding apparatus 2900 may include a memory controller (not shown) for controlling data input/output to/from the data storages (not shown).

The encoder 2910 encodes an image, and the generator 2930 generates a bitstream including information generated as a result of image encoding. The encoder 2910 and the generator 2930 of FIG. 30 may respectively correspond to the encoder 220 and the bitstream generator 210 of FIG. 2.

The encoder 2910 may determine a prediction mode of a current block determined in a current image. Examples of the prediction mode of the current block may include an intra mode, an inter mode, a merge mode, an AMVP mode, a direct mode, and a skip mode.

When a size of the current block is equal to or greater than a certain size (e.g., 4×4, 8×8, 16×16, 32×32, 64×64, or 128×128), the encoder 2910 may determine a candidate list including, as a candidate, a first reference block indicated by a temporal motion vector. The candidate list may include a pre-determined number of candidates.

The first reference block refers to a block for extracting a motion vector used to determine a motion vector of the current block.

When the size of the current block is compared with the certain size, the encoder 2910 may compare one (e.g., a smaller size) of a width and a height of the current block with the certain size. For example, when the size of the current block is 4×16 and the certain size is 8×8, 4 that is a width of the current block is less than 8 indicating a size of one side in the certain size, and thus it may be determined that the size of the current block is less than the certain size.

In an embodiment, when the size of the current block is less than the certain size (e.g., 4×4, 8×8, 16×16, 32×32, 64×64, or 128×128), a candidate list including, as a candidate, a block other than the first reference block may be determined. That is, the first reference block may be included or may not be included in the candidate list based on the size of the current block.

In an embodiment, when the size of the current block is equal to or greater than the certain size, the encoder 2910 may determine a first candidate list including the first reference block as a candidate, and when the size of the current block is less than the certain size, the motion information determiner 2130 may determine a second candidate list including a block other than the first reference block as a candidate.

Also, in an embodiment, when the size of the current block is less than the certain size (e.g., 4×4, 8×8, 16×16, 32×32, 64×64, or 128×128) and a temporal motion vector is a pre-determined motion vector (e.g., a zero vector), a candidate list including, as a candidate, a block other than the first reference block may be determined. In this case, the candidate list may include, as a candidate, a temporal neighboring block in a pre-determined collocated image. In contrast, when the size of the current block is equal to or greater than the certain size or the temporal motion vector is not a pre-determined motion vector, the first reference block may be included in the candidate list, and the temporal neighboring block in the collocated image may not be included in the candidate list. The certain size may be a size of a sub-block.

Also, in an embodiment, when the size of the current block is greater than the certain size (e.g., 4×4, 8×8, 16×16, 32×32, 64×64, 128×128), a candidate list including, as a candidate, a block other than the first reference block may be determined. In this case, the candidate list may include, as a candidate, a temporal neighboring block in a pre-determined collocated image. In contrast, when the size of the current block is equal to or less than the certain size, the first reference block may be included in the candidate list, and the temporal neighboring block in the collocated image may not be included in the candidate list. The certain size may be a size of a sub-block.

Also, in an embodiment, when the size of the current block is the same as the certain size (e.g., 4×4, 8×8, 16×16, 32×32, 64×64, or 128×128), a candidate list including, as a candidate, a block other than the first reference block may be determined. In contrast, when the size of the current block is not the same as the certain size, the first reference block may be included in the candidate list. In this case, a temporal neighboring block in a collocated image may not be included in the candidate list. The certain size may be a size of a sub-block.

Also, in an embodiment, when the size of the current block is different from the certain size (e.g., 4×4, 8×8, 16×16, 32×32, 64×64, or 128×128), a candidate list including, as a candidate, a block other than the first reference block may be determined. In this case, the candidate list may include, as a candidate, a temporal neighboring block in a pre-determined collocated image. In contrast, when the size of the current block is the same as the certain size, the first reference block may be included in the candidate list, and the temporal neighboring block in the collocated image may not be included in the candidate list. The certain size may be a size of a sub-block.

Also, in an embodiment, when the current block is a certain block unit (e.g., a largest coding unit), a candidate list including, as a candidate, a block other than the first reference block may be determined. In this case, the candidate list may include, as a candidate, a temporal neighboring block in a pre-determined collocated image. In contrast, when the current block is not the certain block unit, the first reference block may be included in the candidate list, and the temporal neighboring block in the collocated image may not be included in the candidate list.

Also, in an embodiment, when the size of the current block is k times greater than a size of a sub-block (k is a pre-determined integer), a candidate list including, as a candidate, a block other than the first reference block may be determined. In this case, the candidate list may include, as a candidate, a temporal neighboring block in a pre-determined collocated image. In contrast, when the size of the current block is not k times greater than the size of the certain block, the first reference block may be included in the candidate list, and the temporal neighboring block in the collocated image may not be included in the candidate list.

Also, in an embodiment, when candidates of a candidate list are sequentially determined according to availabilities of multiple blocks including the first reference block, and the first reference block is determined as a first candidate of the candidate list, the first reference block may be excluded from the candidate list. For example, in a situation where blocks are included in a candidate list according to their availabilities in an order of a first spatial neighboring block, the first reference block, and a second spatial neighboring block, when there is no availability of the first spatial neighboring block and the first reference block is included as a first candidate in the candidate list, the first reference block may be excluded from the candidate list.

Also, in an embodiment, when a temporal layer value of a current picture in a GOP including a current picture is the same as a pre-determined value (e.g., a largest value), a candidate list including, as a candidate, a block other than the first reference block may be determined.

Also, in an embodiment, when a temporal motion vector is a pre-determined motion vector (e.g., a zero vector), a candidate list including, as a candidate, a block other than the first reference block may be determined. In this case, the candidate list may include, as a candidate, a temporal neighboring block in a pre-determined collocated image. In contrast, when the temporal motion vector is different from the pre-determined motion vector, the first reference block may be included in the candidate list, and the temporal neighboring block in the collocated image may not be included in the candidate list.

Also, in an embodiment, when a temporal motion vector is different from a pre-determined motion vector (e.g., a zero vector), a candidate list including, as a candidate, a block other than the first reference block may be determined. In this case, the candidate list may include, as a candidate, a temporal neighboring block in a pre-determined collocated image. In contrast, when the temporal motion vector is the same as the pre-determined motion vector, the first reference block may be included in the candidate list, and the temporal neighboring block in the collocated image may not be included in the candidate list.

Also, in an embodiment, when a motion vector corresponding to a center pixel of the first reference block does not exist, a candidate list including, as a candidate, a block other than the first reference block may be determined. In contrast, when the motion vector corresponding to the center pixel of the first reference block exists, the first reference block may be included in the candidate list.

The encoder 2910 may determine a candidate list when a prediction mode of the current block is a mode of determining a motion vector of the current block by using a motion vector of a candidate included in the candidate list.

A method by which the encoder 2910 determines a candidate list is the same as a method by which the motion information determiner 2130 determines a candidate list, and thus detailed descriptions thereof will be omitted.

In an embodiment, the encoder 2910 determines a temporal motion vector indicating the first reference block. A method of determining a temporal motion vector is the same as a method by which the motion information determiner 2130 determines a temporal motion vector, and thus detailed descriptions thereof will be omitted.

The encoder 2910 may assign indexes to candidates included in the candidate list. For example, an index having a smallest value may be assigned to the first reference block. The encoder 2910 may determine a motion vector of the current block and motion vectors of sub-blocks in the current block, and in order to encode the motion vector of the current block, the encoder 2910 selects one of candidates included in the candidate list. When the first reference block is selected, the first reference block may be used to determine the motion vectors of the sub-blocks in the current block. For example, when the first reference block is selected, motion vectors of sub-areas in the first reference block may be determined as the motion vectors of the sub-blocks in the current block. A method of determining motion vectors of sub-areas in the first reference block has been described above, and thus detailed descriptions thereof will be omitted.

The generator 2930 generates a bitstream including information generated as a result of image encoding. The bitstream may include at least one of information indicating a prediction mode of the current block, information indicating one of candidates included in the candidate list, information indicating a temporal motion vector, a differential motion vector between a motion vector of the current block and a motion vector of a candidate included in the candidate list, and residual data between sample values of a second reference block and sample values of the current block.

The encoder 2910 may perform functions of the motion information determiner 2130, the reconstructor 2150, and the deblocker 2170 of the image decoding apparatus 2100. Accordingly, the encoder 2910 may determine a motion vector of the current block by using a motion vector of a candidate selected in the candidate list, and may reconstruct the current block through motion compensation of the current block.

The encoder 2910 may apply deblocking filtering to a current image including the reconstructed current block. The encoder 2910 may perform deblocking filtering on the current block and a neighboring block, based on a boundary between the current block and the neighboring block. Also, the encoder 2910 may perform deblocking filtering on sub-blocks, based on a boundary between the sub-blocks in the current block. The deblocking filtered current block may be used to encode a next block. When the current block is a reference block of a subsequent block, a motion vector of the subsequent block may be determined according to a representative motion vector of the first reference block. In another embodiment, when the current block is a reference block of a subsequent block, a motion vector of the subsequent block may be determined according to a motion vector of any of sub-blocks in the current block.

Figure 31:
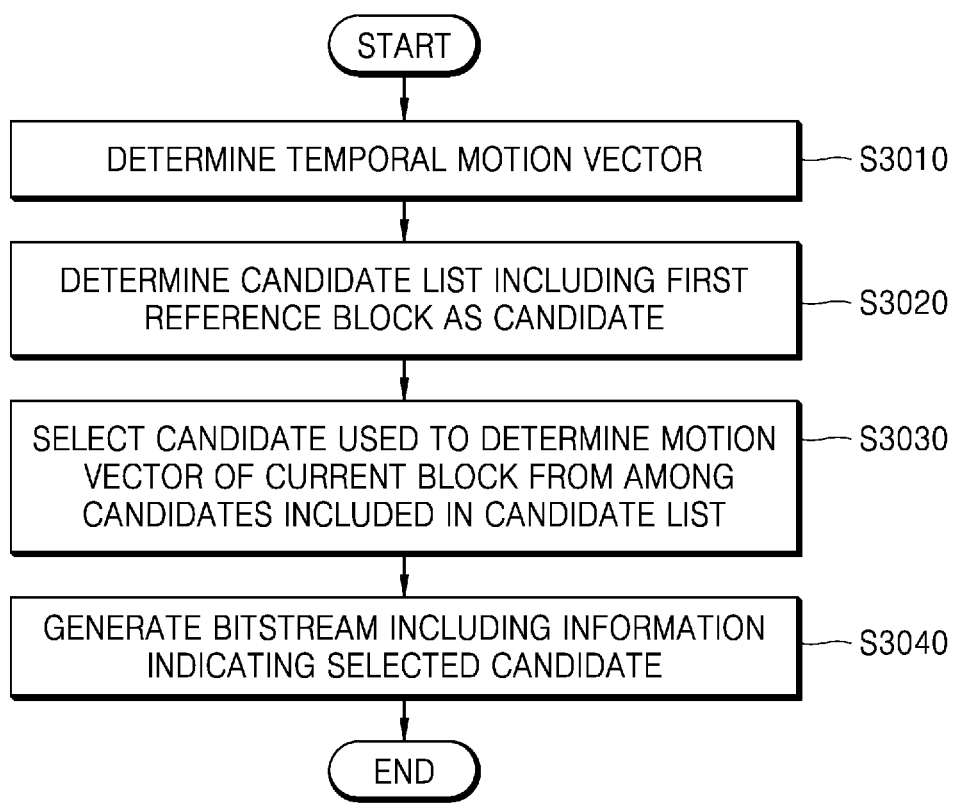
FIG. 31 is a flowchart for describing a method of encoding an image, according to an embodiment.

FIG. 31 is a flowchart for describing a method of encoding an image, according to an embodiment.

In operation S3010, the image encoding apparatus 2900 determines a temporal motion vector, and in operation S3020, the image encoding apparatus 2900 determines a candidate list including, as a candidate, a first reference block indicated by the temporal motion vector.

When a size of a current block is equal to or greater than a certain size and a prediction mode of the current block is a mode of determining a motion vector of the current block by using a motion vector of a candidate included in a candidate list, the image encoding apparatus 2900 may determine the temporal motion vector and the candidate list.

A process of determining the temporal motion vector and the candidate list has been described above in detail, and thus detailed descriptions thereof will be omitted.

In operation S3030, the image encoding apparatus 2900 determines a motion vector of the current block, and selects a candidate to be used to determine the motion vector of the current block in the candidate list. The image encoding apparatus 2900 may determine one candidate based on a cost corresponding to each of candidates included in the candidate list. A rate-distortion cost may be used to calculate the cost.

In operation S3040, the image encoding apparatus 2900 generates a bitstream including information indicating the candidate selected in the candidate list. When the first reference block is selected in the candidate list, motion vectors obtained from the first reference block may be used to determine motion vectors of sub-blocks in the current block.

As described above, the bitstream may further include, in addition to the information indicating the candidate selected in the candidate list, at least one of information (e.g., sub-block_merge_flag) indicating a prediction mode of the current block, information indicating a temporal motion vector, a differential motion vector between a motion vector of the current block and a motion vector of a candidate included in the candidate list, and residual data between sample values of a second reference block indicated by the motion vector of the current block and sample values of the current block.

Meanwhile, the embodiments of the present disclosure may be written as computer-executable programs or instructions, and the computer-executable programs may be stored in a medium or a computer program product.

The medium may continuously store the computer-executable programs, or may temporally store the computer-executable programs for execution or downloading. Also, the medium may be any of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as a compact disc read-only memory (CD-ROM) and a digital versatile disc (DVD), magneto-optical media such as a floptical disk, and a ROM, a random-access memory (RAM), and a flash memory, which are configured to store program instructions. Also, other examples of the medium may include recording media and storage media managed by application stores distributing applications or by websites, servers, and the like supplying or distributing other various types of software.

While one or more embodiments of the present disclosure have been described with reference to the figures, it will be understood by one of ordinary skill in the art that various changes in form and details may be made therein without departing from the spirit and scope as defined by the following claims.

The invention claimed is:

1. A method by a processor for decoding a picture, the method comprising:
obtaining, from a bitstream, residue data for a current block;
determining that a temporal candidate is available when a size of the current block is greater than or equal to a predetermined size;
determining whether one neighboring block spatially adjacent to the current block in a current picture is available;
obtaining a temporal motion vector by using a motion vector of the one neighboring block when the one neighboring block is available, wherein when the one neighboring block is not available, the temporal motion vector is determined as a zero vector;
dividing the temporal motion vector by a predetermined value;
generating a candidate list comprising the temporal candidate when the temporal candidate is available; and
when the temporal candidate is selected from among candidates included in the candidate list:
determining a motion vector of a first sub-block in the current block, the motion vector of the first sub-block being determined based on a motion vector of a first sub-block in a predetermined picture;
determining a motion vector of a second sub-block in the current block, the motion vector of the second sub-block being determined based on a motion vector of a second sub-block in the predetermined picture; and
reconstructing the current block by using the motion vector of the first sub-block in the current block, the motion vector of the second sub-block in the current block, and the residue data for the current block,
wherein the first sub-block in the predetermined picture and the second sub-block in the predetermined picture are determined based on the divided temporal motion vector, and
wherein when the motion vector of the first sub-block in the predetermined picture is not available, a predetermined representative motion vector is determined as the motion vector of the first sub-block in the predetermined picture.

2. A method by a processor for encoding a picture, the method comprising:
determining that a temporal candidate is available when a size of a current block is greater than or equal to a predetermined size;
determining whether one neighboring block spatially adjacent to the current block in a current picture is available;
obtaining a temporal motion vector by using a motion vector of the one neighboring block when the one neighboring block is available, wherein when the one neighboring block is not available, the temporal motion vector is determined as a zero vector;
dividing the temporal motion vector by a predetermined value;
generating a candidate list comprising the temporal candidate when the temporal candidate is available;

selecting a candidate used to encode the current block from among candidates included in the candidate list; and generating a bitstream comprising information indicating the selected candidate and residue data for the current block, wherein, when the temporal candidate is selected from the candidate list, a motion vector of a first sub-block in the current block is determined based on a motion vector of a first sub-block in a predetermined picture, and a motion vector of a second sub-block in the current block is determined based on a motion vector of a second sub-block in the predetermined picture, wherein the first sub-block in the predetermined picture and the second sub-block in the predetermined picture are determined based on the divided temporal motion vector, and wherein when the motion vector of the first sub-block in the predetermined picture is not available, a predetermined representative motion vector is determined as the motion vector of the first sub-block in the predetermined picture.

3. A method for transmitting a bitstream, the bitstream comprising information indicating a selected candidate from among candidates included in a candidate list, and residue data for a current block, wherein the candidate list is generated by:
determining that a temporal candidate is available when a size of the current block is greater than or equal to a predetermined size;

determining whether one neighboring block spatially adjacent to the current block in a current picture is available;

obtaining a temporal motion vector by using a motion vector of the one neighboring block when the one neighboring block is available, wherein when the one neighboring block is not available, the temporal motion vector is determined as a zero vector;

dividing the temporal motion vector by a predetermined value;

generating the candidate list comprising the temporal candidate when the temporal candidate is available, wherein when the temporal candidate is selected from the candidate list, a motion vector of a first sub-block in the current block is determined based on a motion vector of a first sub-block in a predetermined picture, and a motion vector of a second sub-block in the current block is determined based on a motion vector of a second sub-block in the predetermined picture, wherein the first sub-block in the predetermined picture and the second sub-block in the predetermined picture are determined based on the divided temporal motion vector, and wherein when the motion vector of the first sub-block in the predetermined picture is not available, a predetermined representative motion vector is determined as the motion vector of the first sub-block in the predetermined picture.

* * * * *